US012571643B2

(12) United States Patent
Kang

(10) Patent No.: US 12,571,643 B2
(45) Date of Patent: Mar. 10, 2026

(54) AR SERVICE PLATFORM FOR PROVIDING AUGMENTED REALITY SERVICE

(71) Applicant: LG ELECTRONICS INC., Seoul (KR)

(72) Inventor: Byoungsu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 18/272,052

(22) PCT Filed: Jan. 12, 2022

(86) PCT No.: PCT/KR2022/000561
§ 371 (c)(1),
(2) Date: Jul. 12, 2023

(87) PCT Pub. No.: WO2022/154478
PCT Pub. Date: Jul. 21, 2022

(65) Prior Publication Data
US 2024/0071074 A1      Feb. 29, 2024

(30) Foreign Application Priority Data
Jan. 12, 2021    (KR) ........................ 10-2021-0004116

(51) Int. Cl.
*G01C 21/36*        (2006.01)
*B60K 35/10*        (2024.01)
(Continued)

(52) U.S. Cl.
CPC .......... *G01C 21/3682* (2013.01); *B60K 35/10* (2024.01); *B60K 35/22* (2024.01);
(Continued)

(58) Field of Classification Search
None
See application file for complete search history.

(56) References Cited

U.S. PATENT DOCUMENTS 5,684,940 A    11/1997  Freeman et al.
5,948,040 A     9/1999  DeLorme et al.
(Continued)

FOREIGN PATENT DOCUMENTS

CN          111561938 A      8/2020
EP          3 240 258 A1    11/2017
(Continued)

*Primary Examiner* — Jeffrey J Chow
(74) *Attorney, Agent, or Firm* — Birch, Stewart, Kolasch & Birch, LLP

(57)                ABSTRACT
The present invention provides an AR service platform for providing an AR service. An AR service platform according to one embodiment of the present invention is characterized by comprising: a server that is provided outside a vehicle, collects and processes information required for an AR service, and transmits same to the vehicle; and an AR service device that is provided in the vehicle and provides an AR service using information transmitted from the server, wherein the server comprises a time place occasion (TPO) complexity level calculation module that calculates a TPO complexity level of the real world, and determines an amount of information to be transmitted to the AR service device using the calculated complexity level.

10 Claims, 47 Drawing Sheets

(51) Int. Cl.

| | |
|---|---|
| *B60K 35/22* | (2024.01) |
| *B60K 35/23* | (2024.01) |
| *B60K 35/28* | (2024.01) |
| *G01C 21/34* | (2006.01) |
| *G06Q 30/0251* | (2023.01) |
| *G06T 11/00* | (2006.01) |
| *G06T 19/00* | (2011.01) |
| *G06V 20/20* | (2022.01) |
| *G06V 20/56* | (2022.01) |
| *B60K 35/21* | (2024.01) |
| *B60K 35/25* | (2024.01) |
| *B60K 35/26* | (2024.01) |
| *G06Q 50/40* | (2024.01) |

(52) U.S. Cl.

CPC .............. *B60K 35/23* (2024.01); *B60K 35/28* (2024.01); *G01C 21/3476* (2013.01); *G01C 21/3602* (2013.01); *G01C 21/3617* (2013.01); *G01C 21/3638* (2013.01); *G01C 21/3644* (2013.01); *G01C 21/3647* (2013.01); *G01C 21/365* (2013.01); *G01C 21/3679* (2013.01); *G01C 21/3697* (2013.01); *G06Q 30/0251* (2013.01); *G06T 11/00* (2013.01); *G06T 19/006* (2013.01); *G06V 20/20* (2022.01); *G06V 20/588* (2022.01); *B60K 35/211* (2024.01); *B60K 35/25* (2024.01); *B60K 35/26* (2024.01); *B60K 2360/177* (2024.01); *B60K 2360/21* (2024.01); *G06Q 50/40* (2024.01)

(56) References Cited

U.S. PATENT DOCUMENTS

| | | | |
|---|---|---|---|
| 2005/0102102 | A1 | 5/2005 | Linn |
| 2006/0129316 | A1 | 6/2006 | Park |
| 2008/0243604 | A1 | 10/2008 | Pollard et al. |
| 2010/0323609 | A1 | 12/2010 | Aramaki |
| 2011/0072367 | A1 | 3/2011 | Bauer |
| 2011/0153198 | A1 | 6/2011 | Kokkas et al. |
| 2011/0161875 | A1 | 6/2011 | Kankainen |
| 2012/0016578 | A1 | 1/2012 | Coppens |
| 2012/0059720 | A1 | 3/2012 | Musabji et al. |
| 2012/0092369 | A1 | 4/2012 | Kim et al. |
| 2012/0113138 | A1 | 5/2012 | Uusitalo et al. |
| 2012/0197696 | A1 | 8/2012 | Beyeler et al. |
| 2012/0310717 | A1 | 12/2012 | Kankainen |
| 2012/0310741 | A1 | 12/2012 | Uyeki et al. |
| 2013/0158778 | A1 | 6/2013 | Tengler et al. |
| 2013/0286254 | A1 | 10/2013 | Watanabe |
| 2013/0332066 | A1 | 12/2013 | Jeung et al. |
| 2014/0063064 | A1 | 3/2014 | Seo et al. |
| 2014/0087760 | A1 | 3/2014 | Bennett |
| 2014/0114802 | A1 | 4/2014 | Mandalap |
| 2015/0025971 | A1 | 1/2015 | Shipley et al. |
| 2015/0112790 | A1 | 4/2015 | Wolinsky et al. |
| 2015/0153191 | A1 | 6/2015 | Ma et al. |
| 2015/0201439 | A1 | 7/2015 | Park et al. |
| 2015/0296199 | A1 | 10/2015 | Fuehrer |
| 2016/0003636 | A1* | 1/2016 | Ng-Thow-Hing ... G01C 21/365 |
| | | | 701/418 |
| 2016/0004914 | A1 | 1/2016 | Park |
| 2016/0086381 | A1* | 3/2016 | Jung ...................... G06V 20/20 |
| | | | 345/633 |
| 2016/0121723 | A1 | 5/2016 | Fitch et al. |
| 2016/0217623 | A1* | 7/2016 | Singh ....................... G09G 5/00 |
| 2017/0162177 | A1* | 6/2017 | Lebeck .............. G06F 21/6218 |
| 2017/0200048 | A1 | 7/2017 | Yamada |
| 2017/0228760 | A1 | 8/2017 | Mason-Gugenheim et al. |
| 2018/0033048 | A1 | 2/2018 | Le et al. |
| 2018/0052594 | A1 | 2/2018 | Bemel-Benrud et al. |
| 2018/0066956 | A1 | 3/2018 | Kim et al. |
| 2018/0108079 | A1 | 4/2018 | Traub |
| 2018/0130351 | A1 | 5/2018 | Ha et al. |
| 2018/0137601 | A1 | 5/2018 | Takazawa |
| 2018/0357898 | A1 | 12/2018 | Kamini et al. |
| 2019/0017839 | A1 | 1/2019 | Eyler et al. |
| 2019/0132284 | A1 | 5/2019 | Gould et al. |
| 2019/0132406 | A1 | 5/2019 | Cai et al. |
| 2019/0180485 | A1* | 6/2019 | Kim ...................... G06V 20/20 |
| 2019/0182046 | A1 | 6/2019 | Rangaraj |
| 2020/0134671 | A1 | 4/2020 | Maccini et al. |
| 2020/0184219 | A1 | 6/2020 | Mugura et al. |
| 2020/0324787 | A1 | 10/2020 | Wang et al. |
| 2020/0349770 | A1* | 11/2020 | Kuehne ................. G06T 19/006 |
| 2021/0007459 | A1 | 1/2021 | Jeong et al. |
| 2022/0012923 | A1 | 1/2022 | Lebeck et al. |
| 2022/0116673 | A1 | 4/2022 | Cho et al. |
| 2022/0207800 | A1 | 6/2022 | Pozdnyakov |
| 2022/0229876 | A1 | 7/2022 | Carbune et al. |
| 2022/0269920 | A1* | 8/2022 | Valencia ................. G08B 31/00 |

FOREIGN PATENT DOCUMENTS

| | | |
|---|---|---|
| EP | 3 499 191 A1 | 6/2019 |
| JP | 2017-126142 A | 7/2017 |
| JP | 2018-142377 A | 9/2018 |
| JP | 2019-164001 A | 9/2019 |
| KR | 10-2013-0000160 A | 1/2013 |
| KR | 10-1331827 B1 | 11/2013 |
| KR | 10-2014-0143505 A | 12/2014 |
| KR | 10-1817452 B1 | 1/2018 |
| KR | 10-1848612 B1 | 4/2018 |
| KR | 10-2019-0000860 A | 1/2019 |
| KR | 10-2019-0058999 A | 5/2019 |
| KR | 10-2019-0078676 A | 7/2019 |
| KR | 10-2019-0104272 A | 9/2019 |
| KR | 10-2103980 B1 | 4/2020 |
| WO | WO 2008/093983 A | 8/2008 |

* cited by examiner

HEIGHT
DIRECTION(H)

WIDTH
DIRECTION(W)

OVERALL-LENGTH
DIRECTION(L)

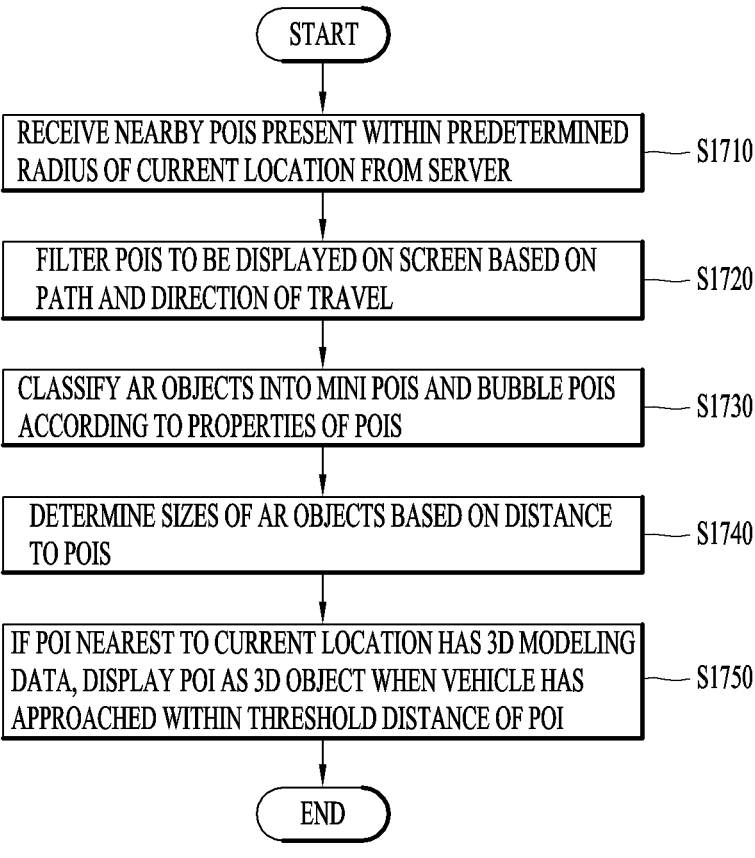

START

RECEIVE NEARBY POIS PRESENT WITHIN PREDETERMINED
RADIUS OF CURRENT LOCATION FROM SERVER — S1710

FILTER POIS TO BE DISPLAYED ON SCREEN BASED ON
PATH AND DIRECTION OF TRAVEL — S1720

CLASSIFY AR OBJECTS INTO MINI POIS AND BUBBLE POIS
ACCORDING TO PROPERTIES OF POIS — S1730

DETERMINE SIZES OF AR OBJECTS BASED ON DISTANCE
TO POIS — S1740

IF POI NEAREST TO CURRENT LOCATION HAS 3D MODELING
DATA, DISPLAY POI AS 3D OBJECT WHEN VEHICLE HAS
APPROACHED WITHIN THRESHOLD DISTANCE OF POI — S1750

END

FIG. 20
(a)
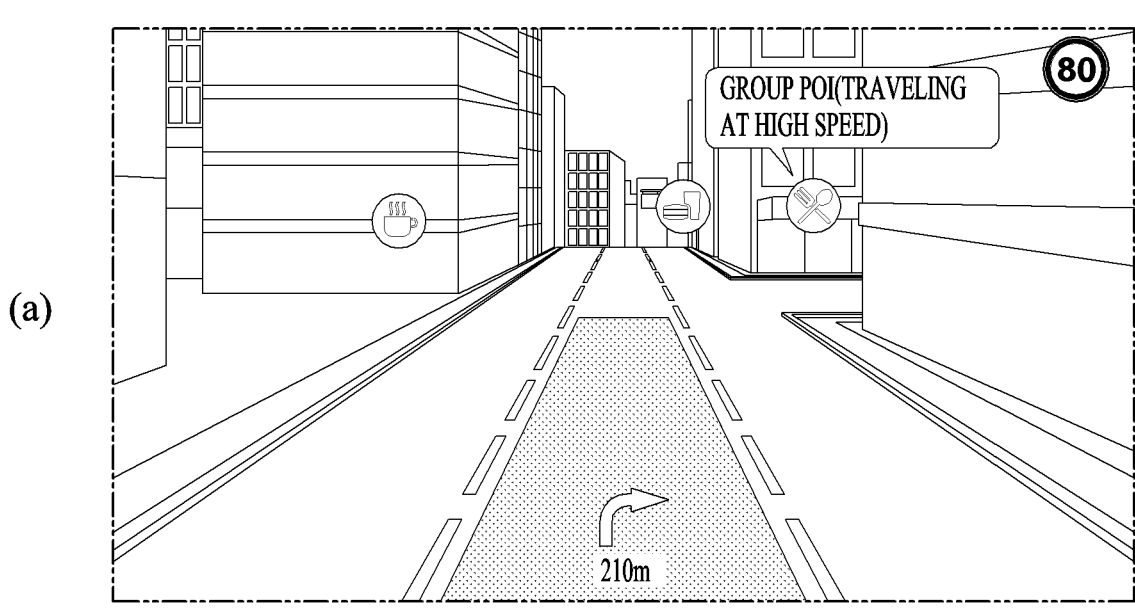
(b)
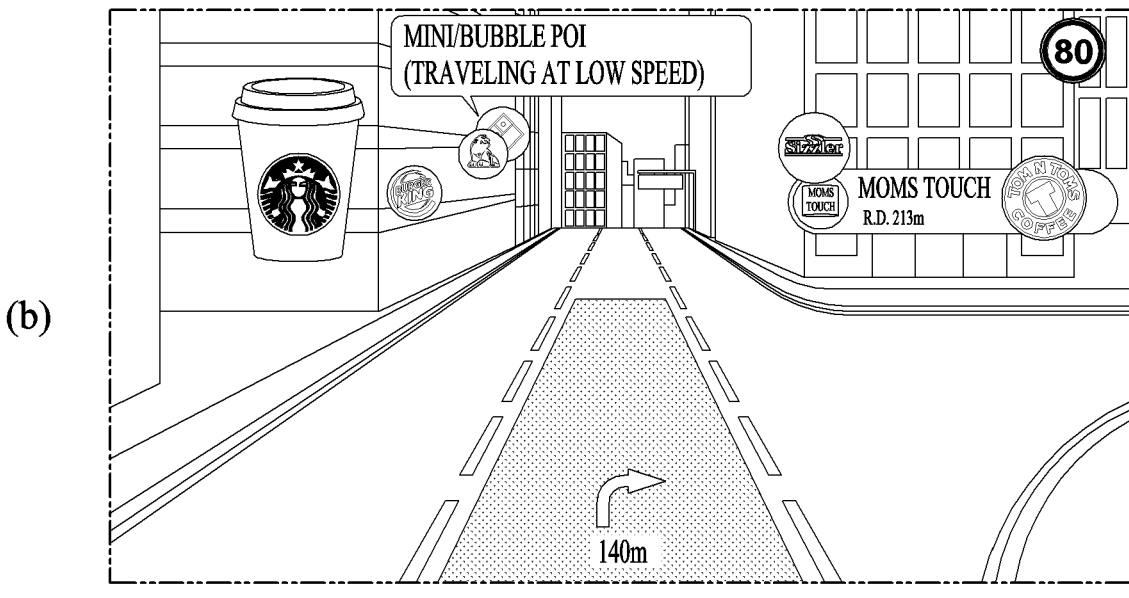

START

RECEIVE NEARBY POIS PRESENT WITHIN PREDETERMINED RADIUS OF CURRENT LOCATION FROM SERVER — S2310

EXTRACT INFORMATION ON LANDMARK POI PRESENT WITHIN SCREEN DISPLAY AREA BASED ON CURRENT LOCATION AND DIRECTION OF TRAVEL — S2320

DISPLAY LANDMARK ICON AND ENABLE TOUCH ON THAT ICON — S2330

TOUCH LANDMARK ICON — S2340

DISPLAY DETAILED INFORMATION ON LANDMARK — S2350

END

FIG. 30
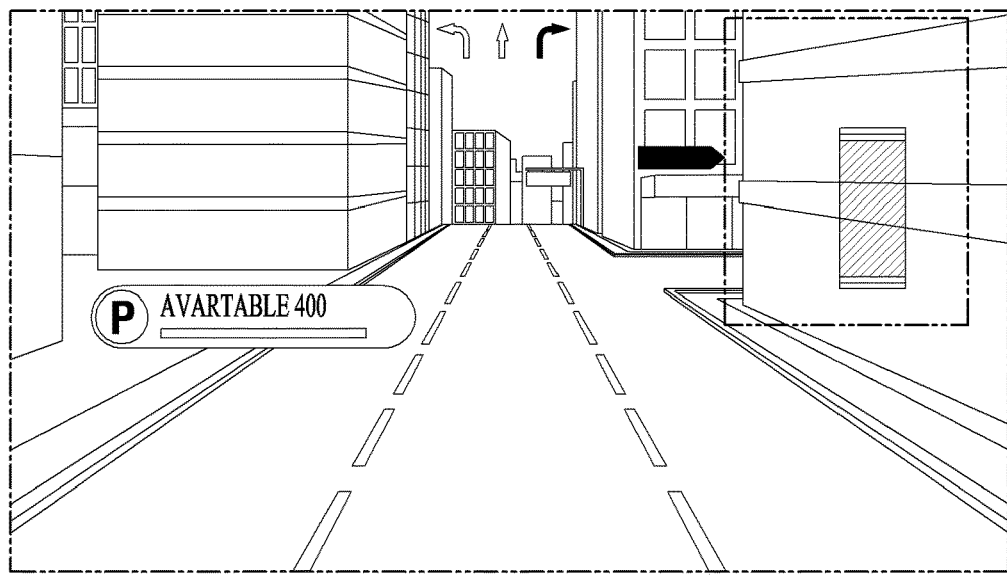
[DISPLAY PARKING INFORMATION]
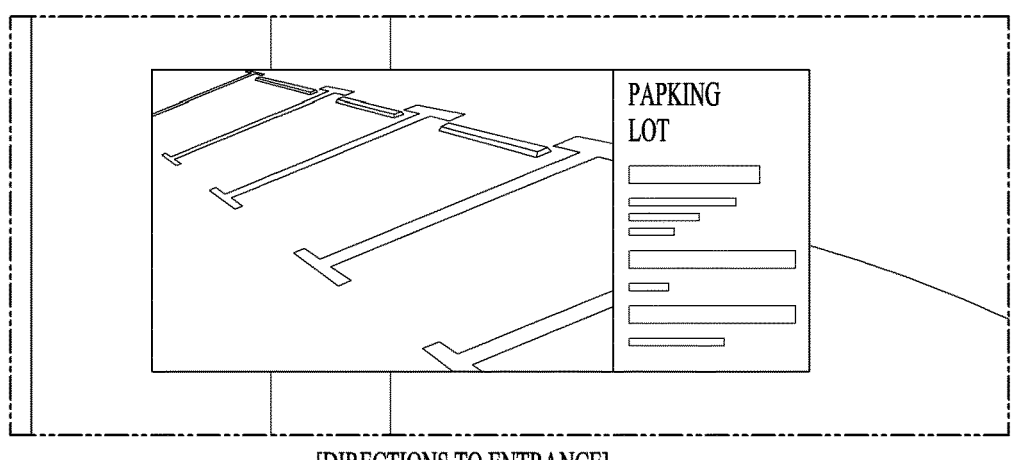
[DIRECTIONS TO ENTRANCE]
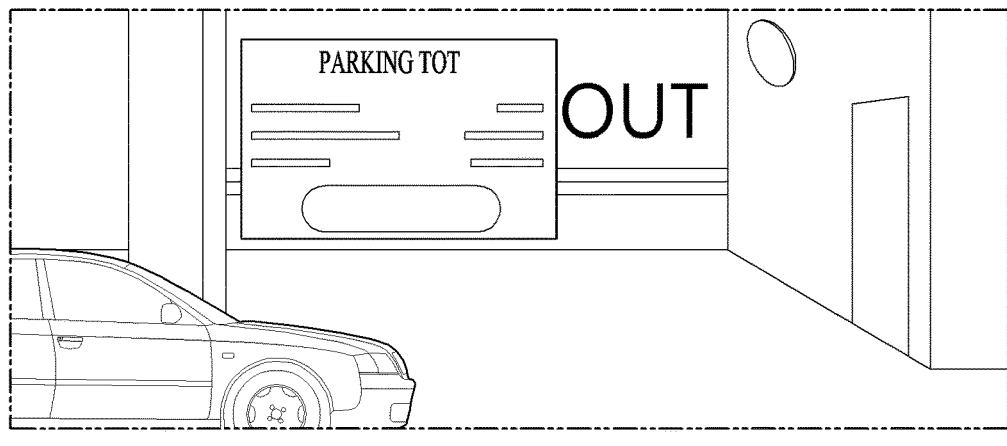
[PAYMENT OF PARKING FEE]

*FIG. 31*

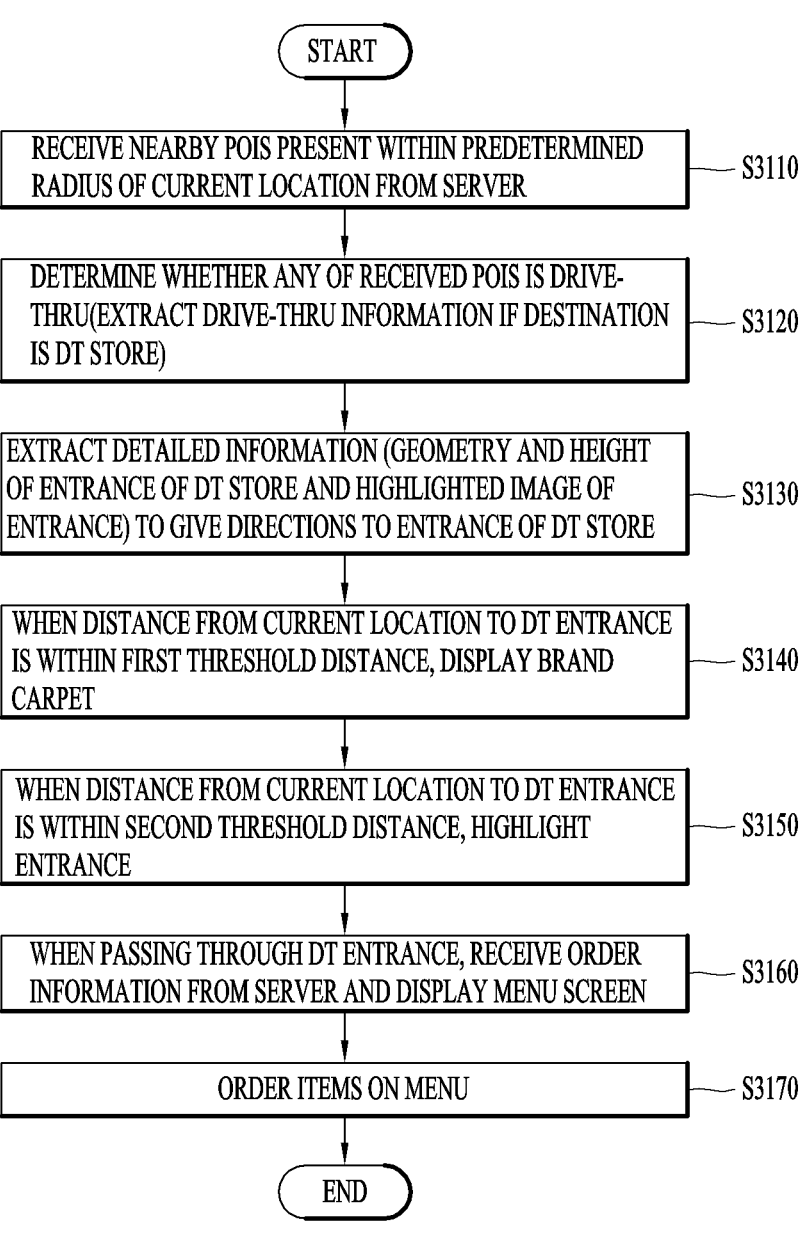

START

RECEIVE NEARBY POIS PRESENT WITHIN PREDETERMINED RADIUS OF CURRENT LOCATION FROM SERVER — S3110

DETERMINE WHETHER ANY OF RECEIVED POIS IS DRIVE-THRU(EXTRACT DRIVE-THRU INFORMATION IF DESTINATION IS DT STORE) — S3120

EXTRACT DETAILED INFORMATION (GEOMETRY AND HEIGHT OF ENTRANCE OF DT STORE AND HIGHLIGHTED IMAGE OF ENTRANCE) TO GIVE DIRECTIONS TO ENTRANCE OF DT STORE — S3130

WHEN DISTANCE FROM CURRENT LOCATION TO DT ENTRANCE IS WITHIN FIRST THRESHOLD DISTANCE, DISPLAY BRAND CARPET — S3140

WHEN DISTANCE FROM CURRENT LOCATION TO DT ENTRANCE IS WITHIN SECOND THRESHOLD DISTANCE, HIGHLIGHT ENTRANCE — S3150

WHEN PASSING THROUGH DT ENTRANCE, RECEIVE ORDER INFORMATION FROM SERVER AND DISPLAY MENU SCREEN — S3160

ORDER ITEMS ON MENU — S3170

END

FIG. 32
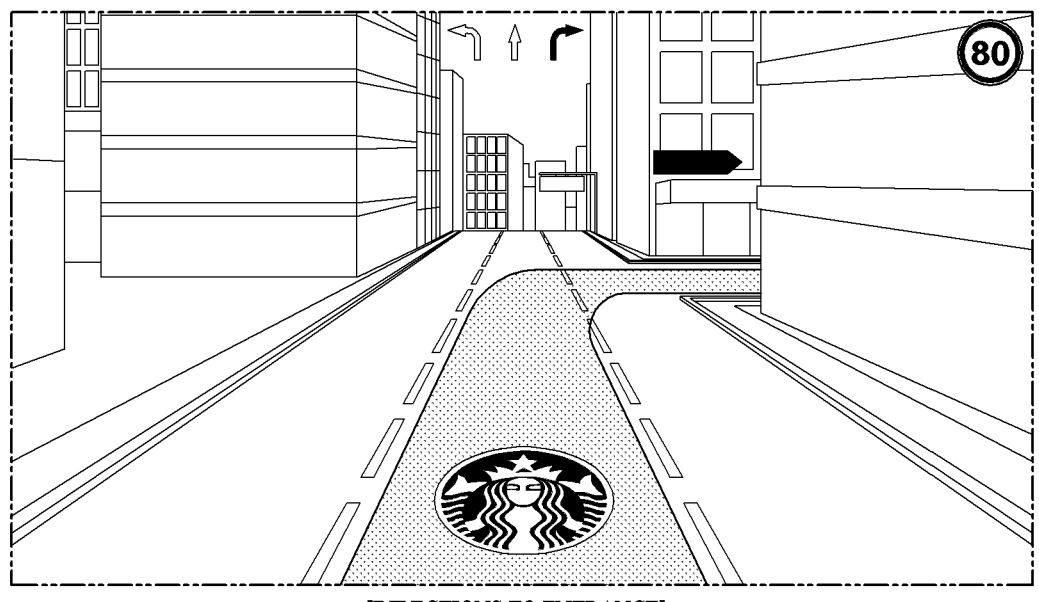
[DIRECTIONS TO ENTRANCE]
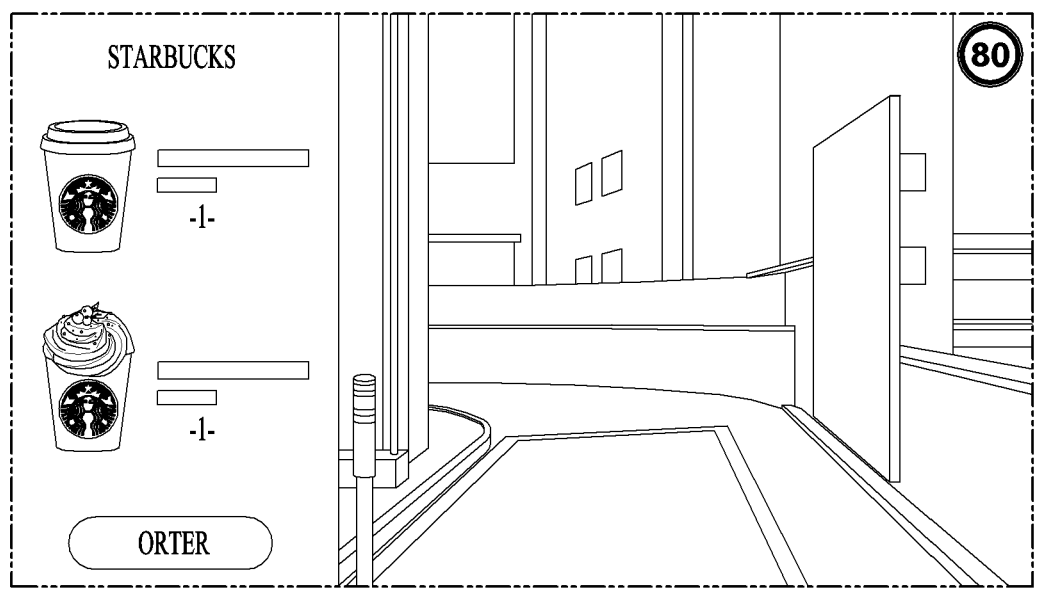
[ORDER AND PAYMENT]

[DIRECTIONS TO ENTRANCE]

[ORDER AND PAYMENT]

FIG. 37
(a)
GUIDE NAVIGATION TO NEARBY PARKING LOT
2 PARKING LOTS AVAILABLE
I'll GO TO THE NEAREST PLACE
THE DESTINATION HAS BEEN SET TO THE SELECTED LOCATION
(b)
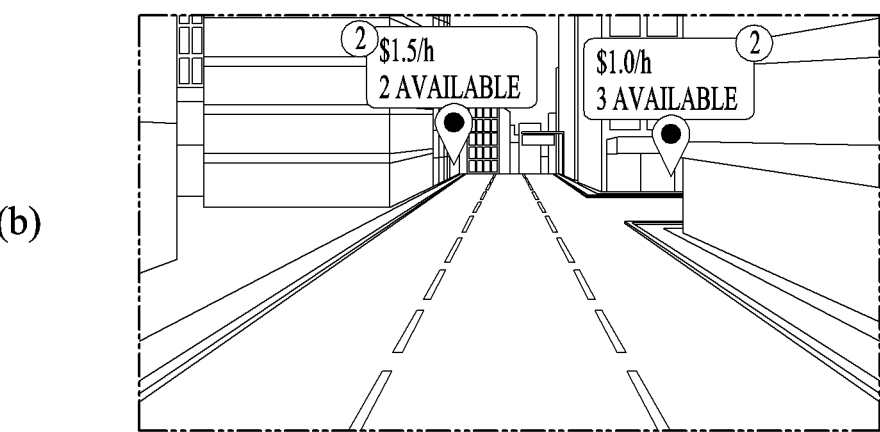
(c)
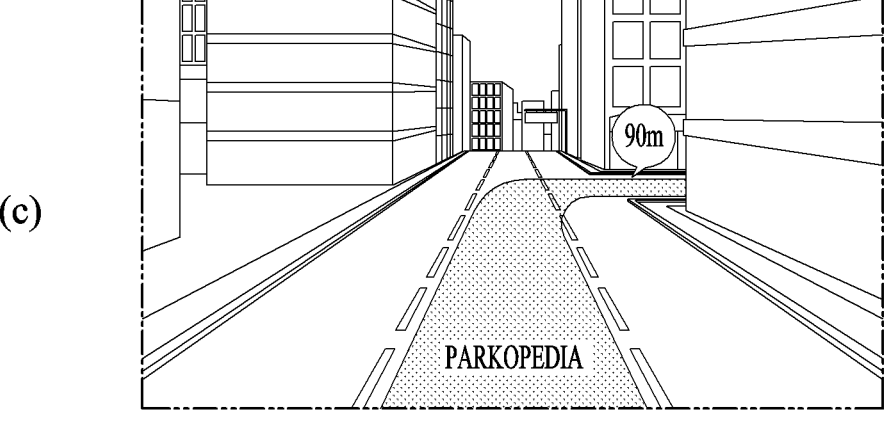

FIG. 38
(a)
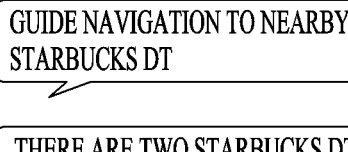
GUIDE NAVIGATION TO NEARBY STARBUCKS DT
THERE ARE TWO STARBUCKS DTs NEARBY
I'll GO TO THE FIRST DT
THE DESTINATION HAS BEEN SET TO THE SELECTED LOCATION
(b)
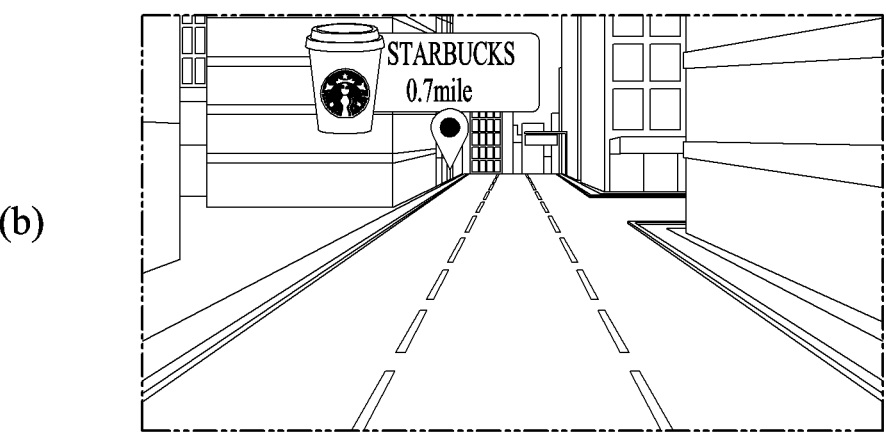
(c)
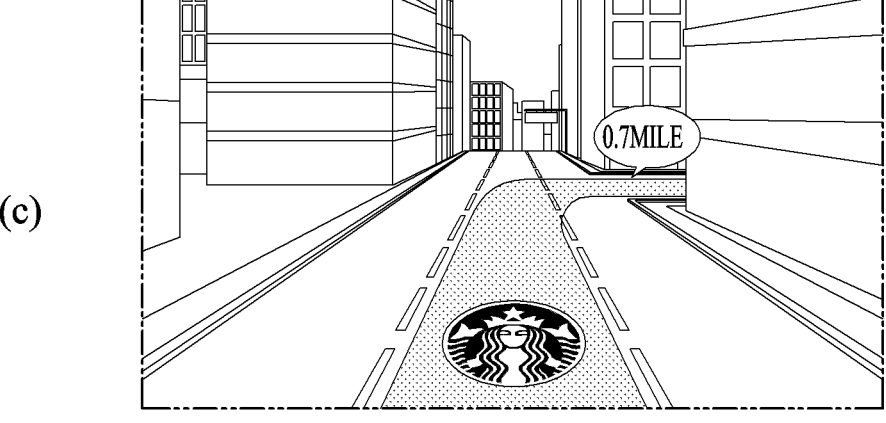

SET POSITION BY AR
SERVICE DEVICE ITSELF
BASED ON NUMBER OF
FLOORS AND OFFSET DATA

SET ORIGIN
COORDINATES

BLUE BOTTLE

STARBUCKS

ORIGIN

DIRECTION OF TRAVEL
OF VEHICLE

SET POSITION BY AR SERVICE DEVICE ITSELF BASED ON NUMBER OF FLOORS AND OFFSET DATA

SET ORIGIN COORDINATES

BLUE BOTTLE

McDonald's

STARBUCKS

SPECIFY ORIGIN COORDINATES BY RECOGNIZING BUILDING EDGE

DIRECTION OF TRAVEL OF VEHICLE

FIG. 44

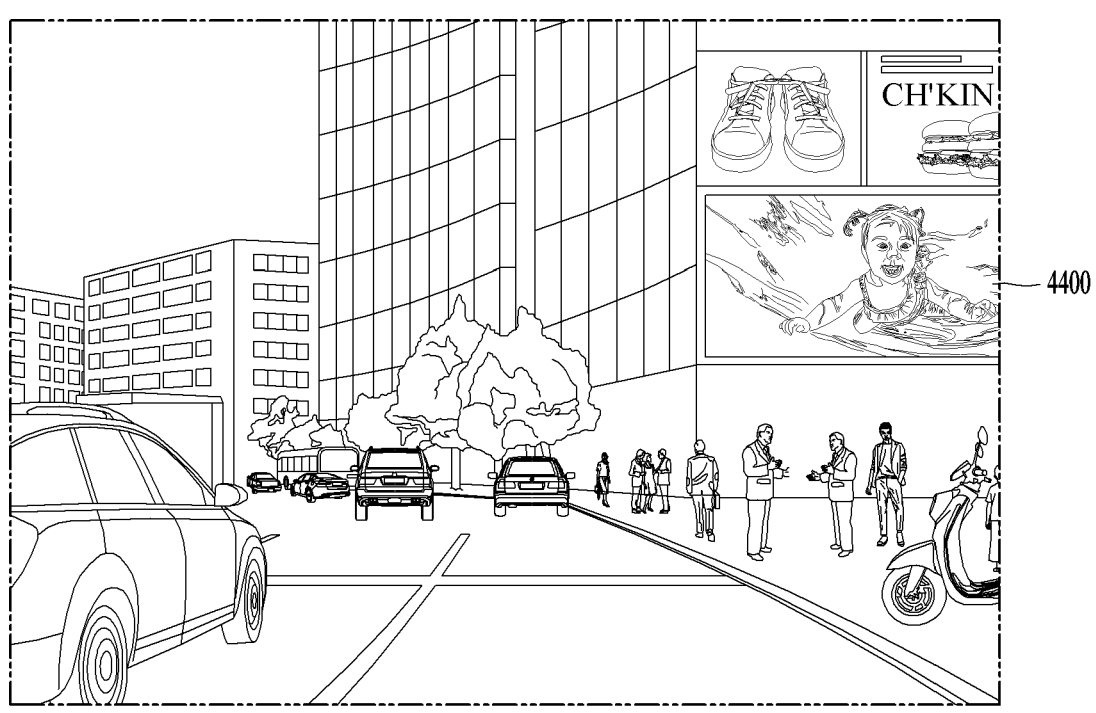

CH'KIN

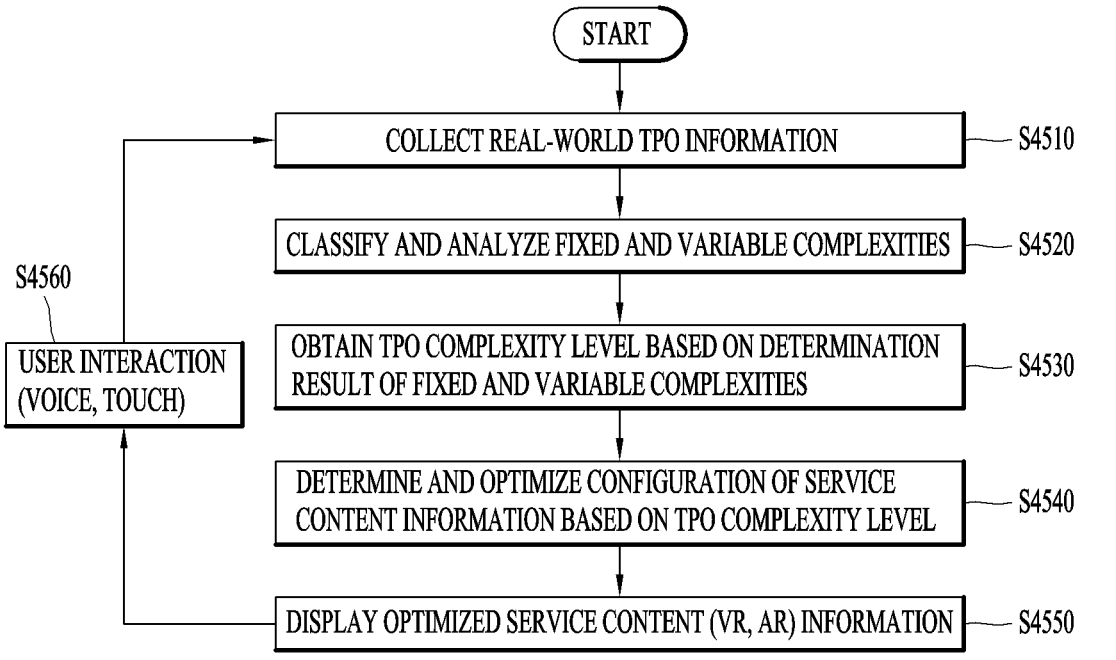

START

COLLECT REAL-WORLD TPO INFORMATION — S4510

CLASSIFY AND ANALYZE FIXED AND VARIABLE COMPLEXITIES — S4520

OBTAIN TPO COMPLEXITY LEVEL BASED ON DETERMINATION RESULT OF FIXED AND VARIABLE COMPLEXITIES — S4530

DETERMINE AND OPTIMIZE CONFIGURATION OF SERVICE CONTENT INFORMATION BASED ON TPO COMPLEXITY LEVEL — S4540

DISPLAY OPTIMIZED SERVICE CONTENT (VR, AR) INFORMATION — S4550

S4560

USER INTERACTION (VOICE, TOUCH)

[TPO COMPLEXITY-HIGH]

[TPO COMPLEXITY-LOW]

AR SERVICE PLATFORM FOR PROVIDING AUGMENTED REALITY SERVICE

CROSS REFERENCE TO RELATED APPLICATIONS

This application is the National Phase of PCT International Application No. PCT/KR2022/000561, filed on Jan. 12, 2022, which claims priority under 35 U.S.C. 119 (a) to Patent Application No. 10-2021-0004116, filed in the Republic of Korea on Jan. 12, 2021, all of which are hereby expressly incorporated by reference into the present application.

TECHNICAL FIELD

The present disclosure relates to an augmented reality (AR) service platform for providing an augmented reality service.

BACKGROUND ART

A vehicle is an apparatus that moves in a direction desired by a user riding therein. A representative example of a vehicle may be an automobile.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

Recently, the development of UI/UX and services that help drive vehicles using augmented reality (hereinafter, AR) technology is actively underway.

The use of augmented reality technology offers the advantages of providing various information required to drive vehicles based on actual real-world situations and also providing vehicle passengers with information and content from various fields as well as driving information.

DISCLOSURE OF INVENTION

Technical Problem

An aspect of the present disclosure is to provide an AR service platform for providing an optimized augmented reality service during vehicle driving.

Another aspect of the present disclosure is to provide an AR service platform capable of providing an augmented AR service depending on a situation a vehicle is in.

The tasks to be solved in the present disclosure may not be limited to the aforementioned, and other problems to be solved by the present disclosure will be obviously understood by a person skilled in the art based on the following description.

Solution to Problem

To achieve these and other advantages and in accordance with the purpose of the present invention, as embodied and broadly described herein, there is provided an augmented reality (AR) service platform that includes a server disposed outside a vehicle and configured to collect and process information necessary for the AR service and transmit the information to the vehicle, and an AR service device disposed in the vehicle and configured to provide the AR service using the information transmitted from the server, wherein the server includes a time place occasion (TPO)

complexity level calculation module configured to calculate a TPO complexity level of the real world and determine an amount of information to be transmitted to the AR service device using the calculated complexity level.

In an embodiment disclosed herein, the TPO complexity level calculation module collects the TPO information of the real world from the AR service device, and calculates a fixed complexity and a variable complexity based on the collected TPO information.

In an embodiment disclosed herein, the TPO complexity level calculation module calculates the TPO complexity level based on the fixed complexity and variable complexity.

In an embodiment disclosed herein, the TPO complexity level calculation module varies at least one of a type of information and an amount of information to be transmitted to the AR service device, based on the calculated TPO complexity level.

In an embodiment disclosed herein, the TPO complexity level calculation module establishes a display policy for an AR object to be output through the AR service device, based on the calculated TPO complexity level.

In an embodiment disclosed herein, the display policy includes setting values for at least one of type, amount of information, location, and display time related to the AR object.

In an embodiment disclosed herein, the TPO complexity level calculation module processes the AR object to be transmitted to the AR service device to comply with the display policy.

In an embodiment disclosed herein, the TPO complexity level calculation module processes information received from an external service server based on the display policy and transmits the processed information to the AR service device.

In an embodiment disclosed herein, the TPO complexity level calculation module transmits information related to the calculated TPO complexity level to the AR service device, and establishes the display policy for the AR object to be output through the AR service based on the received information related to the TPO complexity level.

In an embodiment disclosed herein, the AR service device provides the AR service by processing the AR object to comply with the display policy, and overlaying the processed AR object onto an image captured by a camera of the vehicle.

Details of other embodiments are included in the detailed description and drawings.

Advantageous Effects of Invention

According to an embodiment of the present disclosure, one or more of the following advantages may be provided.

First, according to the present disclosure, an AR service platform that provides an AR service optimized for a vehicle passenger can be provided.

Second, according to the present disclosure, a new AR service platform that is capable of dynamically adjusting information and an amount of information to be displayed in AR depending on a situation the vehicle is in and selecting data to be accentuated.

Third, according to the present disclosure, an AR service platform that is capable of providing an AR service optimized according to complexity by varying a display policy of an AR object depending on TPO complexity can be provided.

The effects of the present disclosure are not limited to those effects mentioned above, and other effects not mentioned may be clearly understood by those skilled in the art from the description of the appended claims.

BRIEF DESCRIPTION OF DRAWINGS

FIG. 9 is a conceptual view illustrating an AR service platform according to the present disclosure.

FIG. 11, FIG. 12, FIG. 13, FIG. 14, FIG. 15 and FIG. 16 are flowcharts and conceptual views for explaining the control method described with reference to FIG. 10.

FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37 and FIG. 38 are flowcharts and conceptual views for explaining various methods of providing an AR service by an AR service platform according to the present disclosure.

FIG. 39, FIG. 40, FIG. 41, FIG. 42, FIG. 43 and FIG. 44 are conceptual views for explaining a method in which an AR service platform of the present disclosure displays an AR object on a building by using an AR wall.

FIG. 45 is a flowchart illustrating a method for providing an AR service according to a TPO complexity level of the present disclosure.

FIGS. 46, 47, 48, 49 and 50 are conceptual views illustrating the control method illustrated in FIG. 45.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment disclosed herein may be understood as a conception including cars, motorcycles and the like. Hereinafter, the vehicle will be described based on a car.

The vehicle may include any of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
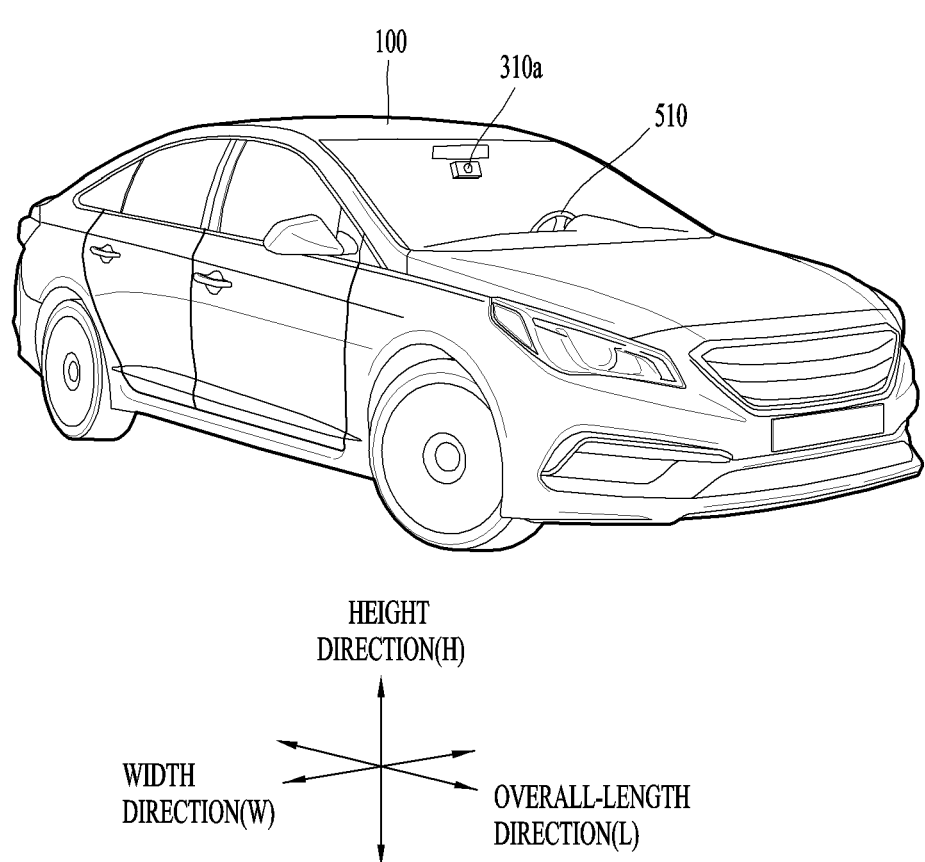
FIG. 1 is a view illustrating appearance of a vehicle in accordance with an embodiment.

FIG. 1 is a view illustrating appearance of a vehicle in accordance with an embodiment.

Figure 2:
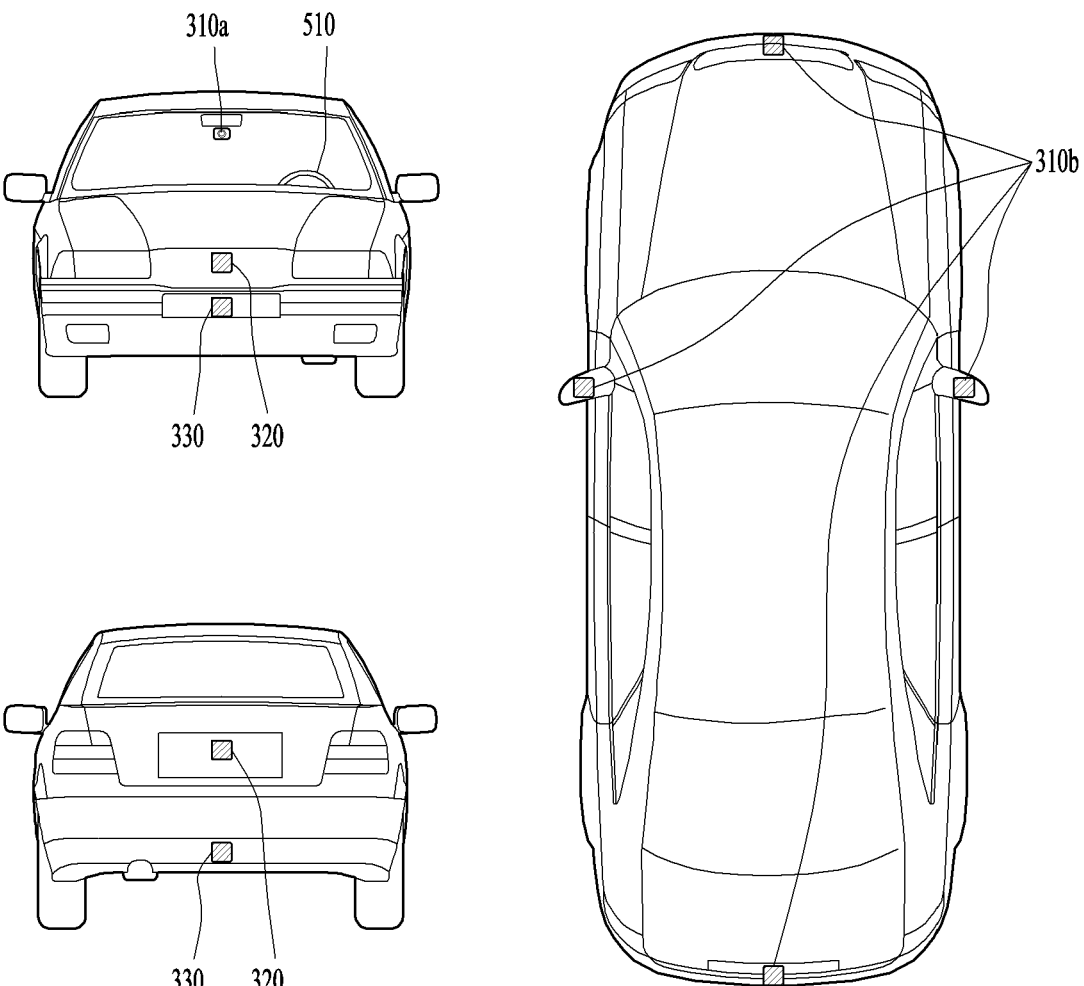
FIG. 2 is a diagram illustrating appearance of a vehicle at various angles in accordance with an embodiment.

FIG. 2 is a diagram illustrating appearance of a vehicle at various angles in accordance with an embodiment.

Figure 3:
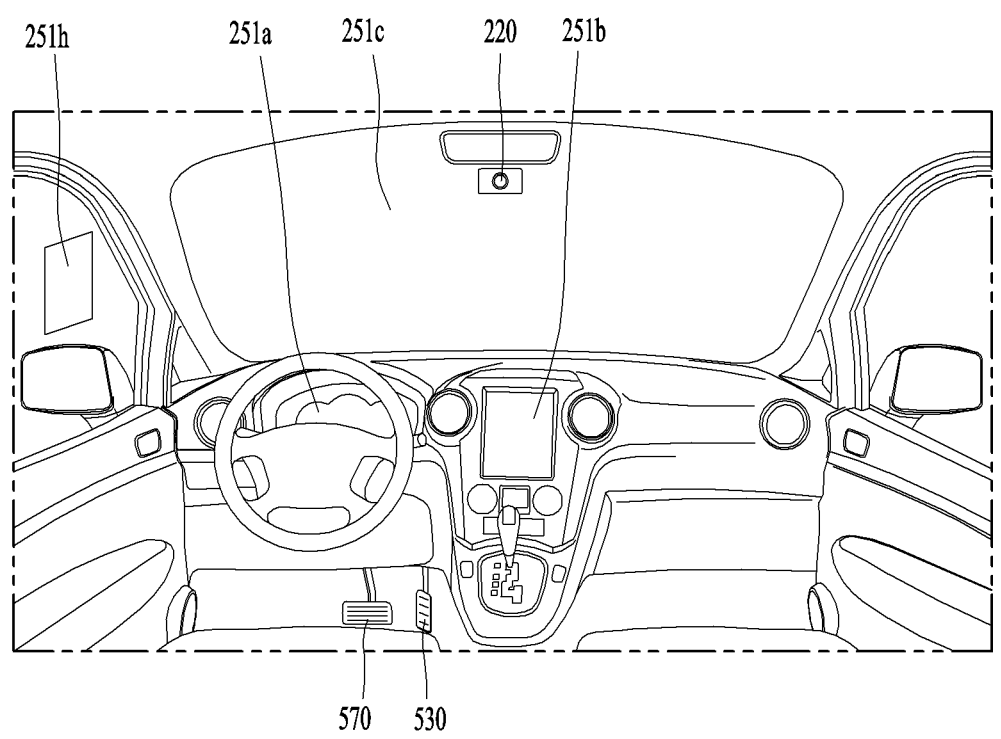
FIGS. 3 and 4 are diagrams illustrating an inside of a vehicle in accordance with an embodiment.
Figure 4:
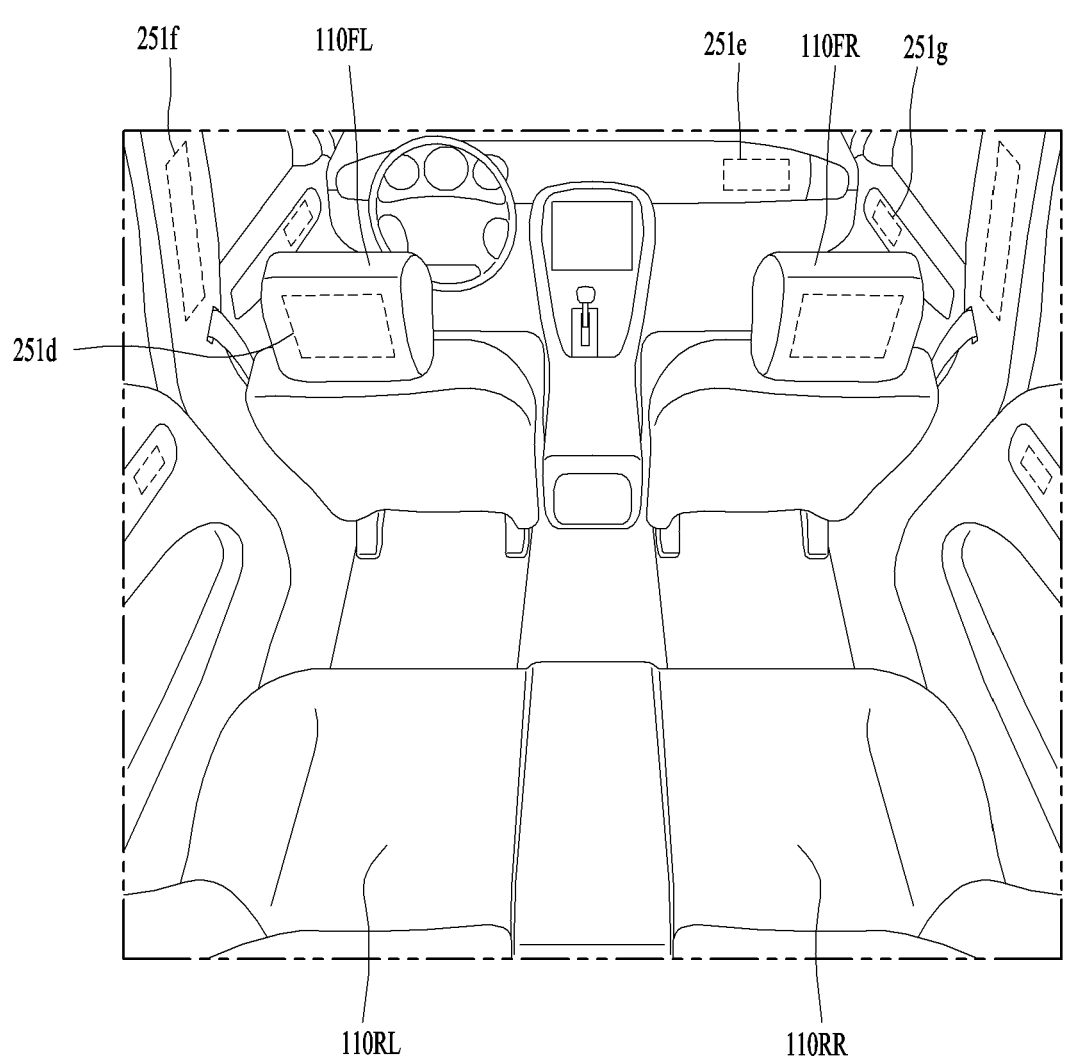

FIGS. 3 and 4 are diagrams illustrating an inside of a vehicle in accordance with an embodiment.

Figure 5:
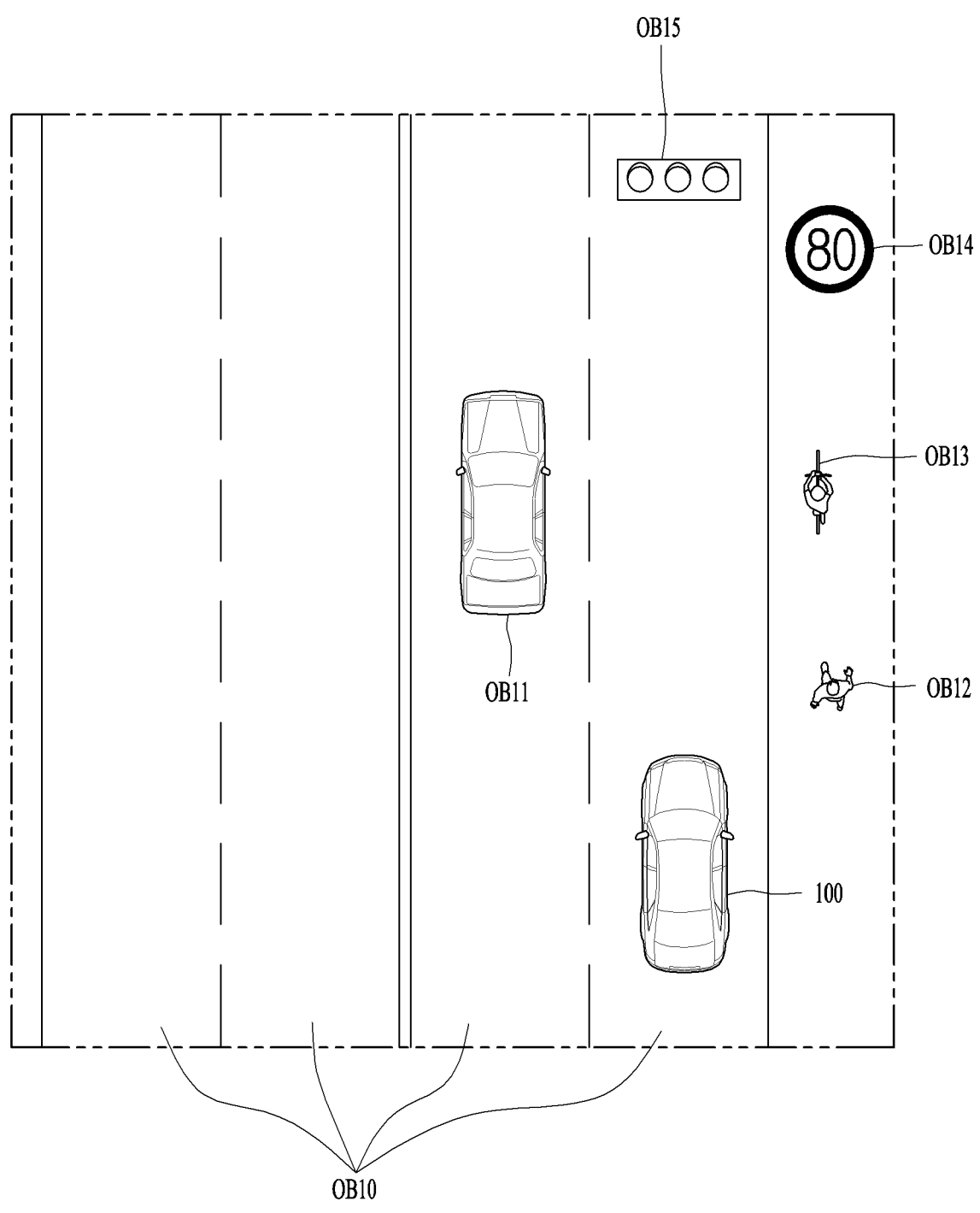
FIGS. 5 and 6 are diagrams referenced to describe objects in accordance with an embodiment.
Figure 6:
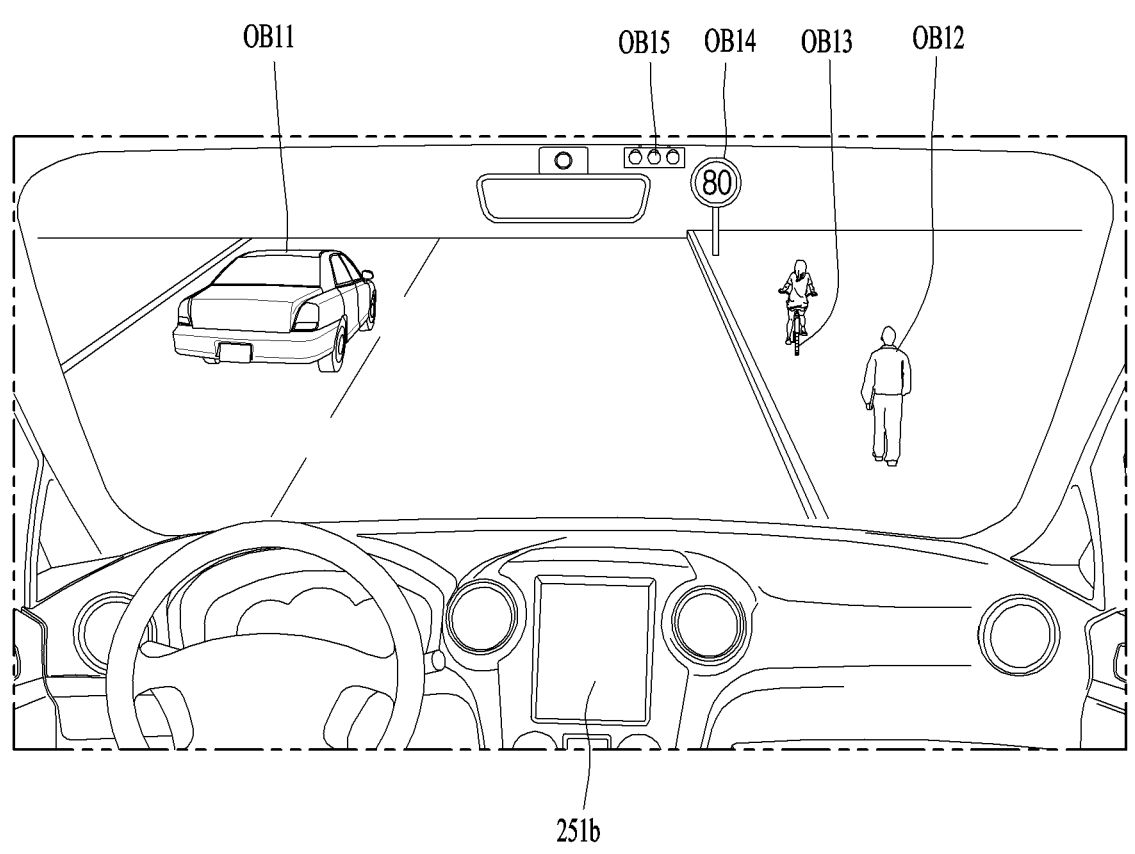

FIGS. 5 and 6 are diagrams referenced to describe objects in accordance with an embodiment.

Figure 7:
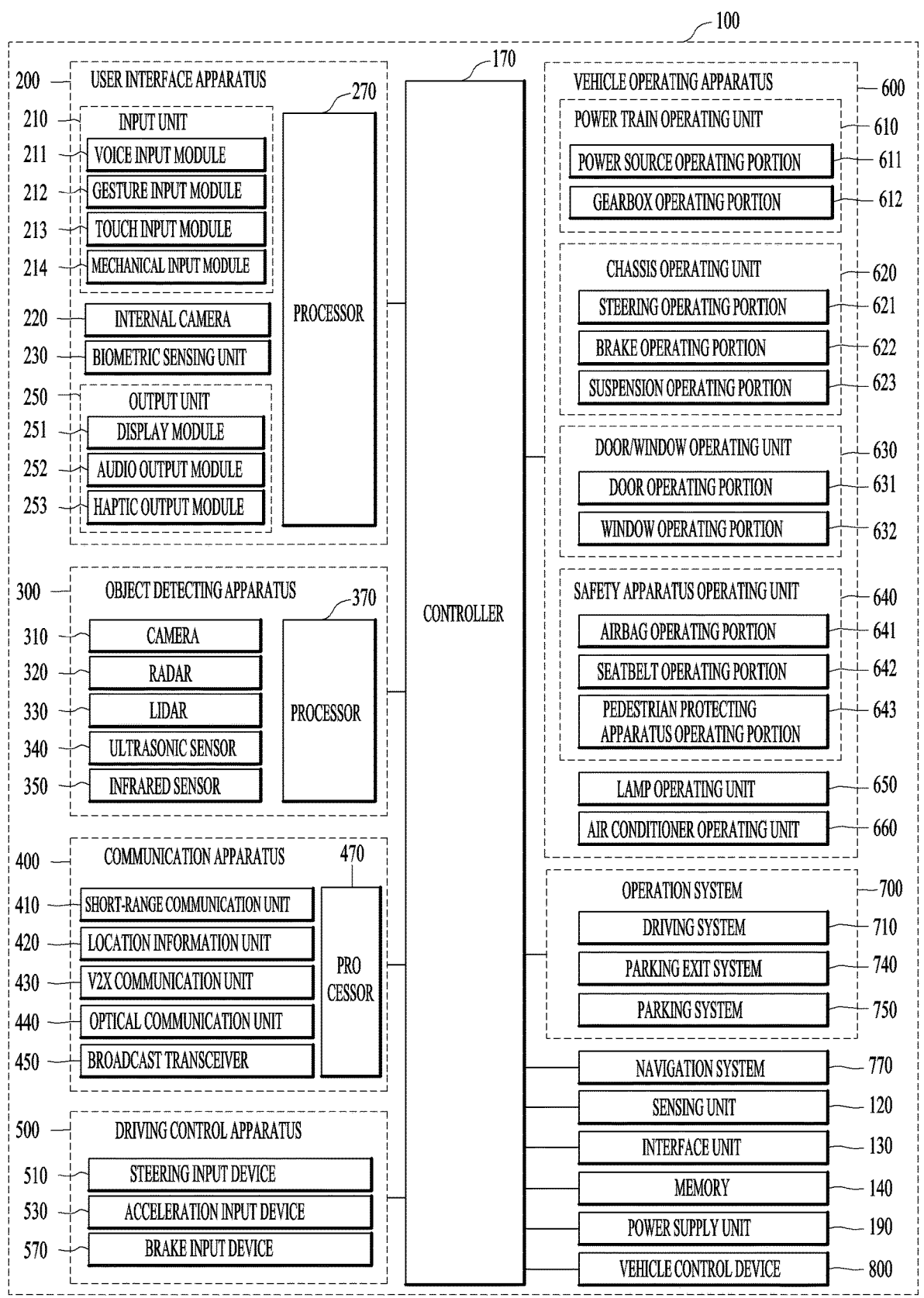
FIG. 7 is a block diagram referenced to describe a vehicle in accordance with an embodiment.

FIG. 7 is a block diagram referenced to describe a vehicle in accordance with an embodiment of the present disclosure.

As illustrated in FIG. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be switched from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the vehicle 100 may be driven based on an operation system 700.

For example, the vehicle 100 may be driven based on information, data or signal generated in a driving system 710, a parking exit system 740 and a parking system 750.

When the vehicle 100 is driven in the manual mode, the vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to some embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

In some embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to some embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible, or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251 b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may include another vehicle or a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350, and a processor 370.

In some embodiments, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk, or a tail gate.

For example, the camera 310 may be disposed adjacent to at least one of side windows within the vehicle to acquire a side image of the vehicle. Or, the camera 310 may be disposed adjacent to a side mirror, a fender, or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear, or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TPO manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear, or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

In some embodiments, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some embodiments, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some embodiments, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. In some embodiments, the steering input device may also be configured in a shape of a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad, or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque, and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

In some embodiments, the operation system 700 may further include other components in addition to components to be described, or may not include some of the components to be described.

Meanwhile, the operation system 700 may include at least one processor. Each unit of the operation system 700 may individually include a processor.

In some embodiments, the operation system may be implemented by the controller 170 when it is implemented in a software configuration.

In some embodiments, the operation system 700 may be implemented by at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some embodiments, the navigation system 770 may update prestored information by receiving information from an external device through the communication apparatus 400.

In some embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive, and the like in a hardware configuration. The memory 140 may store various data for overall operations of the vehicle 100, such as programs for processing or controlling the controller 170.

In some embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 related to the present disclosure may include an AR service device 800.

The AR service device 800 is capable of controlling at least one of the components described with reference to FIG. 7. From this point of view, the AR service device 800 may be the controller 170.

The AR service device 800 is not limited to this, but may be a separate component from the controller 170. If the AR service device 800 is implemented as a separate component from the controller 170, the AR service device 800 may be provided on a part of the vehicle 100.

The AR service device 800 described in this specification may include all kinds of devices capable of controlling vehicles—for example, a mobile terminal. If the AR service device 800 is a mobile terminal, the mobile terminal and the vehicle 100 may be connected to enable communication via wired/wireless communication. Also, the mobile terminal may control the vehicle 100 in various ways, while being connected for communication.

If the AR service device 800 is a mobile terminal, the processor 870 described in this specification may be a controller of the mobile terminal.

For convenience of explanation, the AR service device 800 will now be described as a separate component from the controller 170. Functions (operations) and a control method to be described with respect to the AR service device 800 in this specification may be carried out by the controller 170 of the vehicle. That is, everything that is described with respect to the AR service device 800 may equally or similarly apply to the controller 170 through analogy.

Moreover, the AR service device 800 described in this specification may include the components described with reference to FIG. 7 and part of various components provided in the vehicle. In this specification, for convenience of explanation, the components described with reference to FIG. 7 and the various components provided in the vehicle will be denoted by specific names and reference numerals.

Hereinafter, components included in the AR service device 800 according to an embodiment of the present disclosure will be described in more detail with reference to the accompanying drawings.

Figure 8:
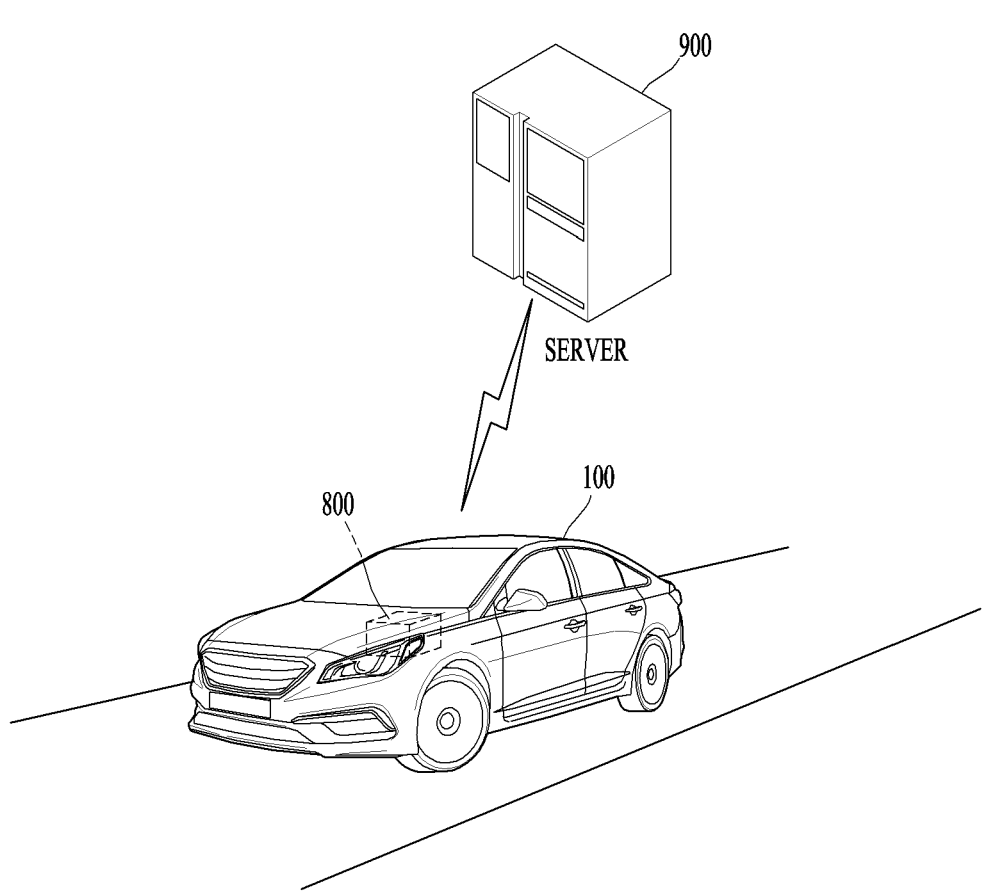
FIG. 8 is a conceptual view illustrating a system for providing an AR service according to the present disclosure.

FIG. 8 is a conceptual view illustrating a system for providing an AR service according to the present disclosure.

An AR service platform for providing an AR service according to an embodiment of the present disclosure may include a server 900, a vehicle 100 configured to communicate with the server, and an AR service device 800 provided in the vehicle.

The AR service device 800 may be provided in the vehicle 100, sends and receive data by communicating with electrical components provided in the vehicle described with reference to FIG. 7, and control the electrical components provided in the vehicle.

The server 900 may include a cloud server for providing an AR service, perform data communication with at least one vehicle, receive information from vehicles regarding a situation they are in, and send information required for the AR service to a vehicle capable of communication.

The vehicle 100 may include the AR service device 800. The AR service device 800 may be understood as a component of the vehicle 100, configured to be attachable to and detachable from the vehicle, and have an interface unit (not shown) for communicating with or controlling the electrical parts provided in the vehicle.

If the server 900 sends data or certain information to the vehicle, it may mean that the certain data or the certain information is sent to the AR service device 800.

Figure 9:
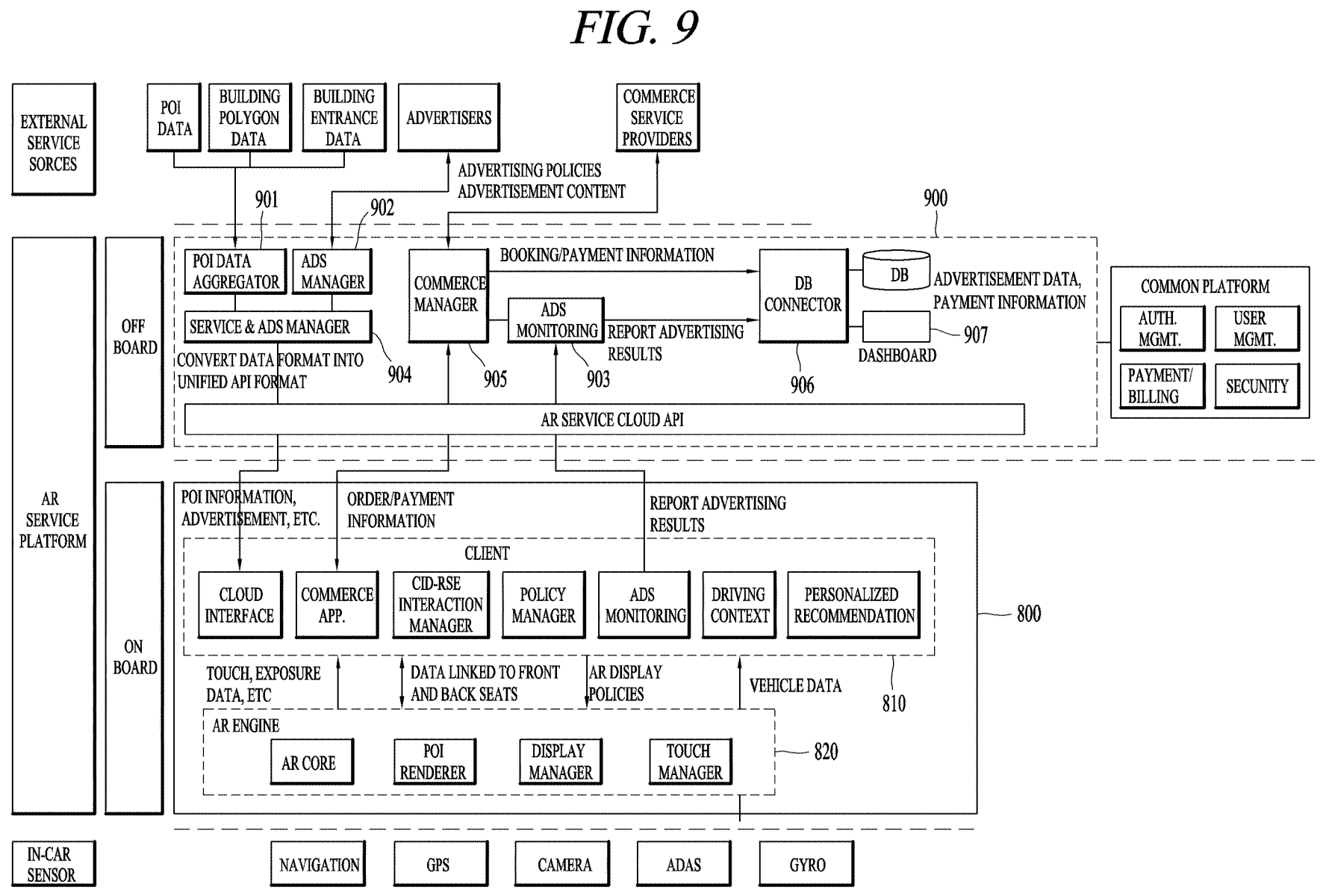

FIG. 9 is a conceptual view illustrating an AR service platform according to the present disclosure.

An AR service platform for providing an AR service according to the present disclosure may be called an AR service system.

The AR service platform may include a server 900 located outside of a vehicle, for collecting and processing information required for the AR service and sending the same to the vehicle, and an AR service platform 800 located in the vehicle, for providing the AR service using the information sent from the server.

If the server 900 collects and processes information required for the AR service and sends it to the vehicle, it may mean that the server 900 collects and processes information required for the AR service and sends it to the AR service device 800 provided in the vehicle.

The AR service device 800 may vary information provided as the AR service based on a situation the vehicle is in.

That is, the AR service device 800 of the present disclosure may dynamically adjust (vary) the information to be displayed as AR and the amount of information depending on the situation the vehicle is in and select what information to emphasize.

Moreover, the AR service platform of the present disclosure may control the AR service provided in the vehicle to differ depending on specific conditions such as the situation the vehicle is in, advertising exposure conditions, and so forth.

Conventional AR navigation systems have issues with reflecting latest information and are unable to provide a POI containing real-time properties such as a gas station or a parking lot, because they use information stored in map data when displaying a destination or a major point of interest (POI).

On the other hand, the AR service platform of the present disclosure may merge location information of the vehicle, map information, data from a plurality of sensors, real-time POI information, advertisement/event information, and so on and display them on an AR navigation system.

For example, in order to display AR information, the AR service device 800 of the present disclosure may receive AR service information from the server based on a current location of the vehicle and navigation route/guidance information and process it into a form in which it is displayed on the screen of the AR navigation system.

For example, the AR service device 800 of the present disclosure may reconfigure real-time AR display information. The AR service device 800 may determine the display format, size, position, and method of exposure to AR content based on the driving situation and reconfigure service data received from the server such that it is displayed on the screen of the AR navigation system (e.g., the display position and size of a POI may vary with traveling speed, the display position of service information may change depending on the traffic situation, and the display position and display time of an AR wall may be adjusted).

Moreover, the AR service device 800 of the present disclosure may analyze the frequency of exposure to AR display information through user feedback.

The server 900 may collect user input information (input information such as touch, order, etc.) on AR service content, perform an analysis of the frequency of content exposure, and adjust service content exposure policies based on that information.

With this configuration, the present disclosure is capable of merging various external service content and rendering it on the AR navigation system, and may provide various services through POI information containing real-time properties.

In addition, the present disclosure is capable of displaying various forms of AR content such as advertisements, events, major landmark information, etc.

Furthermore, the user may have a new experience of the AR navigation through an UX scenario-based embodiment proposed in the present disclosure.

The present disclosure may provide a service platform structure for dynamically adjusting the amount of information (POI data and advertisements) to be displayed with AR depending on the situation the vehicle is in and advertising exposure conditions, an AR information display method (UX), a module for collecting POI information and commerce service information for AR rendering and processing them into a form that allows for easy rendering in an AR engine, a module for processing specific POI information in an emphatic manner depending on the situation inside/outside of the vehicle, a module for collecting vehicle situation information and applying UX policies depending on the situation, and an AR engine module for rendering AR objects (group POIs, mini POIs, 3D objects, event walls, etc.) according to the UX policies.

Furthermore, the present disclosure may provide a client module for sending and receiving interactions and data between displays on front and back seats of the vehicle, a service app module for exposing to commerce service information linked to POIs, a client module for collecting user actions on ads such as results of exposure to AR advertisement objects, clicks, and so on, and a cloud module for collecting/analyzing user actions on ads such as results of exposure to AR advertisement objects, clicks, and so on.

Referring to FIG. 9, the AR service platform of the present disclosure may include a server 900 which is an off-board component located on the outside of the vehicle, and an AR service device 800 which is an on-board component provided in the vehicle.

First, the server 900 may include a POI data aggregator 901, an advertisement manager (Ads manager) 902, an advertisement monitoring unit (Ads monitoring unit) 903, a service and advertisement manager (service & Ads management) 904, a commerce manager 905, a database (DB) connector 906, and a dashboard 907.

The POI data aggregator 901 may receive information required for an AR service from a plurality of external servers and convert/aggregate it in a message format for the AR service platform.

The advertisement manager 902 may perform advertisement data/content management and advertising campaign (advertising exposure conditions) management.

The advertisement monitoring unit 903 may collect/store results of clicks on and exposure to ads.

The service and advertisement manager 904 may insert advertisement data that meets exposure conditions into service information and provide it to a client.

The commerce manager 905 may collect commerce service link/payment information.

The DB connector 906 may store/query advertisement content, information on advertising exposure results, and commerce payment information.

The dashboard 907 may display a current status of a real-time AR service which visualizes advertising exposure results/payment details.

Moreover, the server 900 may further include an AR service cloud API (or a data converter) for converting information sent from the AR service device 800 of the vehicle into a data format available on the server and for converting information processed/generated by the server into a data format available on the AR service device 800.

Meanwhile, the AR service device 800 may include a client 810 including a cloud interface, a commerce app, a CID-RSE interaction manager, a policy manager, advertisement monitoring, driving context, personalized recommendations, and so on, and an AR engine 820 including a POI renderer, a display manager, a touch manager, and so on.

The client 810 may receive POI information, advertisements, etc. from the server.

Moreover, the client 810 may send and receive order/payment information to and from the server 900, and transmit advertising exposure results to the server 900.

The AR engine 820 may send data to the client 810, such as the number of touches on an AR object outputted to (rendered in) AR, the number of exposures to the AR object, and so on.

In addition, the AR engine 820 may send and receive data linked to the front/back seats (CID, RSE) to and from the client 810, and output (render) an AR object according to AR display policies received from the client 810.

Furthermore, the AR engine 820 may determine the type of an AR object provided through the AR service, the display position of the AR object, the type of a POI for the AR object, the display size of the AR object.

The AR service device 800 which is on-board the vehicle may render service content in AR so that data sent from the cloud server is displayed in AR on a front camera image.

Furthermore, the AR service device 800 may relay data between the server and the AR engine, including collecting advertisement posting result data and forwarding it to the server.

Furthermore, the AR service device 800 may link AR-generated data between the CID and the RSE (i.e., the front and back seats).

Furthermore, the AR service device 800 may perform data management on the AR display policies. Specifically, it may provide AR display policy data for a driving situation to the AR engine.

Furthermore, the AR service device 800 may provide a situation awareness and personalization service. Specifically, it may provide an AR object to the AR engine depending on driving conditions (speed, TBT (turn-by-turn, etc.) using in-vehicle data.

In this specification, a description will be given with an example in which an AR service is provided by overlaying AR information (or an AR object, AR content, POI information, etc.) onto an image captured (received or processed) by a camera provided in the vehicle and displaying it.

However, the AR service described in this specification is not limited to this, but may equally or similarly apply to various methods of implementing augmented reality through analogy, including displaying AR information directly on the vehicle's windshield so that the driver or the passenger is able to see it overlaid in a real-world space or displaying AR information through a head-up display (HUD).

Input data (input information) used to provide the AR service and output data (output information) provided through the AR service platform are as follows.

First, types of input data may include map information (navigation information), service content information (POIs, advertisements, etc.), dynamic information, vehicle sensor information, historical information, and driving-related information.

The map information (navigation information) may include information on a route to a destination (navigation route), guidance information (turn-by-turn), the shape of a road/lane ahead, information on a plurality of map properties (properties by road type, width of a road and lane, curvature, gradient, speed limit, etc.), and information on localization objects (road markings, traffic signs, etc.).

The service content information (POIs, advertisements, etc.) may include POI information received from a plurality of service providers, advertisement data to be provided at a current location, and real-time information for booking and payment services like gas stations, charging stations, and parking lots.

The dynamic information may include traffic information (traffic by road and traffic by lane), event information (accidents, hazard warnings, etc.), weather information, and V2X (V2V, V2I) (vehicle to everything, vehicle to vehicle, and vehicle to infra).

The vehicle sensor information may include current location information (GPS/DR), camera input information (ADAS information and object recognition information), and V2X (real-time surroundings information collected through V2V and V2I).

The historical information may include past driving routes, a traffic history (e.g., traffic volume by time of day), and communication speeds by zone and time of day).

The driving-related information may include driving modes (manual, autonomous driving, semi-autonomous driving, and whether ADAS is on or off), whether the vehicle is getting near to a destination or a transit point), and whether the vehicle is getting near to a parking lot.

The output information to be provided through the AR service platform may include current location/route-based AR service display data.

The current location/route-based AR service display data may include points (AR walls and POI building highlights) on a route where AR advertisements can be displayed, information on selectable AR buildings (information on selectable major buildings such as landmarks), general POI information (POI summary information such as icons or speech bubbles), far POI information (indications of distances/directions to important POIs that do not appear on the route but are helpful when driving), indication information to be displayed when there a plurality of POIs in the same building, information on a destination building and real-time status of a parking lot, real-time status information of a gas station/charging station, and location-based advertisement/event information.

The AR service platform of the present disclosure may filter AR service information through real-time information and determine how to display the same.

Specifically, the AR service platform may determine the number of real-time exposures to a POI based on traveling speed, whether to remove overlapping POIs, whether to adjust POI size, and how long a POI will be exposed.

Moreover, the AR service platform may determine how to expose POIs based on risk information awareness. Specifically, it may dynamically change the method of displaying POIs based on the awareness of an accident, a construction site, and multiple moving objects.

In addition, the AR service platform may dynamically change the display positions of POIs if there is a decrease in AR display visibility due to traffic.

Furthermore, the AR service platform may reconfigure AR display data for the front and back seats. For example, it may reconfigure AR display data in such a way as to show as little AR service information as possible on a front seat display and as much information as possible on a back seat display, by taking into account traveling speed, risk information, weather information, etc.

An operation, functional, and control method for such an AR service platform may be implemented by a server or AR service device included in the AR service platform, or may be implemented by organic interactions between the server and the AR service device.

Referring to FIG. 9, a configuration of the server 900 of the AR service platform will be described below in more detail.

The service & ads manager 904 may perform a client request function, a POI data and advertisement data aggregation (data processing & aggregation) function, and a client respond function.

Specifically, the client request function may include requesting/receiving POI data (location, category) through a unified API or requesting/receiving destination entrance location data (selecting one among destination coordinates, address, and ID) through the unified API.

Here, the unified API refers to an API defined by an AR service cloud having no dependency on a particular data provider (to minimize changes on the client).

The POI data and advertisement data aggregation (data processing & aggregation) function may include aggregating POI data and advertisement data within a radius of 000 m from a location requested by a client (from a data manager or an ads manager) or aggregating the location of an entrance of a destination requested by the client and POI advertisement data (from a data manager or an ads manager).

Specifically, the POI data and advertisement data aggregation function may include merging advertisement data containing building wall and event wall data and POI data, or filtering a plurality of POIs in the same building in an order of priority set by the server (e.g., excluding POI data except partner companies).

Here, filtering criteria may include assigning priority scores to POIs and comparing them with each other.

The client respond function may include sending POI data and advertisement data through a unified API or sending destination entrance location data and advertisement data through the unified API.

A data manager (not shown) included in the server 900 may include a POI data collection/forwarding function, a building shape (polygon) data collection/forwarding function, and a destination entrance data collection/forwarding function.

The POI data collection/forwarding function may request POI data through a 3rd party API or forward POI information received through a 3rd party API to a service & ads aggregator (by converting it into a unified API response format).

The building shape (polygon) data collection/forwarding function may request building exterior shape data through a 3rd party API/data set or forwarding POI data received through a 3rd party API to the service & ads aggregator (by converting it into a unified API response format).

The destination entrance data collection/forwarding function may request destination entrance information through a 3rd party API or forwarding destination entrance information received through a 3rd party API to (the service & ads aggregator (by converting it into a unified API response format).

The ads manager 902 may provide a partner (advertisement) management interface, a POI supporting advertisement format, an advertising campaign management interface, and an advertisement content management interface.

The ads monitoring unit 903 may perform a function of receiving feedback on measurements of advertising effectiveness and a function of forwarding advertisement data.

The partner (advertisement) management interface may perform POI advertiser management (adding/modifying/deleting advertiser data) and general advertiser management (adding/modifying/deleting advertiser data).

The POI supporting advertisement format may include a brand POI pin, a building wall, 3D rendering, and an event wall, and an advertisement format supporting advertisements of brands (e.g., Coca-Cola ads) not related to actual POIs/locations may include an event wall.

The advertisement campaign management interface may perform the addition/modification/deletion of an advertising campaign (advertisement location, type, and time).

The advertisement content management interface may add, modify, look up, and delete content for each advertisement format (a POI brand icon image, a building wall image, an event wall image/video, and a 3D rendering image).

The function of receiving feedback on measurements of advertising effectiveness may include receiving feedback on exposures to advertisements sent by the client and forwarding it to a DB manager (CPC/CMP/CPT&P).

The advertisement data forwarding function may include a function of looking up advertising campaign data to be exposed within a radius of 000 m from a location requested by the service & ads aggregator and forwarding it (in the case of CPT & P, only advertisements meeting a time condition are forwarded).

The commerce manager 905 may perform a client link function, an external commerce service link function, and a payment information management function.

The client link function may include linking the client through a unified API to receive a request, converting a request received through the unified API into an external commerce API specification, and converting data received through an external API into a message format for the unified API and forwarding the data to the client.

The commerce manager may perform a function of converting a request received through a unified API into an external commerce API specification and then linking an external service based on the converted request.

Converting data received through an external API to a message format for the unified API may refer to converting data received from a linked external service into a unified API.

The external commerce service link function may include requesting a list of shops near a current location and metadata and receiving a result thereof, requesting detailed information on a particular shape in the above list and receiving results thereof, requesting a reservation/order and receiving a result thereof, requesting a service usage state and receiving a result thereof, and linking membership information of a commerce service and receiving a result thereof.

Here, the requesting of a service usage state and the receiving of a result thereof may be used for a purpose of sequence management based on the service usage state (booking completed/driving into a parking lot/parked/driving out of the parking lot/booking cancelled) and for a purpose of AR message popup.

The linking of membership information of a service and the receiving of a result thereof may be used to link information between commerce service user and AR service user.

The payment information management function may include collecting payment details (statements, amounts) and charging external commerce service provider fees based on the payment details.

The DB connector 906 may perform an advertising effectiveness measurement data management function, a commerce data management function, an advertiser data management function, an advertisement content data management function, and an advertisement location data management function.

The advertising effectiveness measurement data management function may store and delete log data related to CPC/CPM/CPT&P and look up data (by POI, brand, time of day, and advertisement type).

The commerce data management function may store and delete details of payment for an external commerce service and look up data (by POI, brand, time of day, and advertisement type).

The advertiser data management function may store, modify, delete, and look up advertiser data and advertising campaign settings for each advertiser.

The advertisement content data management function may store, modify, delete, and look up advertisement content by linking with advertiser data.

The advertisement location data management function may manage the coordinates of an event wall area or building wall (by brand) where an AR advertisement is to be displayed, which may be divided into coordinates registered directly by a user and particular coordinates obtained by API links.

The service dashboard 907 may perform an advertising effectiveness measurement data visualization function and a commerce service data visualization function.

The advertising effectiveness measurement data visualization function may provide a CPC chart showing total clicks on ads for each company/brand (searchable by period), a CPC chart showing a total number of clicks on all ads (searchable by period), a CPM chart showing a total number of exposures to all ads (searchable by period), a CPT & P chart showing clicks on ads from each company/brand (searchable by period), and a CPT & P chart showing the number of exposures to ads for each company/brand (searchable by period).

These charts may be provided in various ways, including a bar graph, a line graph, a pie chart, a word graph, and a geospatial graph.

CPT & P may be used as data for measuring exposure effects although it is calculated on a cost-per-time basis, not based on the number of clocks or the number of exposures.

The commerce service data visualization function may provide a chart showing a cumulative sum of payments to each company (searchable by period) and a chart showing a total cumulative sum of payments (searchable by period).

Hereinafter, an embodiment related to various AR services that can be provided through an AR service platform according to an embodiment of the present disclosure will be described in more detail with reference to the accompanying drawings.

An operation, functional, and control method performed by the AR service device 800 may be understood as being performed by the client 810 or AR engine 820 of the AR service device.

The AR service device 800 may vary information provided for an AR service, based on conditions of the vehicle.

The conditions of the vehicle may include various situations such as the traveling speed of the vehicle, the driving direction of the vehicle, the road where the vehicle is driving, the area where the vehicle is driving (whether it is a downtown or a highway), surrounding objects (other vehicles, pedestrians, two-wheel vehicles, etc.), weather, environments, vehicle driving information, and so on.

Vehicle driving information includes vehicle information and surrounding information related to the vehicle. Information related to the inside of the vehicle with respect to a frame of the vehicle may be defined as the vehicle information, and information related to the outside of the vehicle may be defined as the surrounding information.

The vehicle information refers to information related to the vehicle itself. For example, the vehicle information may include a traveling speed, a traveling direction, an acceleration, an angular velocity, a location (GPS), a weight, a number of passengers on board the vehicle, a braking force of the vehicle, a maximum braking force, air pressure of each wheel, a centrifugal force applied to the vehicle, a travel mode of the vehicle (autonomous travel mode or manual travel mode), a parking mode of the vehicle (autonomous parking mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a preceding (succeeding) vehicle, a relative speed of a preceding (succeeding) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may also include ambient brightness, temperature, a position of the sun, information related to a nearby subject (a person, another vehicle, a sign, etc.), a type of a driving road surface, a landmark, line information, and driving lane information, and information required for an autonomous travel/autonomous parking/automatic parking/manual parking mode.

In addition, the surrounding information may further include a distance from an object existing around the vehicle to the vehicle, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle.

Specifically, the AR service device 800 may provide the AR service by rendering the information sent from the server 900 to be displayed in augmented reality and overlaying the rendered information onto an image captured by a camera provided in the vehicle.

The AR service device 800 may display the image on a display provided in the vehicle, with the information sent from the server 900 overlaid onto the image.

The AR service device 800 may receive information related to the situation the vehicle is in from the vehicle, and request the server information required to provide the AR service and receive the same, based on the received information related to the situation the vehicle is in.

The information related to the situation the vehicle is in may include the above-mentioned information indicating the situation the vehicle is in.

Specifically, the AR service device 800 may determine the current location of the vehicle and the traveling speed of the vehicle, based on the information related to the situation the vehicle is in, and request the server information required to provide the AR service at a next location for navigation, based on the determined current location of the vehicle and the determined traveling speed of the vehicle.

The AR service device 800 may include an AR engine 820 which overlays an AR object of information required to provide the AR service onto the image, based on map information and an image received through the camera.

The AR engine 820 may determine which POI in the image the AR object is to be overlaid onto, based on the type of the AR object.

Specifically, the AR engine 820 may overlay the AR object onto the image in a preset manner, based on the information related to the situation the vehicle is in.

Figure 10:
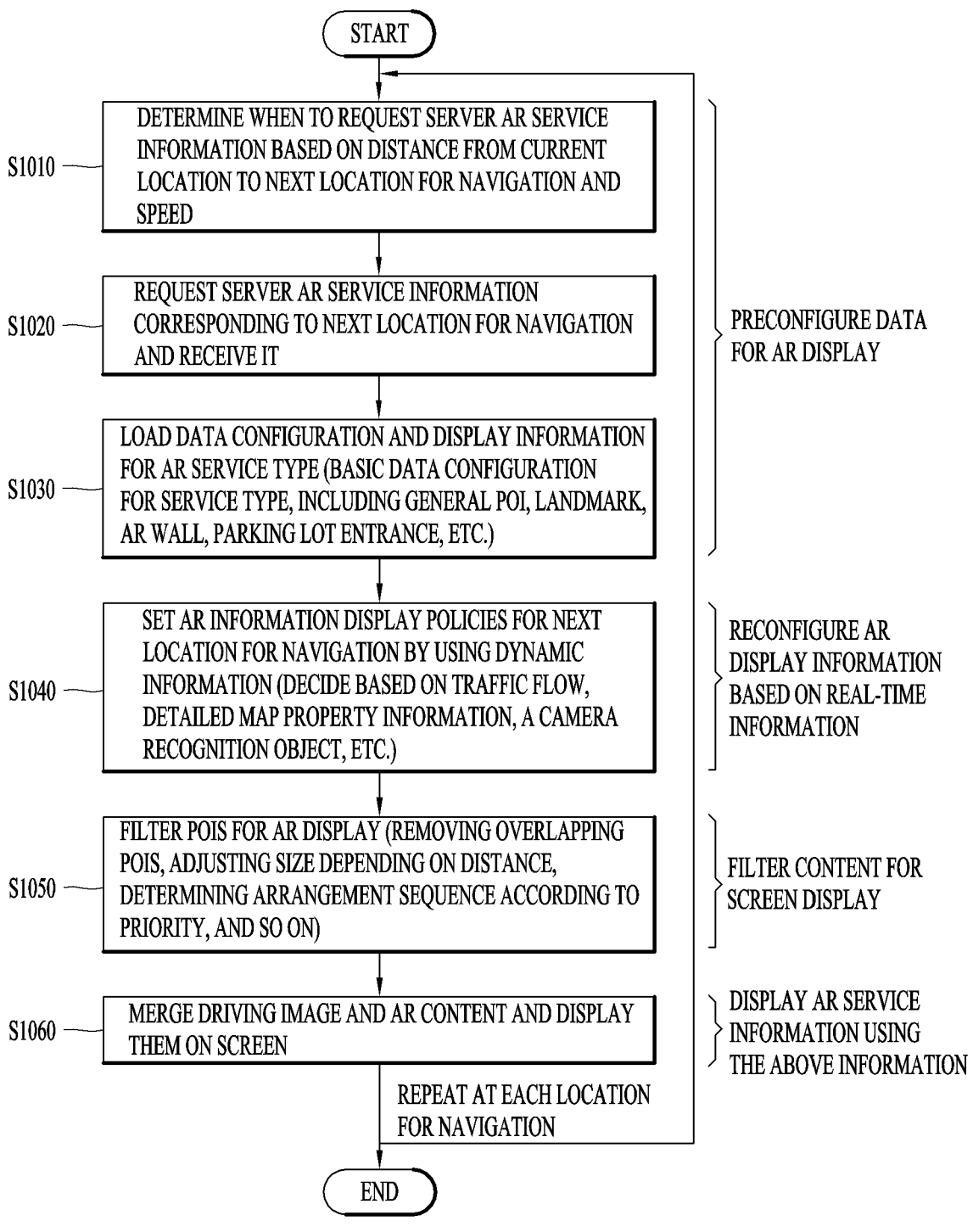
FIG. 10 is a flowchart illustrating a representative control method.

Referring to FIG. 10, the AR service device 800 may determine when to request the server 900 AR service information based on the distance from the current location to the next location for navigation and the speed (S1010).

The AR service device 800 may request the server 900 AR service information corresponding to the next location for navigation and receive it (S1020).

The AR service device 800 may load data configuration and display information for an AR service type from the memory DB (S1030).

Here, the AR service type may include general POI, landmark, AR wall, parking lot entrance, etc., and the display information may be determined according to a basic data configuration for the service type.

The AR service device 800 may set AR information display policies for the next location for navigation by using dynamic information (S1040).

In this case, the AR service device 800 may decide on AR information display policies for the next location for navigation based on traffic flow, detailed map property information, a camera recognition object, etc.

Afterwards, the AR service device 800 may filter POIs for AR display (S1050).

Here, the filtering may include removing overlapping POIs, adjusting size depending on distance, determining an arrangement sequence according to priority, and so on.

Afterwards, the AR service device 800 may merge (overlap) a driving image (i.e., an image captured by a camera) and AR content (i.e., an AR object) and display them on a screen (a display in the vehicle) (S1060).

The AR service device 800 may repeatedly perform the steps S1010 to S1060 at each location for navigation.

FIG. 11, FIG. 12, FIG. 13, FIG. 14, FIG. 15, and FIG. 16 are flowcharts and conceptual views for explaining the control method described with reference to FIG. 10.

Figure 11:
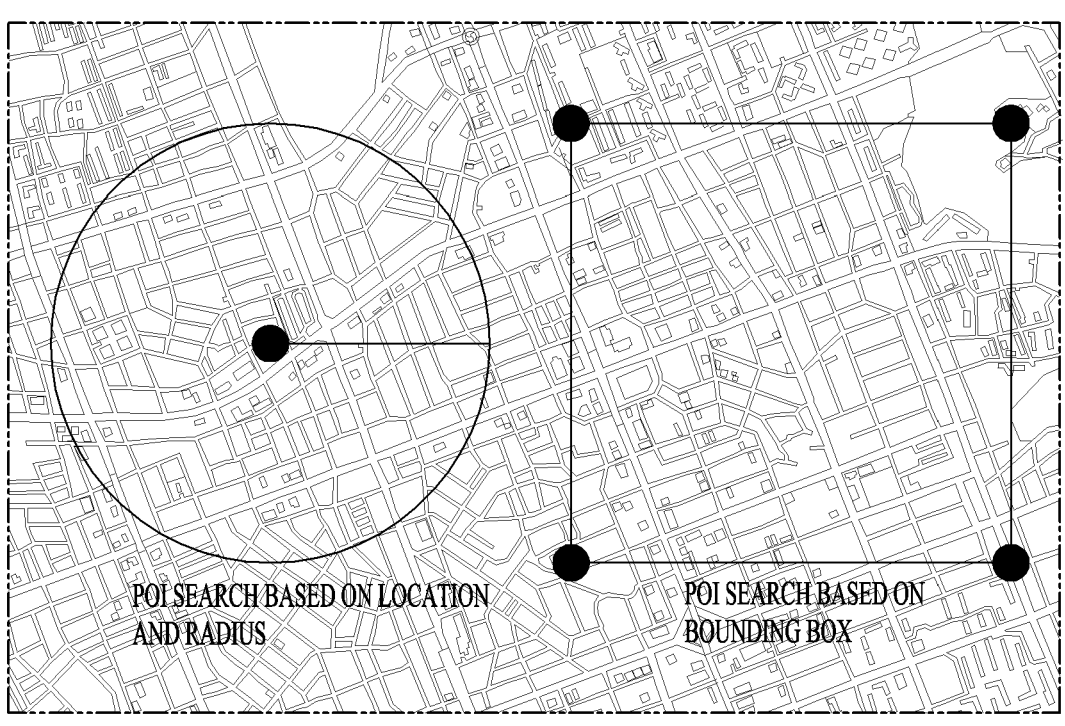

Referring to FIG. 11, the AR service device 800 of the present disclosure may receive current location information from the vehicle and request the server 900 information on POIs located within a predetermined radius of the current location.

Moreover, the AR service device 800 of the present disclosure may request the server 900 information on POIs present within a bounding box of a predetermined size, rather than within a predetermined radius of the current location.

Figure 12:
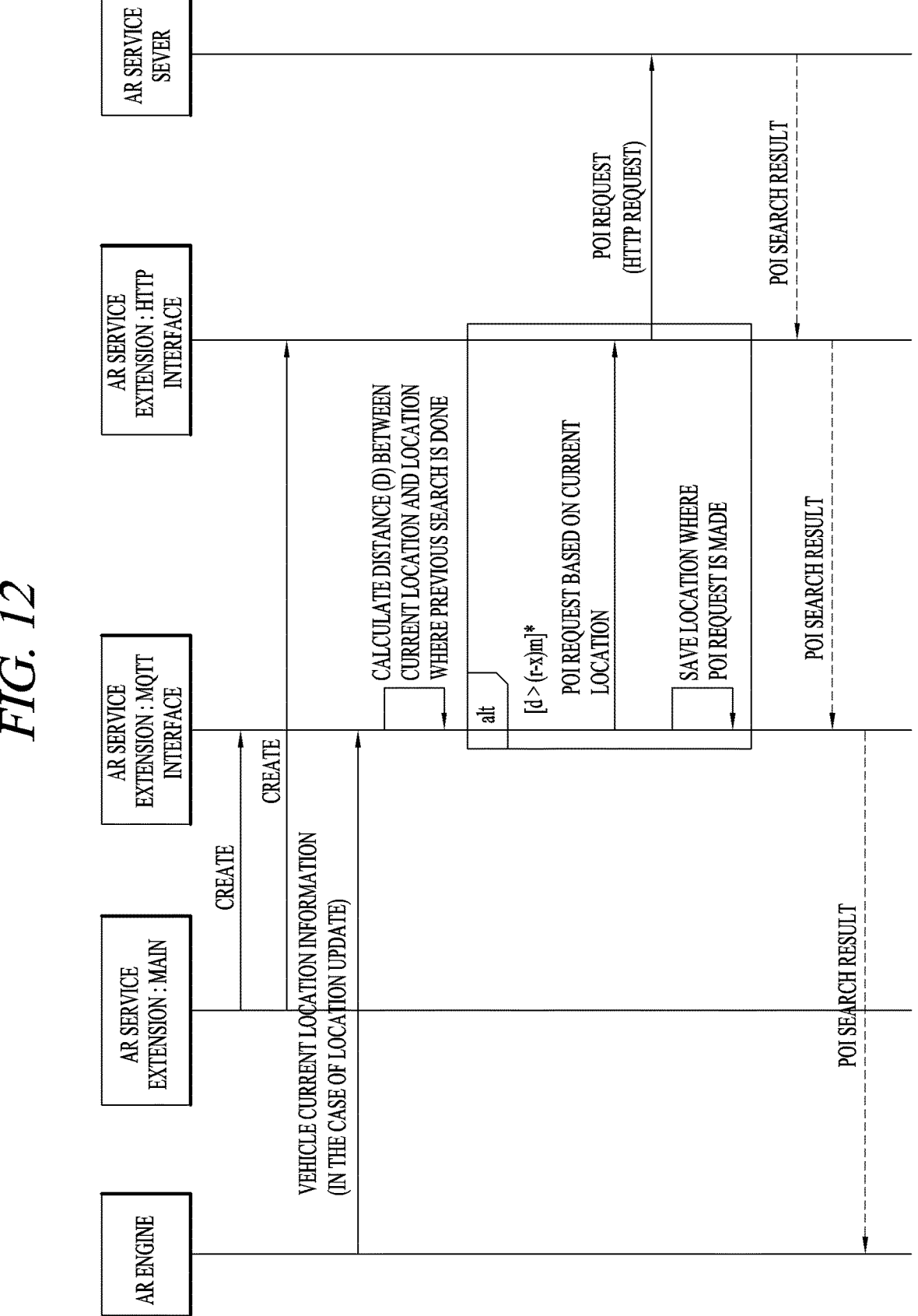

Referring to FIG. 12, the AR service device 800 may request the server nearby POIs within a radius of N km (N is a given real number) from the current location.

In this case, the AR service device 800 may monitor the distance between the current location and the location where a previous POI search request is made and request the server POI information in the event that the vehicle has driven a certain distance or farther.

A baseline radius for a POI request may be set to N km and be dynamically changed based on traveling speed.

In FIG. 12, d may represent the moving distance between the current location and the location where a previous search is done, r may represent a radius for POI search, and x may denote a distance buffer based on POI data request/download time (which may vary with speed).

Figure 13:
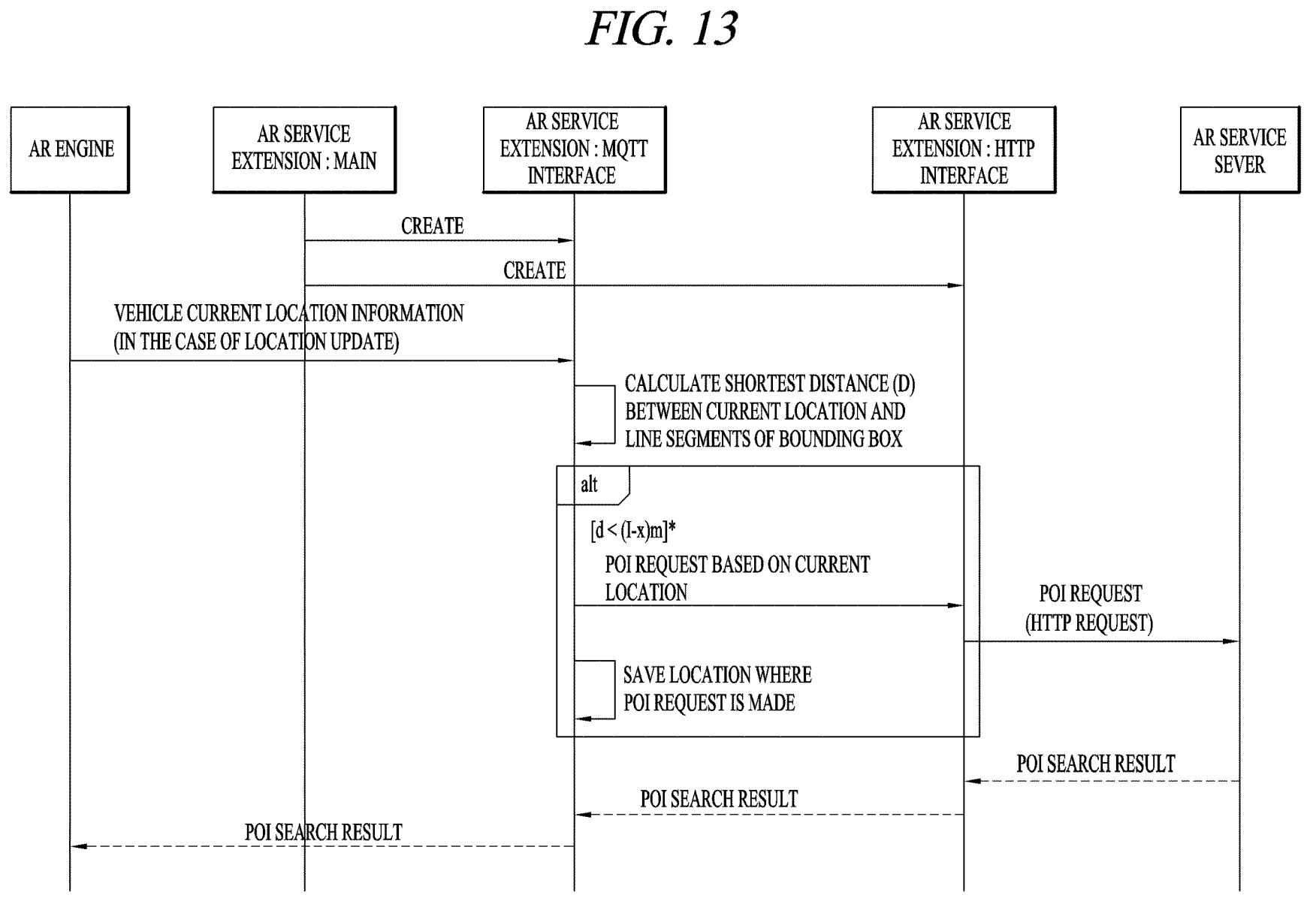

Referring to FIG. 13, the AR service device 800 may request the server 900 information on POIs present within a bounding box of N km from the current location.

Specifically, the AR service device 800 may monitor distance from the current location to four line segments of the bounding box and request the server POI information when the vehicle has approached within a certain distance from them.

Likewise, the line segments of the bounding box for a POI request may have a baseline length of N km, which may be dynamically changed based on traveling speed.

In FIG. 13, d may represent the shortest distance between the current location and the line segments of the bounding box, 1 may represent the length of the line segments of the bounding box, and x may represent a distance buffer based on POI data request/download time (which may vary with speed).

Figure 14:
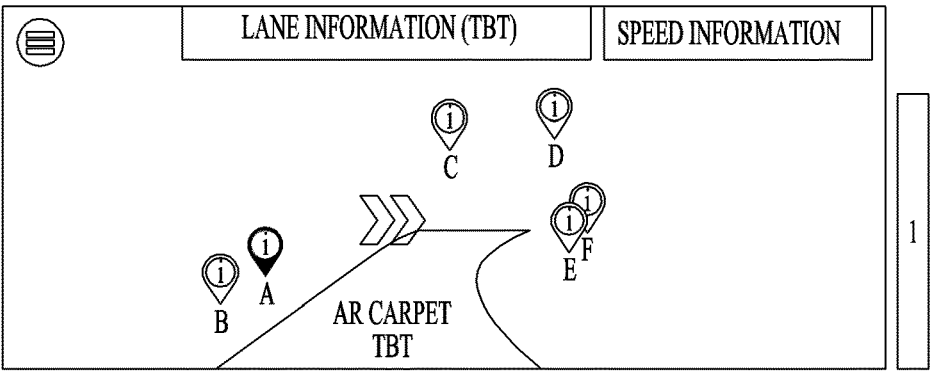

Referring to FIG. 14, the AR service device 800 overlay an AR object onto an image in a preset manner and display it, based on information related to a situation the vehicle is in.

For example, the AR service device 800 may overlay lane information, speed information, etc. onto a margin of the image which does not obstruct the driving view.

Moreover, a plurality of AR objects (A to F) indicating POIs and an AR carpet overlaid onto a vehicle lane that guide the vehicle along the path of travel may be overlaid onto an image captured by a camera in the vehicle, under control of the AR service device.

Figure 15:
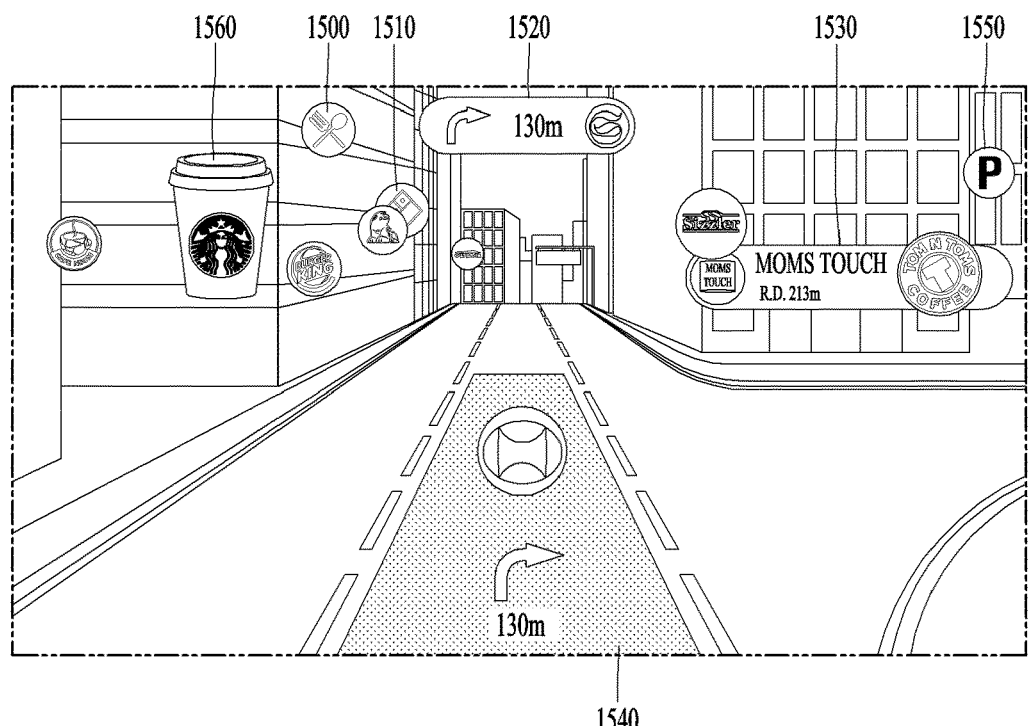

As illustrated in FIG. 15, the AR service device may apply the following display method, in order to effectively provide various POI information on an AR navigation screen.

For example, the AR service device 800 may display POIs present on the path of travel, among POIs present within a predetermined radius of the current location.

Moreover, the AR service device 800 may display POIs not present on the path of travel differently from general POIs by adjusting their size, transparency, etc.

Referring to FIG. 15, the AR service device 800 may overlay a plurality of types of AR objects on an image and display them.

The plurality of types of AR objects may include a group POI 150, a mini POI 1510, a far POI 1520, a bubble POI 1530, a brand carpet 1540, and a POI 1550 not present on the path of travel, and a 3D object 1560 of a POI nearest to the current location of all POIs present on the path of travel.

The group POI 1500 may be displayed as an icon of POIs that fall into the same category and the number of the POIs so that the driver can see it during high-speed driving.

The mini POI 1510 may be displayed as an icon of a POI at a corresponding position when driving the vehicle at a low speed or stopping the vehicle.

The far POI 1520 is not present in a screen display area, but POIs to be recommended to the user may be displayed as a direction/distance/icon.

The bubble POI 1530 may be displayed along with additional information, as is the case with a user's favorite POI or a gas station/parking lot.

The brand carpet 1540 may be displayed as an AR carpet along with a POI icon.

The POI 1550 not present on the path of travel may be displayed differently from a general POI in such a way that a POI present not on the path of travel but in the screen display area appears semi-transparent.

If there is 3D rendering information of the nearest POI to the current location of all POIs present on the path of travel, the 3D object 1560 may be displayed.

Figure 16:
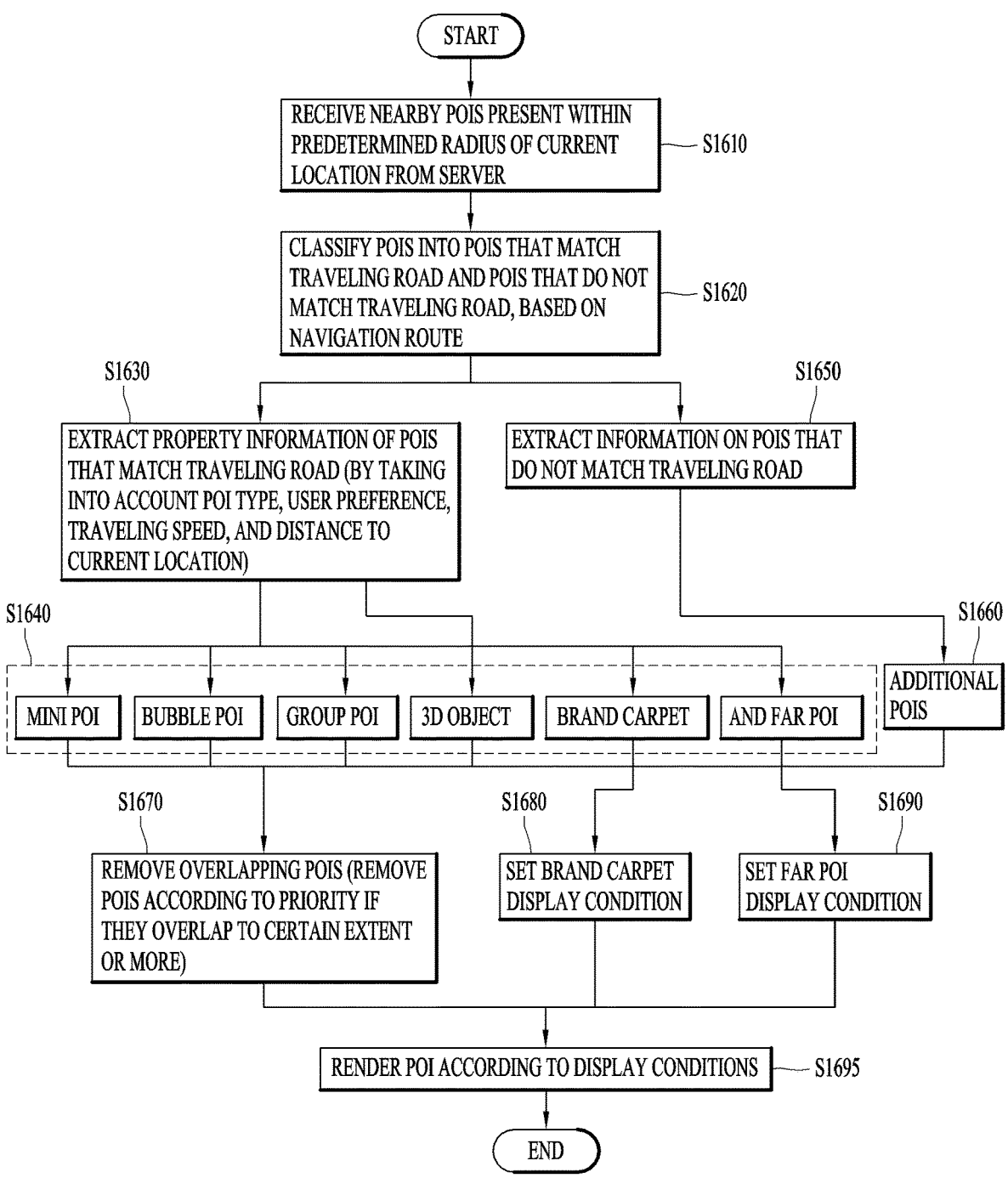

Referring to FIG. 16, the AR service device 800 may receive nearby POIs present within a predetermined radius of the current location from the server (S1610).

The AR service device 800 may classify the POIs into POIs that match a traveling road and POIs that do not match the traveling road, based on a navigation route (S1620).

The AR service may determine the types of AR objects to be displayed, based on property information of the POI that match the traveling road.

That is, the AR service may request the server information on POIs present within a predetermined radius of the current location, and receive the information on the POIs present within a predetermined radius of the current location from the server.

The AR service device may classify the POIs received from the server into POIs that match the traveling road and POIs that do not match the traveling road, based on a preset navigation route.

Afterwards, the AR service device 800 may extract property information of the POIs that match the traveling road (S1630). In this case, the AR service device 800 may take into account POI type, user preference, traveling speed, and distance to current location.

Thereafter, the AR service device 800 may determine the types of AR objects (for example, one of mini POI, bubble POI, group POI, 3D object, brand carpet, and far POI) (S1640).

That is, the AR service device 800 may determine the types of AR objects overlaid onto an image captured by a camera in the vehicle, based on the property information of the POIs that match the traveling road.

Here, the property information of the POIs that match the traveling road may refer to property information of POIs, if any, that match (are linked to) the road on which the vehicle is traveling so that the POIs are displayed as AR objects.

The property information of the POIs that match the traveling road may be managed by the server and updated by the AR service device provided in the vehicle.

The property information of the POIs that match the traveling road may include at least one of POI type, user preference, traveling speed, and distance from current location to POI.

Meanwhile, the AR service device 800 may extract information on the POIs that do not match the traveling road (S1650). Afterwards, the AR service device 800 may determine that POIs corresponding to the property information on the POIs that do not match the traveling road are additional POIs (S1660).

Afterwards, the AR service device 800 may remove overlapping POIs (S1670).

Specifically, if a plurality of POIs overlaps as viewed from the current location of the vehicle, the AR service device 800 may display a plurality of AR objects corresponding to the plurality of POIs based on a preset method.

For example, the AR service device 800 may remove overlapping POIs according to priority if they overlap to a certain extent or more.

The AR service device 800 may set a brand carpet display condition if it determines that the type of an AR object is a brand carpet (S1680).

Also, the AR service device 800 may set a far POI display condition if it determines that the type of an AR object is a far POI.

Afterwards, the AR service device 800 may render POIs (i.e., AR objects) according to display conditions (S1695) and overlay the rendered AR object onto an image and display it.

Hereinafter, various methods of displaying an AR object depending on a situation the vehicle is in will be described in more detail with reference to the accompanying drawings.

FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, and FIG. 38 are flowcharts and conceptual views for explaining various methods of providing an AR service by an AR service platform according to the present disclosure.

The AR service device 800 may extract property information of a POI that matches a road on which the vehicle is traveling and overlay an AR object onto an image based on the extracted property information of the POI.

Specifically, the AR service device 800 may determine the type of the AR object based on the property information of the POI where the AR object is to be overlaid, and determine the size of the AR object based on the distance to the POI.

Figure 18:
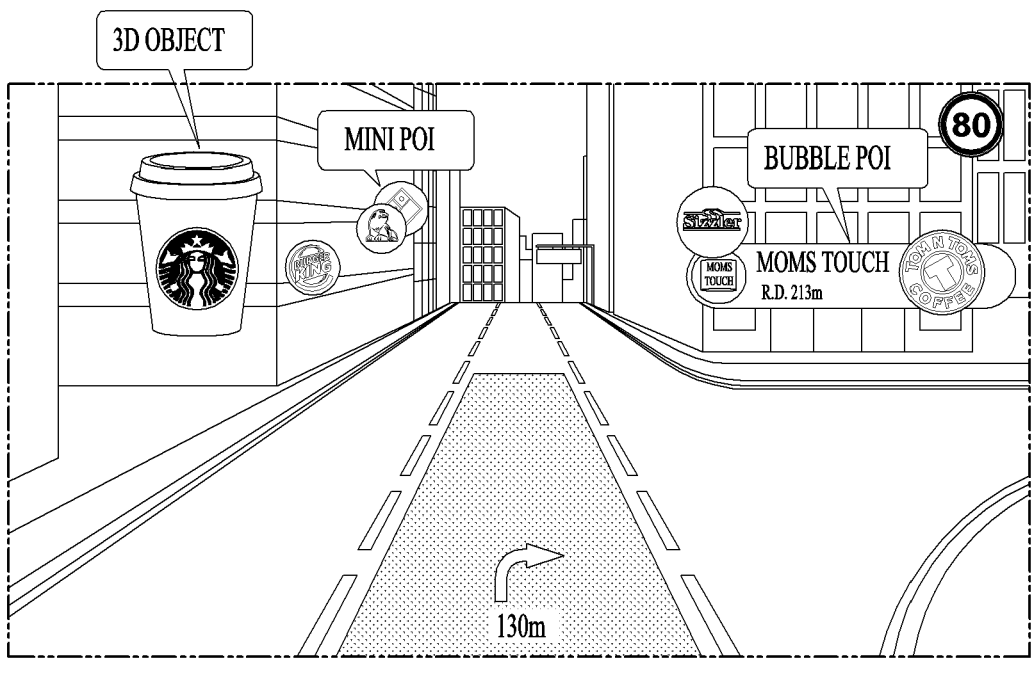

Referring to FIG. 17 and FIG. 18, the AR service device 800 may receive nearby POIs present within a predetermined radius of the current location from the server and filter POIs (or AR objects) to be displayed on the screen based on the path and direction of travel (S1710 and S1720).

Afterwards, the AR service device 800 may classify different types of AR objects (e.g., mini POI and bubble POI) according to the properties of the POIs and determine icon image size based on the distance to the POIs (S1730 and S1740).

Specifically, the AR service device 800 may determine the type of an AR object based on property information of a POI where the AR object is to be overlaid and determine the size of the AR objects based on the distance to the POI.

That is, the AR service device 800 may gradually enlarge the size of an AR object, because the shorter the distance to the POI where the AR object is displayed, the larger the POI.

Moreover, if a POI nearest to the current location has 3D modeling data, the AR service device 800 may display the POI as a 3D object when the vehicle has approached within a threshold distance of the POI (S1750).

Specifically, upon receiving 3D information from the server about the nearest POI to the vehicle of all POIs in an image where AR objects are displayed, the AR service device 800 may display an AR object of the nearest POI as a three-dimensional object.

That is, referring to FIG. 18, the AR service device 800 may display a general POI as a mini POI, display a frequently visited POI as a bubble POI if detailed information such as gas station information and parking information, and display a particular brand POI as a 3D object within a threshold distance of the POI if it has 3D modeling data.

Meanwhile, the AR service device 800 may display the AR object in different ways, based on whether the traveling speed of the vehicle exceeds a threshold speed or not.

Figure 19:
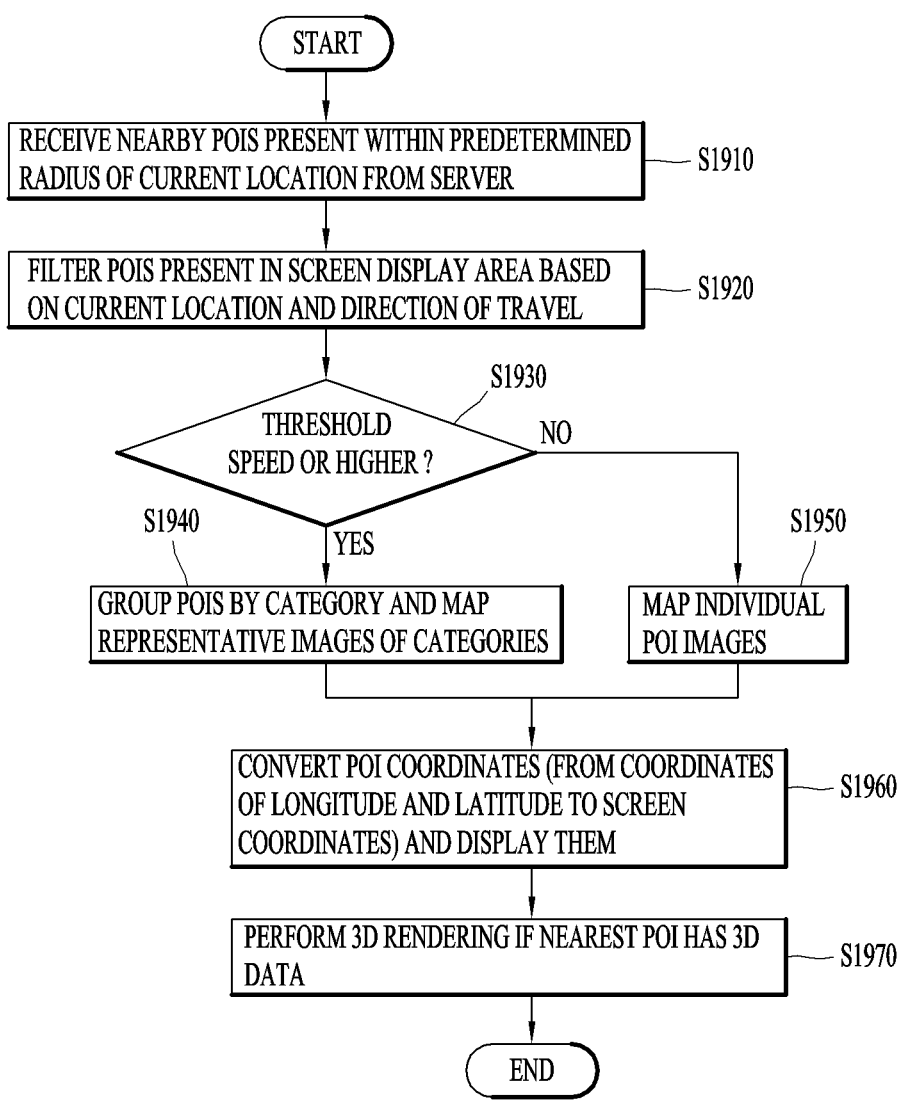

Referring to FIGS. 19 and 20, the AR service device 800 may receive nearby POIs present within a predetermined radius of the current location from the server, and filter POIs present in a screen display area based on the current location and the direction of travel (S1910 and S1920).

Afterwards, the AR service device 800 may determine whether the traveling speed of the vehicle is equal to or higher than a threshold speed (preset speed) (S1930).

If the speed of the vehicle is equal to or higher than the threshold speed, the AR service device 800 may overlay AR objects onto an image in a first manner.

Specifically, if the speed of the vehicle is equal to or higher than the threshold speed, the AR service device 800 may group POIs by category and map representative images of categories (S1940).

If the speed of the vehicle is lower than the threshold speed, the AR service device 800 may overlay AR objects onto an image in a second manner which is different than the first manner.

Specifically, if the speed of the vehicle is lower than the threshold speed, the AR service device 800 may group POIs by category and map individual POI images (S1950).

Afterwards, the AR service device 800 may convert POI coordinates (from coordinates of longitude and latitude to screen coordinates) and overlay AR objects onto the image and display them (S1960).

In this case, the AR service device 800 may perform 3D rendering if a nearest POI has 3D data (S1970).

That is, referring to (a) of FIG. 20, when traveling at a high speed which is equal to or higher than a threshold speed, the AR service device 800 may group POIs by category and display them to ensure visibility.

Moreover, referring to (b) of FIG. 20, when traveling at a low speed which is lower than the threshold speed, the AR service device 800 may display POIs (AR objects) in the form of mini or bubble POIs.

Meanwhile, the AR service device 800 determines whether a condition for displaying an AR carpet, which is an AR object shaped like a carpet, is met, and if the condition is met, may overlay the AR carpet onto the image.

For example, if a particular brand POI is set as a destination, the AR service device 800 may reflect the logo and color of that brand and overlay the AR carpet (or AR object) onto the image.

Figure 21:
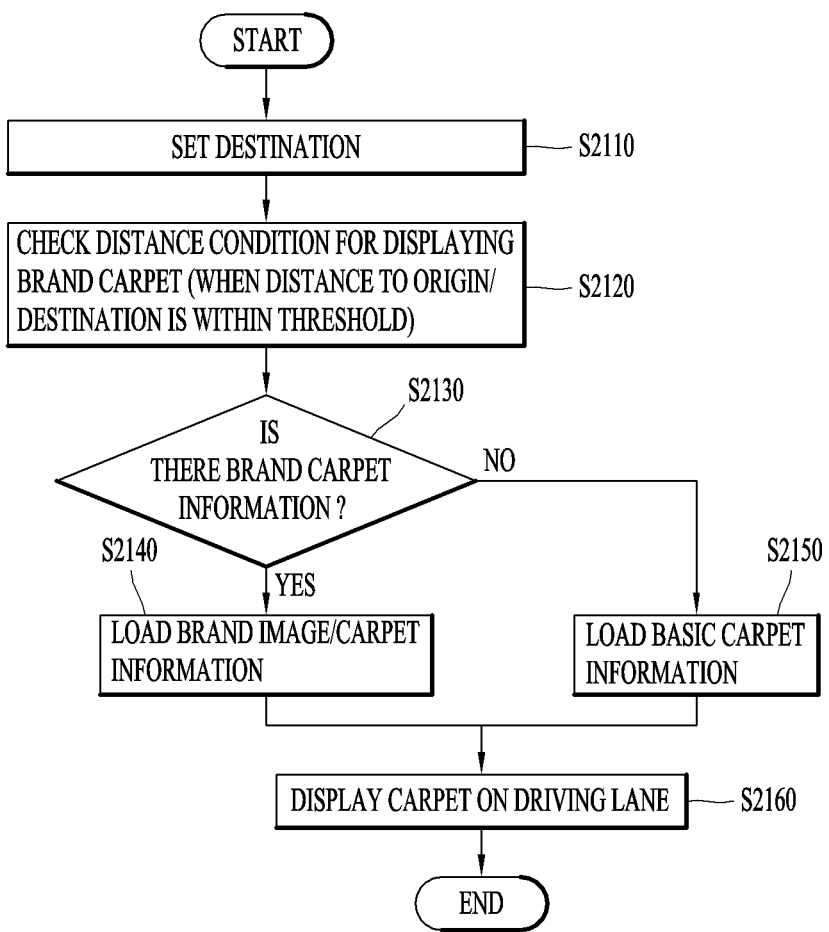
Figure 22:
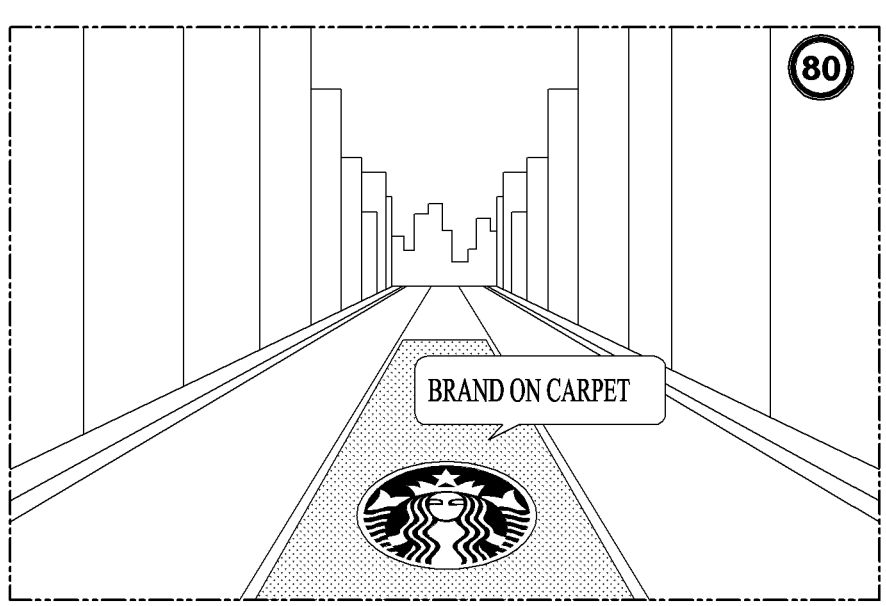

Referring to FIGS. 21 and 22, once a destination is set, the AR service device 800 may check a distance condition for displaying a brand carpet (S2110 and S2120).

For example, when the distance to the origin/destination is within a threshold, the AR service device 800 may determine that the condition for displaying the brand carpet is met.

The AR service device 800 may determine whether there is brand carpet information (S2130), and if so, may load a brand image or brand carpet information (S2140).

On the other hand, if there is no brand carpet information, the AR service device 800 may load basic carpet information (S2150).

Afterwards, the AR service device 800 may display an AR object in such a way that the loaded carpet information is overlaid onto a driving lane (S2160).

Meanwhile, the AR service device 800 may display an AR object corresponding to a landmark POI on the image, and when the AR object corresponding to the landmark POI displayed on the image is selected, may overlay detailed information on the landmark received from the server onto the image and display it.

The AR service device 800 may display detailed information on a particular landmark.

Figure 23:
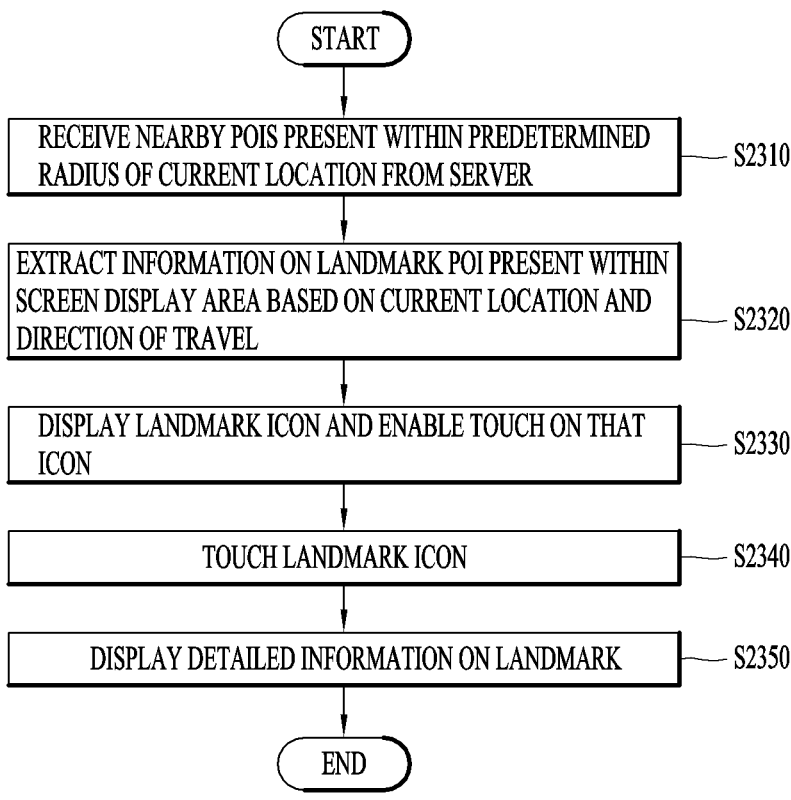
Figure 24:
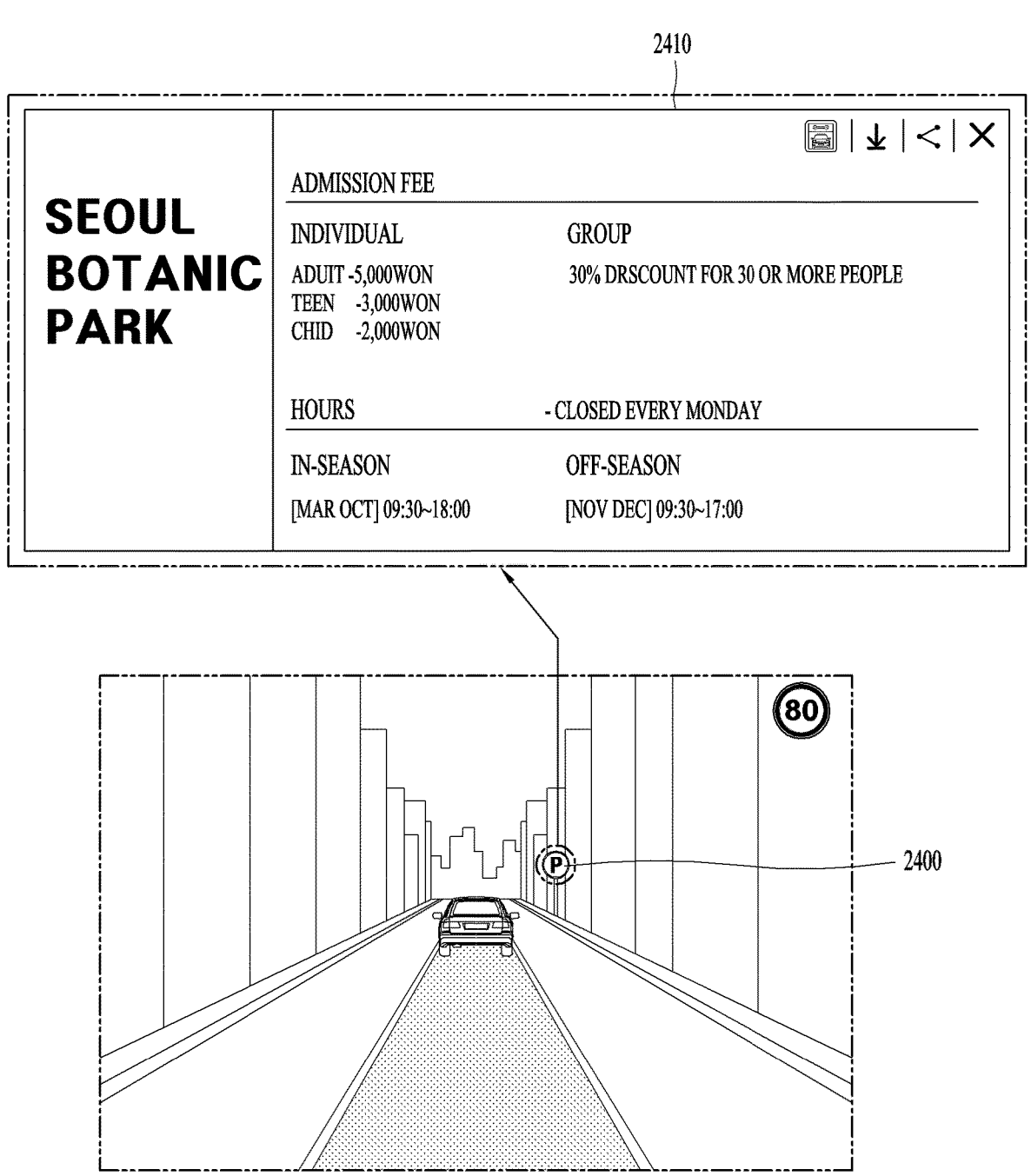

Referring to FIGS. 23 and 24, the AR service device 800 may receive nearby POIs present within a predetermined radius of the current location from the server, and extract information on a landmark POI present within a screen display area based on the current location and the direction of travel (S2310 and S2320).

Afterwards, the AR service device 800 may display a landmark icon and enable touch on the icon (S2330).

As illustrated in FIG. 24, when a landmark icon 2400 is touched, the AR service device 800 may display detailed information 2410 on the landmark (S2340 and S2350).

That is, when the icon of a particular landmark is selected, the AR service device 800 may provide detailed information on the landmark and provide services like booking, adding schedules to a calendar, and sharing with a smartphone through the detailed information.

Meanwhile, if the POI in the image where the AR object is overlaid corresponds to a destination, the AR service device 800 may vary the AR object depending on the distance to the destination.

Figure 25:
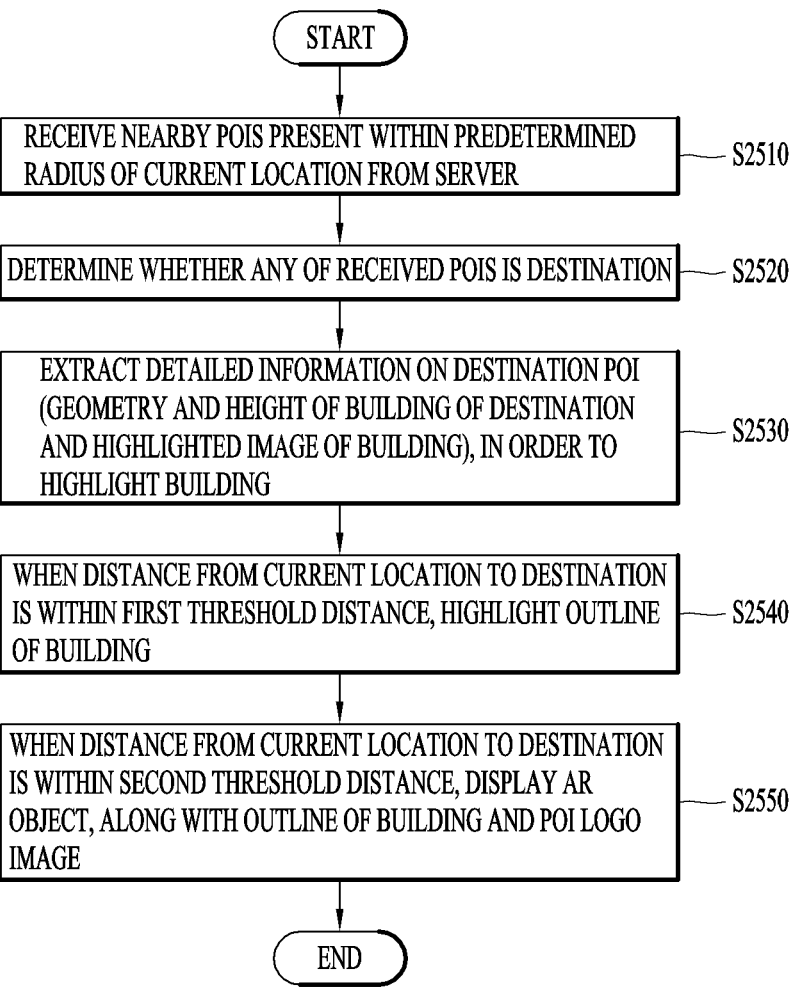
Figure 26:
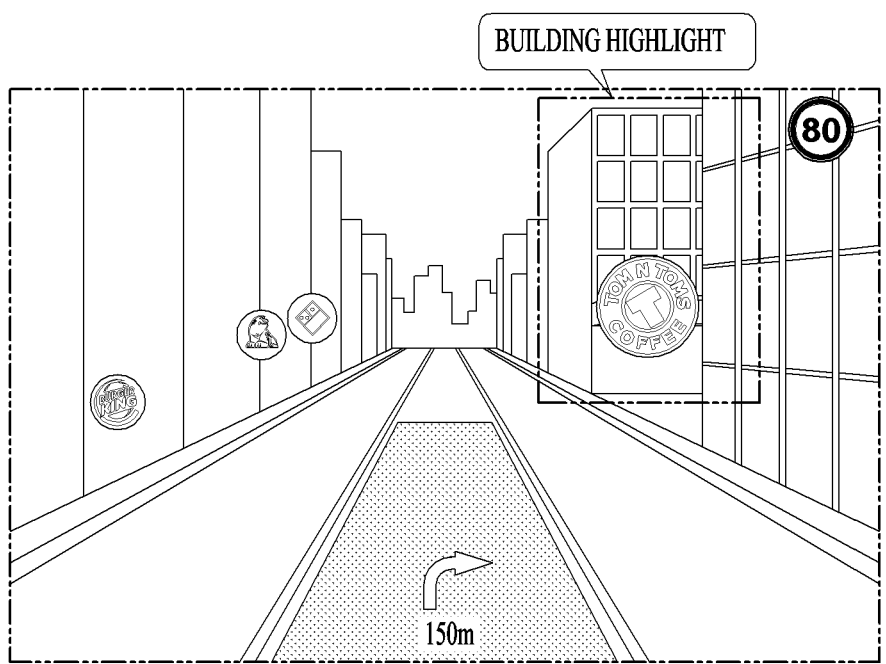

Referring to FIGS. 25 and 26, the AR service device 800 may receive nearby POIs present within a predetermined radius of the current location from the server and determine whether any of the POIs is a destination (S2510 and S2520).

Afterwards, the AR service device 800 may extract detailed information on the destination POI (the geometry and height of a building of the destination and a highlighted image of the building), in order to highlight the building (S2530).

Afterwards, when the distance from the current location to the destination is within a first threshold distance, the AR service device 800 may display an AR object in a first manner (for example, overlay an AR object onto an image so as to highlight the outline of the building) (S2540).

When the distance from the current location to the destination is within a second threshold distance, the AR service device 800 may display an AR object (for example, along with the outline of the building and a POI logo image) in a second manner which is different than the first manner (S2550).

Referring to FIG. 26, if the destination is a particular brand, the AR service device 800 may highlight a building of the destination to provide accurate navigation.

Moreover, the AR service device 800 may display a building highlight based on shape information of the building and display a brand icon as well, along with the building.

Meanwhile, the AR service device 800 may overlay an AR wall onto an image and display it as an AR object shaped like a wall.

The server 900 may send AR advertisement data to the AR service device.

The AR advertisement data may include information on a display position and a display format.

The AR service device 800 may extract AR advertisement data mapped to the direction of travel of the vehicle and the road the vehicle is on, based on the AR advertisement data, and render the extracted AR advertisement data so that an AR advertisement is displayed at the display position in the display format, by using the extracted AR advertisement data.

Figure 27:
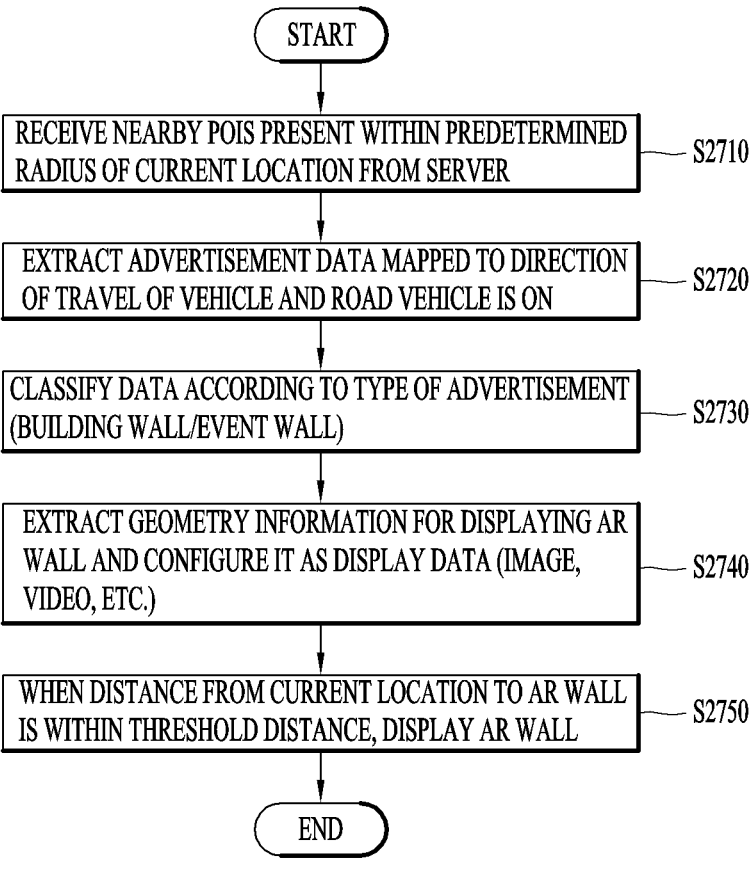
Figure 28:
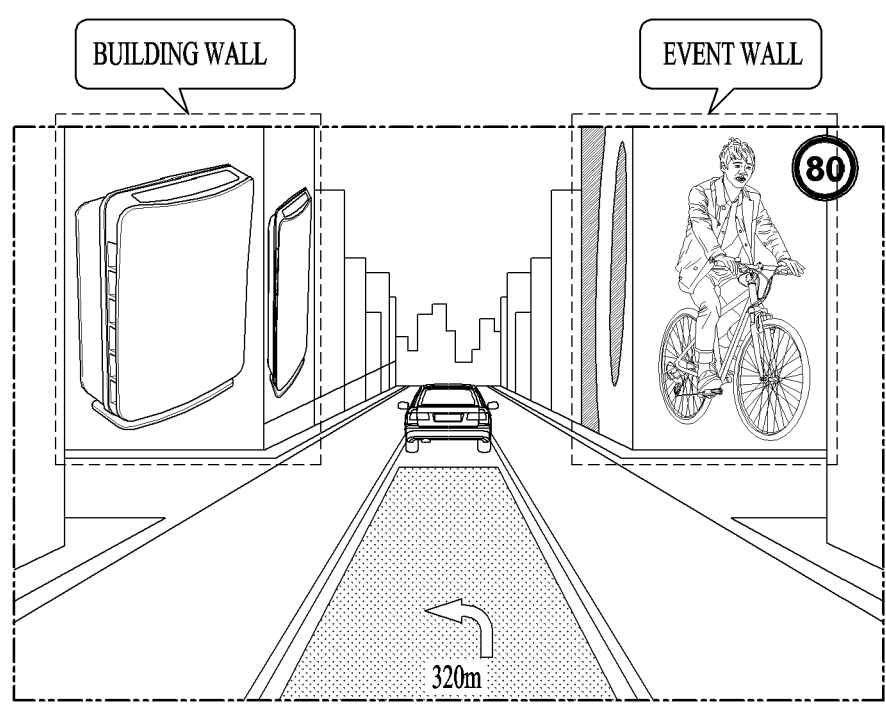

Referring to FIGS. 27 and 28, the AR service device 800 may receive advertisement data (AR advertisement data) present within a predetermined radius of the current location from the server and extract advertisement data mapped to the direction of travel of the vehicle and the road the vehicle is on (S2710 and S2720).

The AR service device 800 may classify data (building wall/event wall) according to the type of advertisement, extract geometry information for displaying an AR wall (an AR object shaped like a wall), and configure it as display data (image, video, etc.) (S2730 and S2740).

When the distance from the current location to the AR wall is within a threshold distance, the AR service device 800 may display the AR wall (overlay it onto an image) (S2750).

Referring to FIG. 28, the AR service device 800 may display particular brand information or event information in the form of an AR wall.

For example, building-shaped content may be displayed on a building wall based on shape information of the building, and signage-shaped content may be displayed on an event wall by using the coordinates of the edge of the road.

Meanwhile, if the destination is a place where the AR service device 800 can approach, and when the vehicle has approached the destination, the AR service device 800 may overlay a page related to a service available at the destination onto the image and display it.

For example, the AR service device 800 may overlay an AR object onto the image and display it in various manners, in relation to parking lots.

Figure 29:
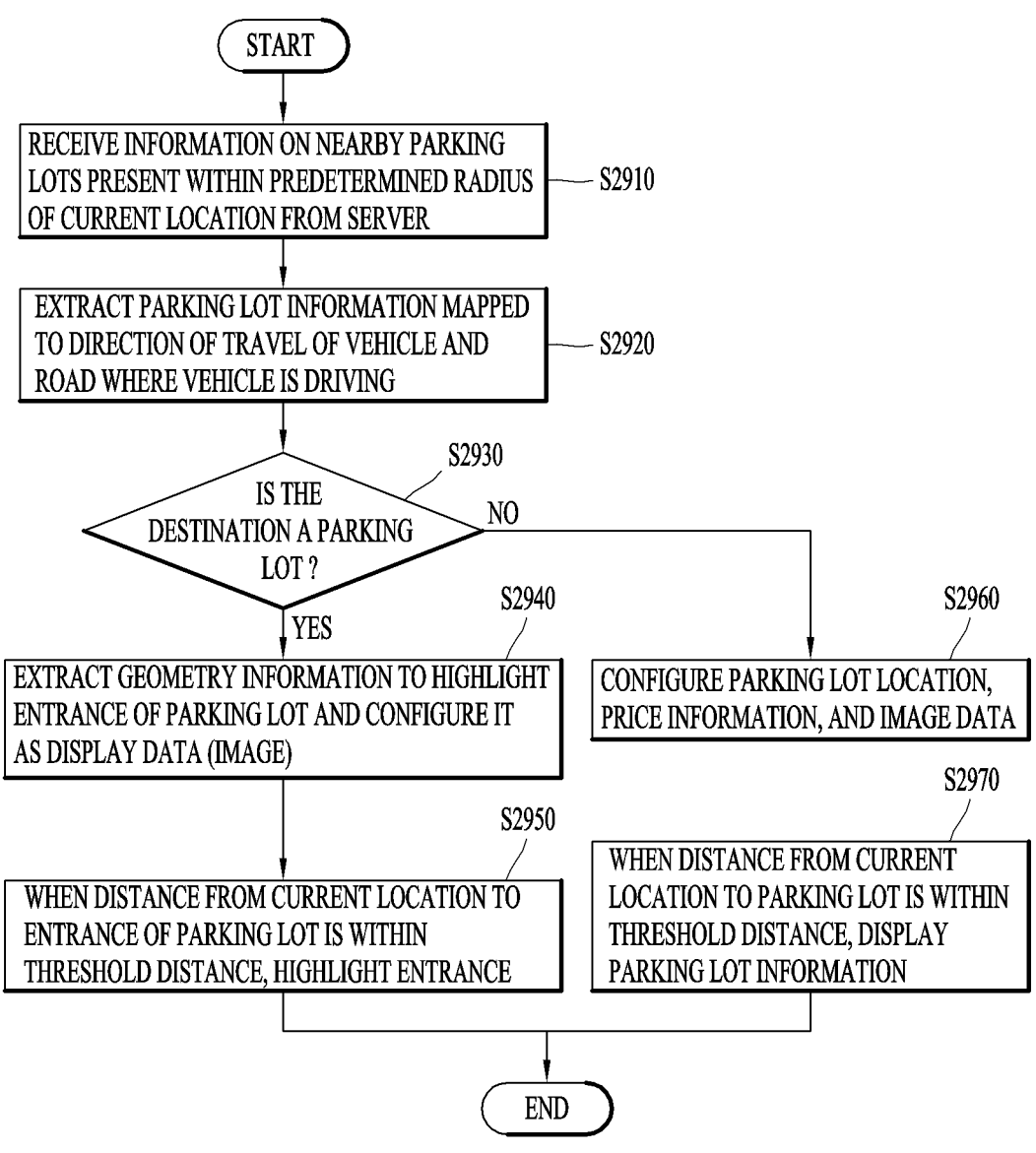

Referring to FIGS. 29 and 30, the AR service device 800 may receive information on nearby parking lots present within a predetermined radius of the current location from the server and extract parking lot information mapped to the direction of travel of the vehicle and the road where the vehicle is driving (S2910 and S2920).

Afterwards, if the destination is a parking lot, the AR service device 800 may extract geometry information to highlight the entrance of the parking lot and configure it as display data (image) (S2930 and S2940).

Afterwards, when the distance from the current location to the entrance of the parking lot is within a threshold distance, the AR service device 800 may highlight the entrance (S2950).

On the other hand, if the destination is not a parking lot, the AR service device 800 may configure parking lot information including parking lot location, price information, and image data, and when the distance from the current location to the parking lot is within a threshold distance, may display the parking lot information (S2960 and S2970).

Referring to FIG. 30, if the destination is a parking lot, the AR service device 800 may highlight the entrance of the parking lot using entrance coordinate information, in order to give directions to the entrance of the parking lot.

Moreover, when the vehicle is getting near to (within a threshold distance of) the entrance of the parking lot, the AR service device 800 may display detailed information of the parking lot (a page related to a service available at the destination), in order to display parking information.

In addition, when driving out of the parking lot, the AR service device 800 may process a parking fee payment based on parking time and fee information (by interfacing with a payment system).

Displaying of various information described in this specification may mean that an AR object is overlaid onto an image, and also may mean that that information is displayed in augmented reality as a way of AR service.

Meanwhile, the AR service device 800 may display various AR objects for a drive-thru.

Referring to FIGS. 31 and 32, the AR service device 800 may receive nearby POIs present within a predetermined radius of the current location from the server and determine whether any of the received POIs is a drive-thru (or extract drive-thru information if the destination is a DT store) (S3110 and S3120).

The AR service device 800 may extract detailed information (the geometry and height of the entrance of the DT store and a highlighted image of the entrance) to give directions to the entrance of the DT store (S3130).

When the distance from the current location to the DT entrance is within a first threshold distance, the AR service device 800 may display an AR object of a first type (e.g., a brand carpet), and when the distance from the current location to the DT entrance is within a second threshold distance, the AR service device 800 may display an AR object of a second type (entrance highlight) (S3140 and S3150).

When passing through the DT entrance, the AR service device 800 may receive order information from the server and display a menu screen (a page related to a service available at the destination) as an AR object, and may order items on the menu through the AR object (S3160 and S3170).

That is, referring to FIG. 32, the AR service device 800 may give directions to the entrance of a drive-thru using an AR object, and if the destination is a drive-thru, may highlight the entrance using coordinate information of the entrance.

Moreover, when the vehicle has approached the drive-thru, the AR service device 800 may display order information and pay through it (by interfacing with an external service).

Meanwhile, the AR service device 800 may overlay an AR object related to a gas station onto an image.

Figure 33:
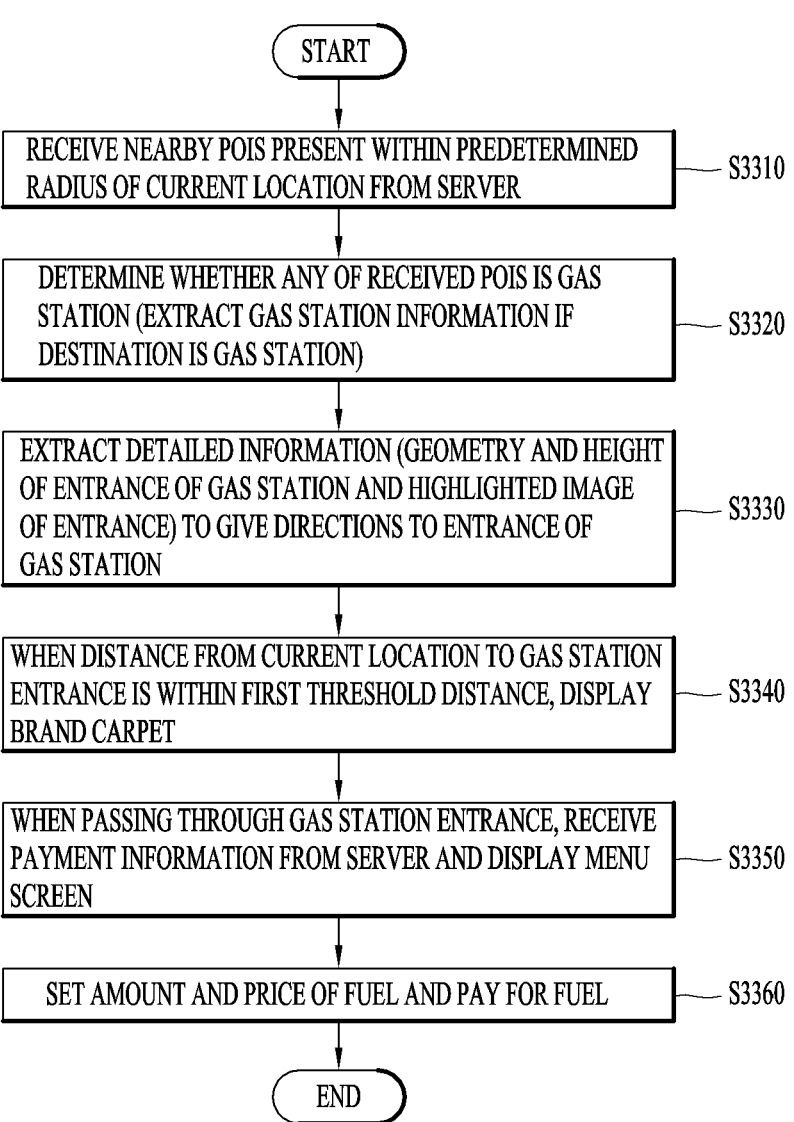
Figure 34:
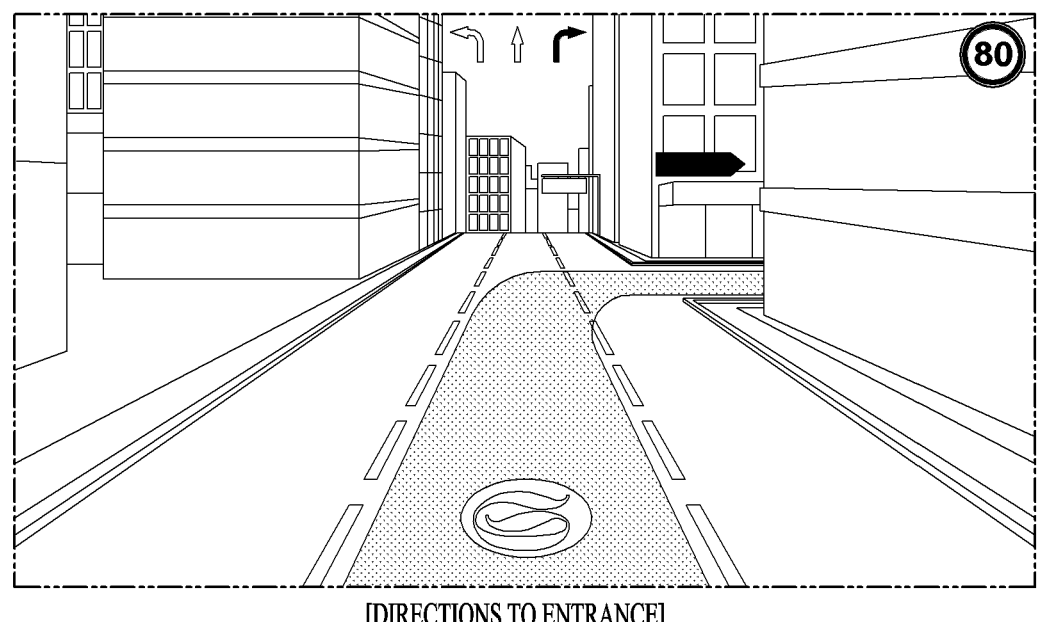

Referring to FIGS. 33 and 34, the AR service device 800 may receive nearby POIs present within a predetermined radius of the current location from the server and determine whether any of the received POIs is a gas station (or extract gas station information if the destination is a gas station) (S3310 and S3320).

The AR service device 800 may extract detailed information (the geometry and height of the entrance of the gas station and a highlighted image of the entrance) to give directions to the entrance of the gas station (S3330).

When the distance from the current location to the gas station entrance is within a first threshold distance, the AR service device 800 may display an AR object of a first type (e.g., a brand carpet), and when the distance from the current location to the gas station entrance is within a second threshold distance, the AR service device 800 may display an AR object of a second type (entrance highlight) (S3340 and S3350).

Afterwards, when passing through the gas station entrance, the AR service device 800 may receive payment information from the server and display a menu screen (a page related to a service available at the destination) as an AR object, and may set an amount and price of fuel and pay for the fuel through the AR object (S3350 and S3360).

That is, referring to FIG. 34, the AR service device 800 may give directions to the entrance of a gas station by overlaying an AR object onto the image, and if the destination is a gas station, may highlight the entrance using coordinate information of the entrance.

Moreover, when the vehicle has approached the gas station, the AR service device 800 may display order information and provide a payment function (by interfacing with an external service).

Meanwhile, the server 900 may receive information related to the AR object provided as the AR service from the AR service device.

Here, the information related to the AR object may include at least one of the type of the AR object overlaid onto the image, the number of times the AR object is displayed, the display time, and the number of clicks by the user.

The server 900 may save the information related to the AR object in conjunction with location information of the AR service device, and, upon receiving a next request from the AR service device, may determine what information to send based on the information related to the AR object.

Figure 35:
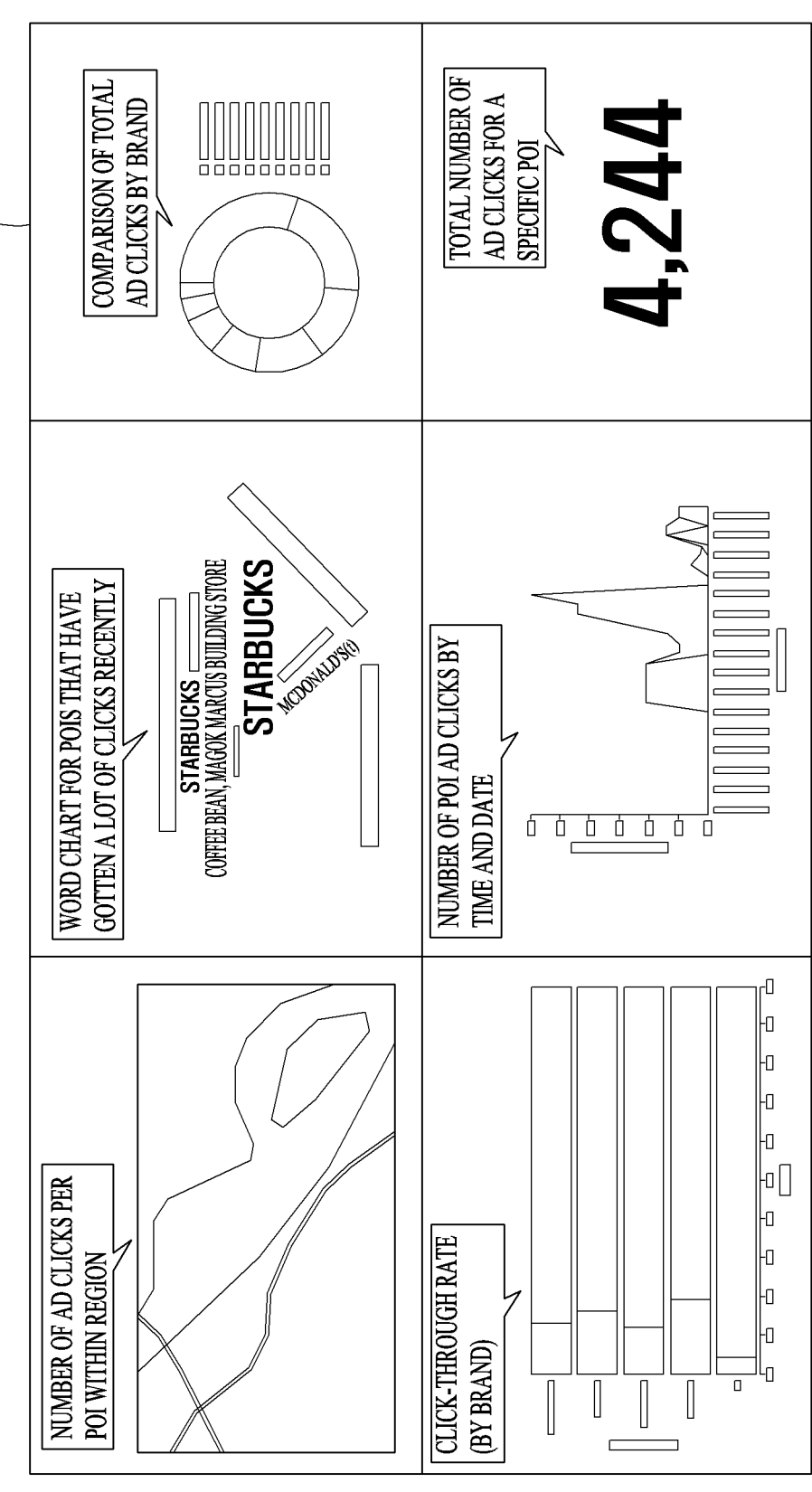

FIG. 35 is a view showing an embodiment of information displayed on a dashboard included in the server 900 of the AR service platform.

Referring to FIG. 35, data related to information provided to the AR service device 800 may be displayed on the server 900.

Specifically, feedback on impressions or clicks on advertisements in an AR area may be collected on the dashboard 907 of the server 900.

For example, the server 900 may collect data from the AR engine 820 when an ad impression or click event occurs, and may collect and analyze the flexibility, expandability, and big data of this event.

Moreover, the server 900 may generate (produce) an advertising result report for an advertising manager or an advertiser and visualize advertising report results by region, time, and advertiser as in FIG. 35.

Meanwhile, the present disclosure may provide an AR service in conjunction with voice recognition.

Figure 36:
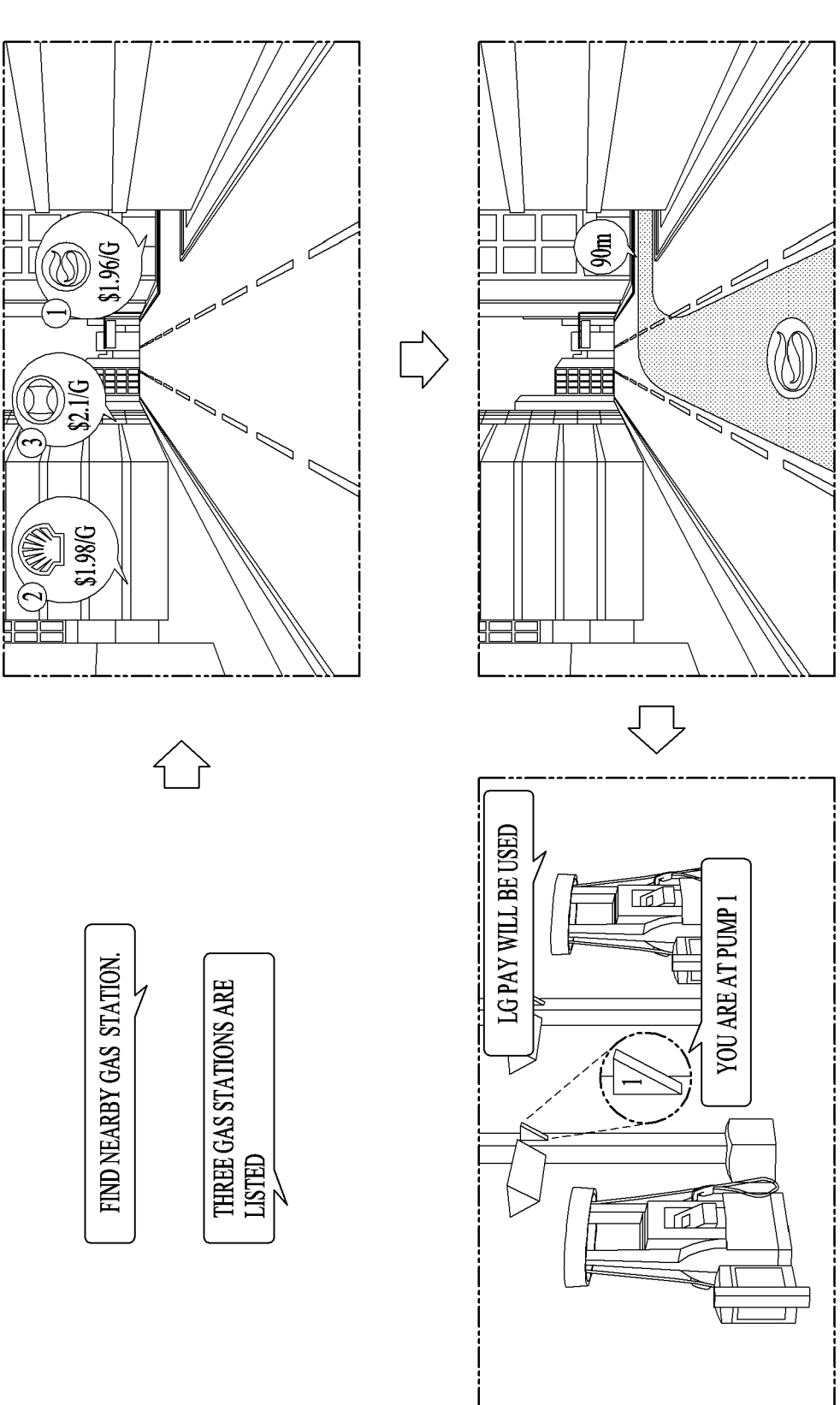

For example, as illustrated in FIG. 36, upon receiving a voice request to search a gas station, the AR service device 800 may issue a voice response saying the number of gas stations.

Moreover, when asked to search the cheapest gas station, the AR service device 800 may overlay an AR object (AR bubble) of the cheapest gas station onto an image and display it, and when asked to search for the nearest gas station, may overlay an AR object (AR carpet) guiding the vehicle to the nearest gas station onto the image and display it.

Afterwards, when the vehicle has approached the gas station, the AR service device 800 may provide voice guidance (e.g., payment information, oilhole position, etc.).

As illustrated in FIG. 37, upon receiving a voice request to search for a parking lot, the AR service device 800 may find parking lot information and produce voice search results in a preset manner.

For example, after searching for parking lots based on parking fee, the AR service device 800 display an AR object (AR bubble) showing a parking fee on the image, as in (b) of FIG. 37. Information on the number of available parking spaces may be displayed as well.

For another example, after finding a place where on-street parking is available, the AR service device 800 may overlay an AR object (AR carpet) representing a parking space onto an image and display it, as in (c) of FIG. 37.

As illustrated in FIG. 38, upon receiving a request to give navigation to a drive-thru, the AR service device 800 may produce voice search results and overlay an AR object for a drive-thru set as a destination onto an image and display it, as in (b) of FIG. 38.

Once the drive-thru set as the destination is within a certain distance, the AR service device 800 may overlay an AR object (AR carpet) highlighting the entrance of the drive-thru onto an image and display it, as in (c) of FIG. 38.

It should be understood that the expression "displaying certain information" includes rendering certain information as an AR object and overlaying it onto an image captured by a camera provided in the vehicle and displaying it.

FIG. 39, FIG. 40, FIG. 41, FIG. 42, FIG. 43, and FIG. 44 are conceptual views for explaining a method in which an AR service platform of the present disclosure displays an AR object on a building by using an AR wall.

The AR service device 800 of the present disclosure may identify a building included in an image and overlay an AR object onto a wall surface of the building and display it. In this case, the AR service device 800 may display an AR object for each floor of the building.

Such an AR object displayed on a wall surface of the building may be called a signage.

Figure 39:
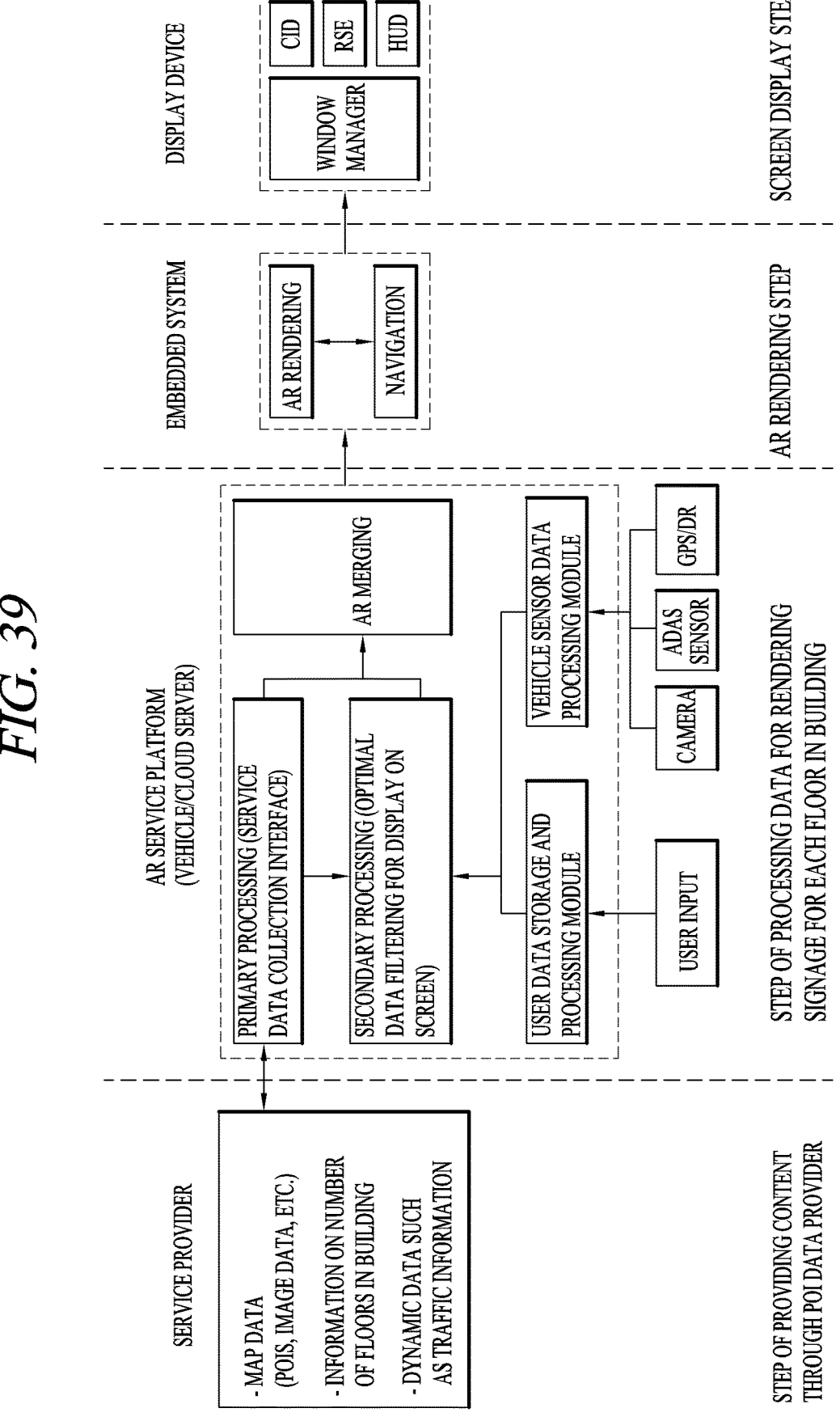

To this end, an AR navigation-based system for representing a signage for each floor of a building according to the present disclosure may include a service provider, an AR service platform, an embedded system, and a display device, as illustrated in FIG. 39.

The service provider may provide the AR service platform with map data (POIs, image data, etc.), information on the number of floors in a building, and dynamic data such as traffic information.

As discussed previously, the AR service platform may include a server and an AR service device, and may perform primary processing through a service data collection interface that collects data provided from a service provider.

Moreover, the AR service platform may perform secondary processing to filter data for display on a screen.

Information used for the secondary processing may be provided from a module for processing vehicle sensing data collected from a camera provided in the vehicle, an ADAS sensor, and GPS/DR, and from a module for storing and processing data.

Afterwards, the AR service platform may merge (AR merging) primarily processed information and secondarily processed information and send them to the embedded system for AR display.

The embedded system may render information merged for AR display in AR based on navigation.

Afterwards, the AR-rendered information may be sent to the display device and displayed in AR through a display of the vehicle such as CID, RSE, and HUD.

AR signage refers to multimedia information displayed on a building or in a particular area on a screen by using AR (augmented reality), and is a technology for rendering functions like a physical electric bulletin board in AR.

Signage for floors in a building is a technology in which, when there is a plurality of buildings in a building, corresponding advertisement data for each layer is displayed based on information on the floors where those POIs are located.

While conventional AR signage may display one type of advertisement data in a single display area, signage for floors may display a plurality of sets of advertisement data, one each for each floor of the building.

Figure 40:
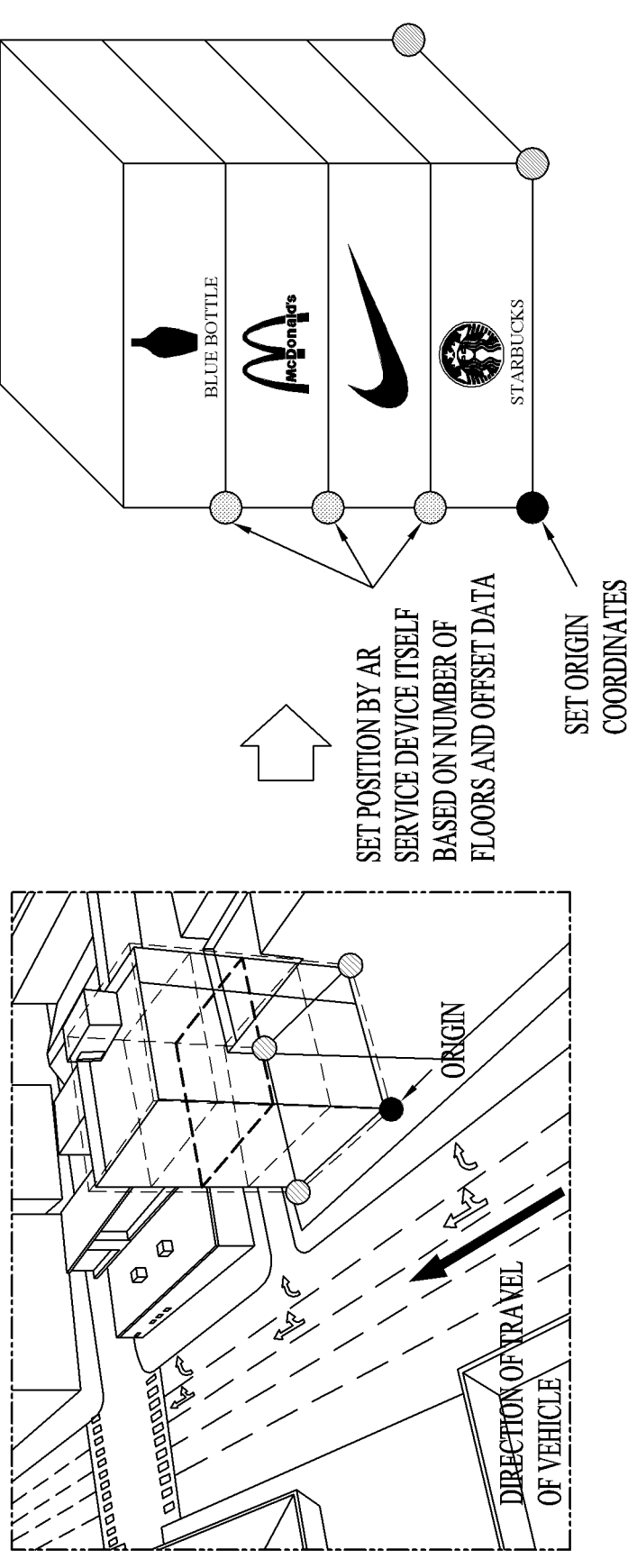

Referring to FIG. 40, the AR service device 800 may obtain information on the number of floors and height of the building from a map data or service provider or calculate the number of floors through camera sensing information.

In this case, the AR service device 800 may arrange floor images using the map data.

For example, the AR service device 800 may get the number of floors based on origin (reference point) coordinates.

The AR service device 800 may calculate the origin for displaying signage for each floor based on building coordinate data, the height of the building, and the number of floors and set the coordinates nearest to the current location as the origin based on the direction of travel of the vehicle.

Afterwards, the AR service device 800 may set an image display position for each floor by shifting it up from floor to floor from the origin. That is, the AR service device 800 may display each floor image by shifting the image display position up from the point of reference by a height offset.

For another example, the AR may arrange images using camera sensing information.

Figure 41:
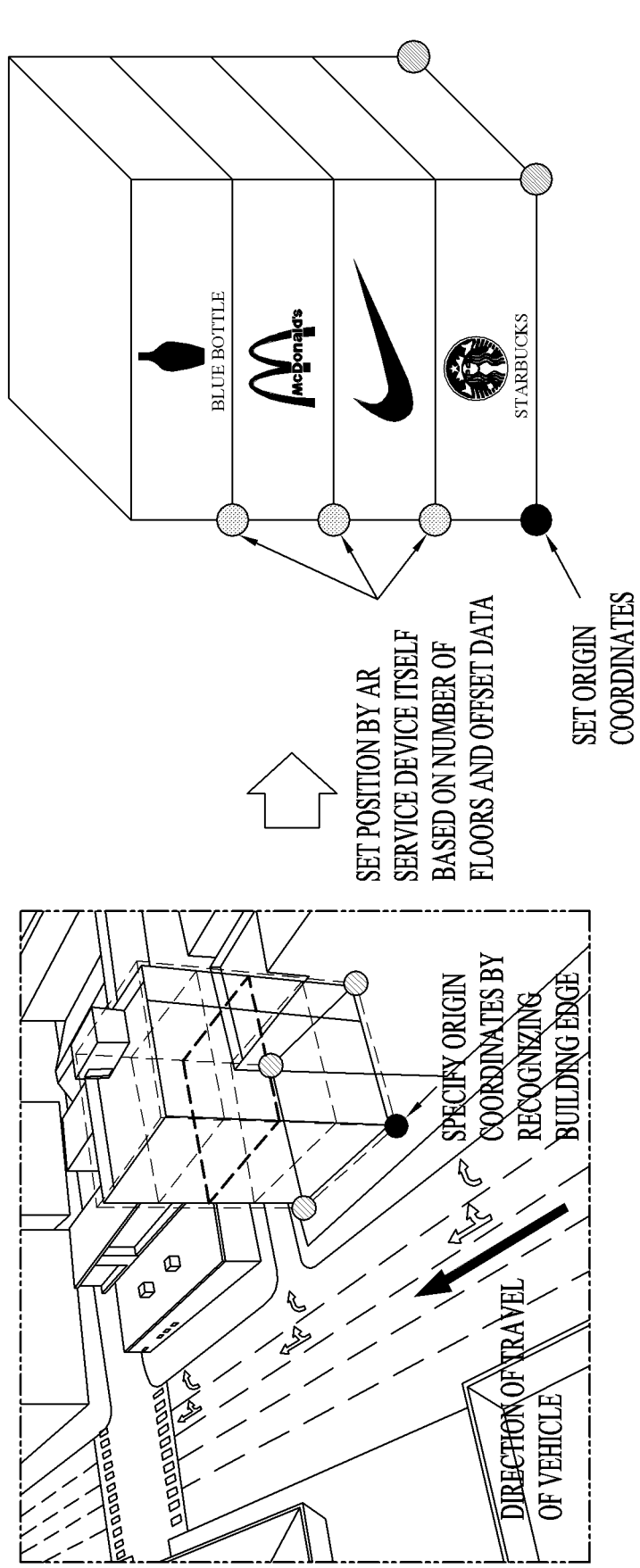

Referring to FIG. 41, if there is no map data for the building, the AR service device 800 may determine the origin coordinates and calculate the number of floors, by using camera sensing information.

For example, the AR service device 800 may specify the nearest point to the current location as the origin using information on the edge of the building recognized by the camera, and may use a predetermined height of each floor.

That is, the AR service device 800 may calculate the number of floors in the building using the height of the building recognized through camera sensing and the height of each floor, and specify an image display position for each floor by shifting it up from floor to floor from the origin (display each floor image by shifting the image display position up from the point of reference by a height offset).

The AR service device 800 may provide a method of rendering floor heights to accurately display signages for the floors and correcting images.

First, the AR service device 800 may correct images using a building height information DB.

Specifically, the AR service device 800 may obtain the height of each floor by using a DB containing building height information such as 3D navigation map and interior maps, and correct an image display position by using DB information.

That is, if there is a difference between initially calculated floor-to-floor height information and height information obtained through the DB, the AR service device 800 may correct the image display position by using the DB information.

The AR service device 800 may sense the height of each floor by a camera sensor and correct the image display position.

Specifically, if there is no DB from which building height information can be obtained, the AR service device 800 may sense a floor-to-floor height of the building displayed on the screen through the camera sensor and correct the image display position by using that information.

Moreover, the AR service device 800 may continuously correct images based on the direction and speed of travel of the vehicle. That is, the AR service device 800 may perform control to continuously change image sizes as the vehicle travels.

Specifically, the AR service device 800 may continuously correct images by taking into account the direction and speed of travel of the vehicle.

In this case, if a variation in the heading angle of the vehicle is within a threshold, the AR service device 800 may determine that the vehicle is on a "straight stretch of road" where continuous image correction is possible.

If there is a sequential increase in heading angle, the AR service device 800 may determine that the vehicle is on a curvy stretch of road and therefore display no AR signage.

Figure 42:
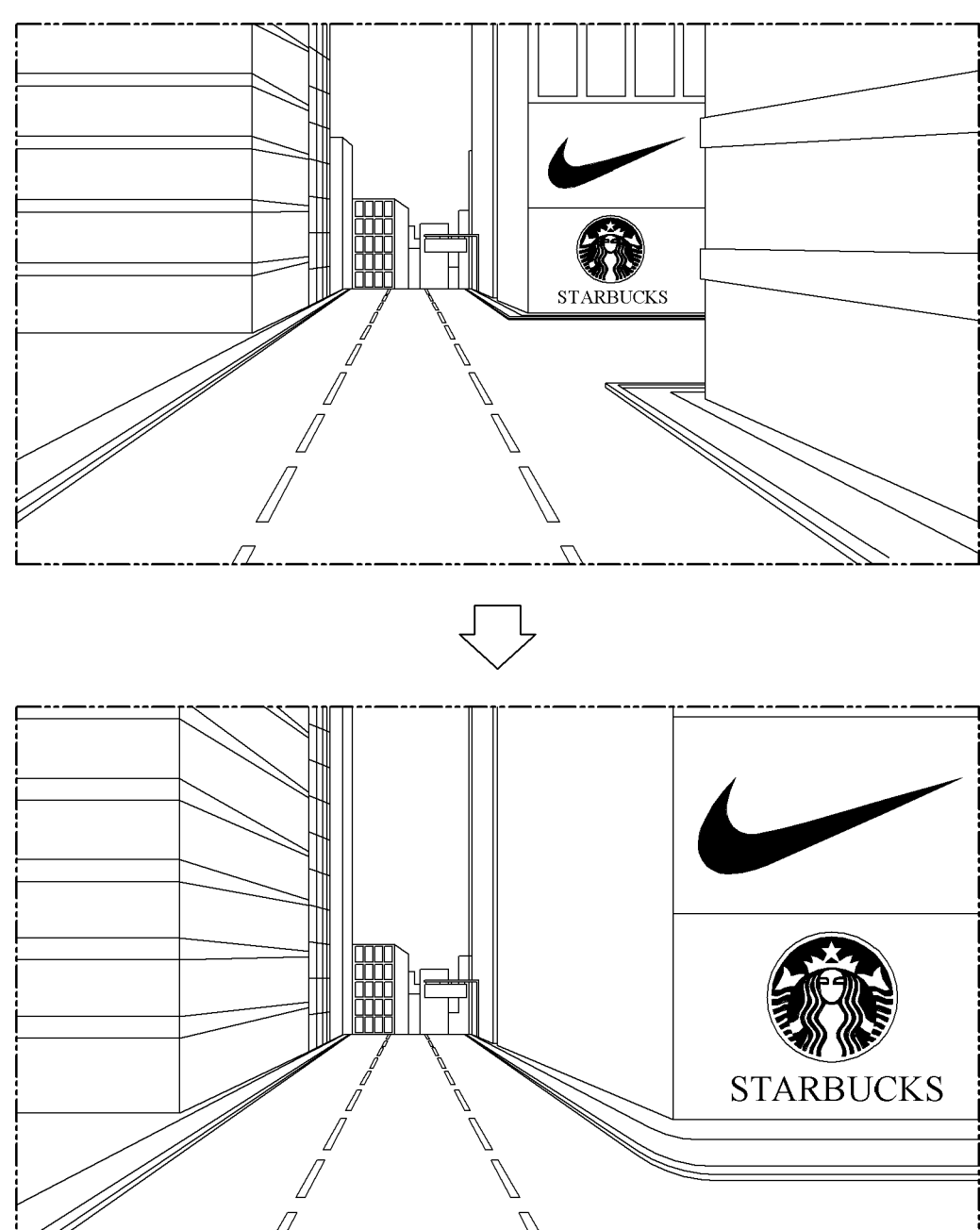

The AR service device 800 may perform image size change and control only if the vehicle is traveling at a low speed less than the threshold, and, as illustrated in FIG. 42, may dynamically adjust the rate of change in image size in proportion to traveling speed (adjust the image size in proportion to traveling speed).

Moreover, the AR service device 800 may change a POI (AR object) display method according to user preference and service grade.

For example, the AR service device 800 may display signages for floors in different ways according to user preference and advertisement service grade.

When displaying POIs according to user preference and service grade, the AR service device 800 rearrange content according to priorities in the entire building.

The AR service device 800 may classify signage display types (shape and form of content) according to purposes and assign priorities for the classified signage display types.

The signage display types for different purposes may include a brand icon (brand icon corresponding to a POI), 3D modeling (3D modeling content related to a POI), a still image (still image for POI-related information and advertisement), and a video (POI-related video content (advertisement and PR video).

Figure 43:
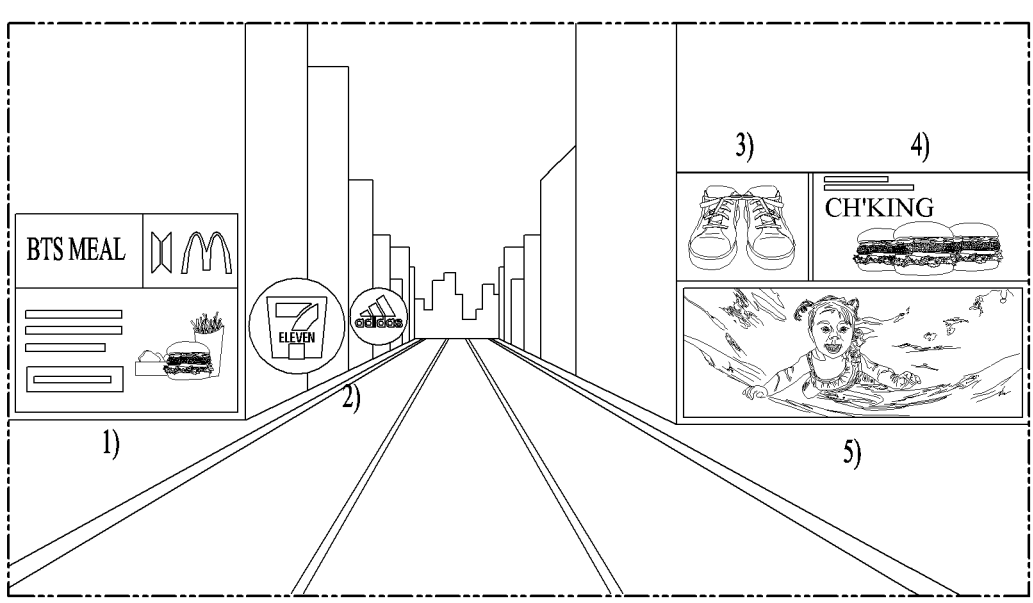

Referring to FIG. 43, the AR service device 800 may align POIs (AR objects) according to priority.

For example, the AR service device 800 aligns a plurality of POIs present in a building by assigning weights to them according to affiliate service grade, user preference POI, and frequency of search.

Moreover, the AR service device 800 may set display rules.

For example, in the case of a partner service advertisement, content for an entire area of one or two floors may be displayed together to accentuate the advertisement to increase the advertising effectiveness. When there is a plurality of partner services of the same priority, content may be displayed sequentially in an advertisement display area (a plurality of content items is displayed in rotation in the same area).

In addition, if only some part of the building is present on the screen as the vehicle gets near to the building, only highest-priority content may be displayed in that area (highest-priority content is selected and accentuated).

Referring to FIG. 43, the AR service device 800 may 1) display a partner brand advertisement by combining displays areas of two floors or 2) display brand icons in different display areas according to priority.

Moreover, the AR service device 800 may 3) display a 3D model or 4) display a still image advertisement for a partner service.

In addition, the AR service device 800 may 5) display a video advertisement for a partner service across the entire area of one floor.

In this way, the AR service device 800 may overlay an AR object of an advertisement onto an image captured by a camera in various ways to provide an AR service.

Meanwhile, as illustrated in FIG. 44, if only some part of the building is available, the AR service device 800 may display a portion 4400 of highest-priority content over the entire area of that part.

Meanwhile, according to the present disclosure, a display method of an AR object may vary in consideration of complexity of the real world.

FIG. 45 is a flowchart illustrating a method for providing an AR service according to a TPO complexity (level) of the present disclosure, and FIGS. 46, 47, 48, 49, and 50 are conceptual views illustrating the control method illustrated in FIG. 45.

The server 900 of the present disclosure may include a time place occasion (TPO) complexity level calculation module 4600 that calculates a TPO complexity level of the real world and determine an amount of information to be transmitted to the AR service device using the calculated complexity level.

Referring to FIG. 45, the TPO complexity level calculation module 4600 may collect TPO information of the real world from the AR service device 800 (S4510).

In addition, the TPO complexity level calculation module 4600 may calculate (classify and analyze) a fixed complexity level and a variable complexity level based on the collected TPO information (S4520).

The TPO complexity level calculation module 4600 may calculate a TPO complexity level based on the fixed complexity and the variable complexity (S4530).

Thereafter, the TPO complexity level calculation module 4600 may vary (determine or set) at least one of a type of information and an amount of information to be transmitted to the AR service device based on the calculated TPO complexity level.

In other words, the TPO complexity level calculation module 4600 may determine and optimize (or process) a configuration of service content information (i.e., an AR object provided by an AR service) based on the TPO complexity level (S4540).

Specifically, the TPO complexity level calculation module may establish a display policy for an AR object to be output by the AR service, based on the calculated TPO complexity level.

The display policy may include setting values for at least one of type, amount of information, location, and display time related to the AR object.

The TPO complexity level calculation module 4600 may process the AR object to be transmitted to the AR service device to correspond to the display policy.

In addition, the TPO complexity level calculation module 4600 may process information received from an external service server (third party partners) based on the display policy and transmit the processed information to the AR service device 800.

Thereafter, the AR service device 800 may display the processed service content information (an AR object, i.e., an object output in AR/VR) according to the TPO complexity level calculated by the TPO complexity level calculation module 4600 (S4550).

Then, when a user interaction (voice or touch) with respect to the service content information is detected, the AR service device 800 may repeat those processes (S4510 to S4550) for outputting an AR object corresponding to the user interaction to the server.

Meanwhile, the TPO complexity level calculation module 4600 may transmit information related to the calculated TPO complexity level to the AR service device 800, and the AR service device 800 may establish a display policy for the AR object based on the received information related to the TPO complexity level.

Thereafter, the AR service device 800 may process (optimize) the AR object to correspond to the display policy, and provide an AR service by overlaying the processed AR object onto an image captured by a vehicle camera.

The AR service platform according to the present disclosure may provide a user interface that optimizes a user's experience of recognizing and acquiring information adaptively for each situation by determining a complexity level based on TPO (time, place (location), and occasion (proceeding direction) using artificial intelligence, and varying an amount of content information to be displayed in AR (VR or XR) according to the complexity level.

Figure 46:
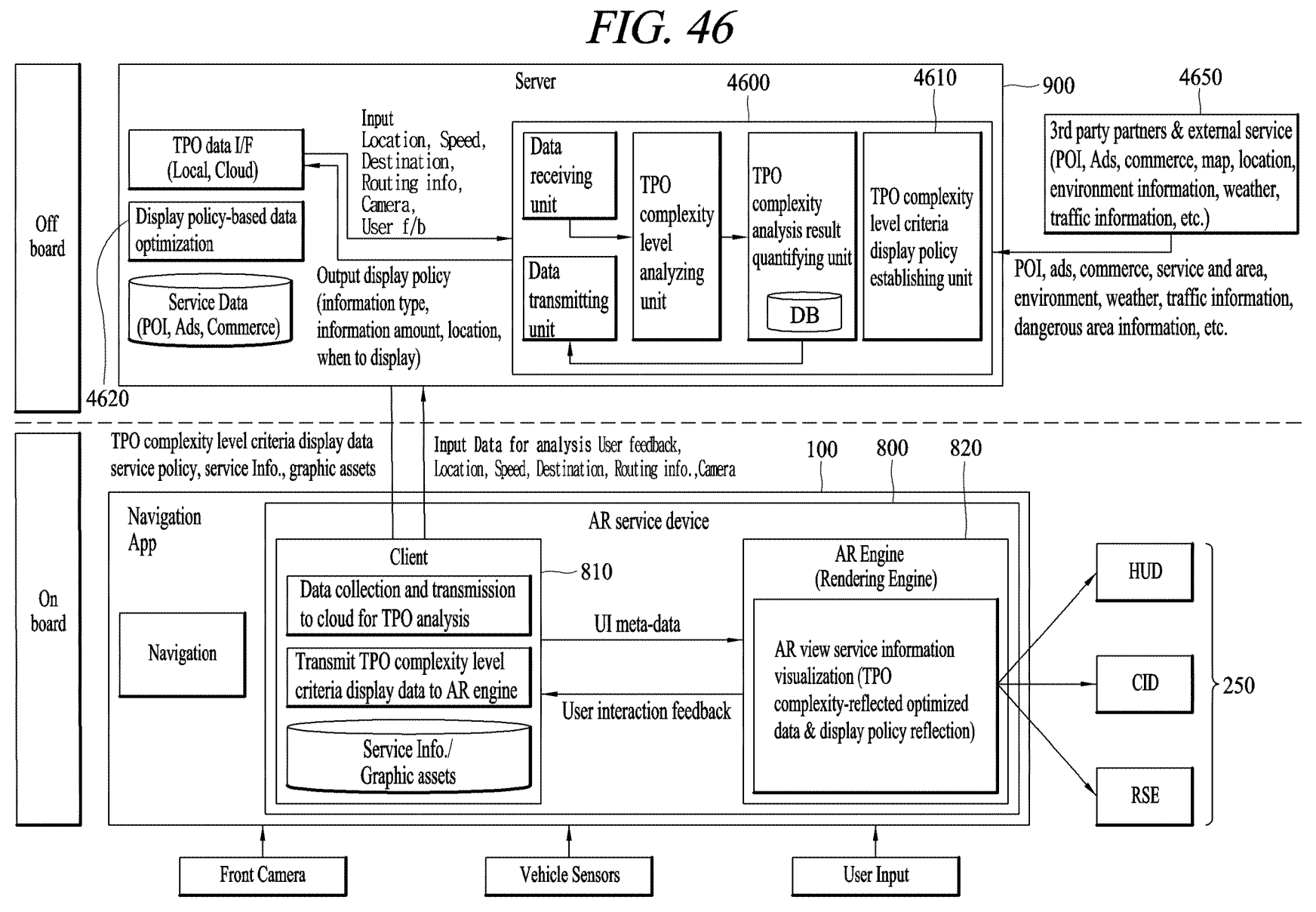

This function may be performed by the TPO complexity level calculation module 4600, and the TPO complexity level calculation module 4600 may be included, for example, in a server 900 as illustrated in FIG. 46.

The TPO complexity level calculation module 4600 may construct a system that can continuously update TPO complexity information through databasing for each region (introduction of crowd-sourcing/introduction of machine learning)

The TPO complexity level calculation module 4600 may analyze and utilize regional complexity information in a digital twin, which is a metaverse space.

The TPO complexity level calculation module 4600 may continuously collect and analyze TPO complexity-related factor information through artificial intelligence (AI) to increase accuracy of the information, and optimize a complexity level/weight to support personalized service for each user.

The TPO complexity level calculation module 4600 may recommend optimal target time and area for displaying information based on the TPO complexity level information.

The TPO complexity level calculation module 4600 may also adjust the TPO complexity level calculation and the amount of content information according to a viewing angle from a moving object.

The TPO complexity level calculation module 4600 may quantify (digitize) TPO complexity levels (TPO.CL) (3 CL levels: high/middle/low).

The TPO complexity level calculation module 4600 may calculate fixed complexity (FC) and variable complexity (VC) to calculate a TPO complexity level.

The fixed complexity (FC) may be classified (into FC.High, FC.Middle, FC.Low) based on location-based stationary geographic features, such as road shape, building composition, location (city center, residential area, suburban area, etc.), and the like.

The variable complexity (VC) may quantify (VC.High, VC.Middle, VC.Low) factors, such as the number of vehicles, a floating population, risk information, and the like, which may variably affect spatial complexity and situation complexity.

The fixed complexity and the variable complexity may be quantified according to importance of conditions (e.g., 20 to 50, weighted according to important conditions), and classified into high/middle/low sections.

The TPO complexity level calculation module 4600 may sum the quantified fixed and variable complexity values or classify the fixed complexity and the variable complexity into high/middle/low levels according to condition sections by applying a weight according to importance for each complexity.

For example, when a weight is applied, the TPO complexity level calculation module 4600 may calculate the TPO complexity level as follows.

$$TPO.CL=FC^*(100\%-\text{weight } (\%))+VC^*\text{weight } (\%) \qquad \text{Calculation formula}$$

The TPO complexity level calculation module 4600 may adjust an amount of information of contents (AR/MR/XR objects) for each section according to the TPO complexity level.

Criteria for adjusting the amount of information of the contents may include exposure frequency (Frequency), content-occupied space (Space size), exposure effect (Animation, etc.), content complexity (Color, Text, etc.), whether or not an interaction (voice, touch) function is added, etc.

The TPO complexity level calculation module 4600 may adjust an amount of information by rendering contents in the simplest format in a TPO-CL.High section (i.e., a section with a high TPO complexity level, a case where the TPO complexity level belongs to a first section, a section in which complexity of the real world is high) because the user's information recognition ability is lowered in the TPO-CL.High section, and display the contents at a low level (a first level, the simplest display level) according to a display level of the amount of information.

The TPO complexity level calculation module 4600 may adjust an amount of information by rendering contents in a more complex format in a TPO-CL.Middle section (i.e., a section with a middle TPO complexity level, a second section in which the TPO complexity level is lower than that in the first section, a section in which complexity of the real world is less complex) because the user's information recognition ability is normal in the TPO-CL.Middle section, and display the contents at a middle level (a second level higher than the first level, a more complex display level than the first level) according to a display level of the amount of information.

The TPO complexity level calculation module 4600 may adjust an amount of information by rendering contents in a complex format in a TPO-CL.Low section (i.e., a section with a low TPO complexity level, a third section in which the TPO complexity level is lower than that in the second section, a section in which complexity of the real world is simple) because the user's information recognition ability is high in the TPO-CL.Low section, and display the contents at a high level (a third level higher than the second level, a more complex display level than the second level) according to a display level of the amount of information.

That is, the TPO complexity level calculation module 4600 may determine an amount of information of an AR object displayed in the AR service device 800 based on a TPO complexity level.

For example, the TPO complexity level calculation module 4600 may set an amount of information of an AR object to a first level when a TPO complexity level corresponds to the first section, while setting the amount of information of the AR object to a second level (a level with a larger amount of information than the first level) when the TPO complexity level corresponds to a second section with the TPO complexity level lower than that of the first section (i.e., a section less complex than the first section). The TPO complexity level calculation module 4600 may then render the AR object according to the set level.

In addition, the TPO complexity level calculation module 4600 may set the amount of information of the AR object to a third level (a level with a larger amount of information than the second level) in a third section with the TPO complexity lower than that of the second section (i.e., a section less complex than the second section), and render the AR object according to the set level.

In this way, the TPO complexity level may be a criterion for a display policy to display an AR object, and as described above, may be calculated by the fixed complexity (FC) and the variable complexity (VC).

Hereinafter, the fixed complexity will be described in more detail.

The TPO complexity level calculation module 4600 may calculate the fixed complexity (FC) based on at least one of a road type (car-only roads, general roads, residential alleys (neighborhood streets, a width of 9 m or less), a road shape (avenues, streets, roads, paths), a building composition (high-rise buildings, residential sites, low-rise shopping malls), a region (city center, residential areas, suburban areas), and attention concentration (school zones, crash concentration zones).

For example, the TPO complexity level calculation module 4600 may periodically determine the fixed complexity in units of movement within a radius of 1 km.

Here, a high-rise urban district is an area where high-rise buildings of 16 or more floors are expected to have the highest and best use, and includes a central commercial area and a general commercial area. (Estimated floor area ratio: 800% or more)

A mid-rise urban district is an area where 11- to 15-story buildings are determined to have the highest and best use, and includes a general commercial area, a neighboring commercial area, and a semi-residential area that are changing to high-rise urban districts. (Estimated floor area ratio: 550 to 750%)

A low-rise urban district is an area where buildings of 4 to 10 stories are determined to have the highest and best use, and refers to an area in which housings, factories, stores, and the like, having low maturity in terms of commercial quarters, such as general commercial areas, neighboring commercial areas, semi-residential areas, and residential areas (including industrial complex areas) mingle together. (Estimated floor area ratio: 200 to 500%)

A residential area refers to an area that is expected to be divided into residential lots in the near future, for example, includes a residential area that is a pure residential area with buildings of three floors or less, a green area, an industrial area, etc. (Estimated floor area ratio: around 100%)

Agricultural and forestry lands refer to green areas where agricultural and forestry lands have the highest and best use, and include areas where it is difficult to be turn into housing sites in the near future from social, economic, and administrative aspects.

A high density district may be determined (classified) according to the number of buildings in a unit area (400 m×400 m) (e.g., 10 buildings or more within a unit area of a high density district, 10 buildings or less in a unit area of a low density district).

The TPO complexity level calculation module 4600 may determine the fixed complexity based on, for example, the following [Table 1].

TABLE 1

| Fixed complexity (FC) determination criteria | | |
|---|---|---|
| | Type and shape of road | Building composition |
| Fixed Complexity, High | Alley (neighboring street), 9 m or less than wide | Low-rise/mid-rise urban districts, multi-family housing area |
| Fixed Complexity, Middle | General road, 10 m to 25 m wide | High-rise urban district, skyscrapers area, landmark apartment complex |
| Fixed Complexity, Low | Vehicle-only road (expressway), 25 m or more wide | Non-building areas such as farmland, forest land, green area, etc. |
| | Regional characteristics | Attention concentration |
| Fixed Complexity, High | Old downtown area, residential area, alleyway Old downtown: area which becomes old and is in decline although traditional economic, cultural activities were flourished before (e.g., all around Jongro-gu) | Around school (school zone) Crash concentration zone Less than 30 km/h |
| Fixed Complexity, Middle | New downtown area, redistricted area new downtown: core of planned city to meet modern city functions (after 1988) (e.g., all around Gangnam-gu) | Intersections, crosswalk (signal and speeding violation warning zone) Less than 50 km/h |
| Fixed Complexity, Low | Suburban areas, Ganbyeonbuk-ro, Olympic-daero | Semi-autonomous driving, autonomous driving zone Less than 110 km/h |

Hereinafter, the variable complexity will be described in more detail.

The TPO complexity level calculation module 4600 may calculate variable complexity using a plurality of variable factors.

The plurality of variable factors may include a first variable factor (vehicle traffic volume (congestion, slow movement, smooth), and a dynamic factor such as pedestrians (aggregation of the number of communication in cell units of a telecommunication company in 50 m×50 m unit—statistics for each day and time slot)), a second variable factor (a non-dynamic and unspecified variable factor such as construction/event information, pothole, weather, etc.), and a third variable factor (a variable factor inside the vehicle, such as vehicle status information, destination information, intention to accept user information, etc.) (determining the variable complexity by applying a weight (50%, 30%, 20%) according to importance for each condition, quantifying values, and summing those values).

For example, upon a variable factor event occurrence, the TPO complexity level calculation module 4600 may first re-determine the variable complexity and periodically calculate the variable complexity in units of movement of 1 km in radius.

A road risk index may be calculated by converging traffic accident DB and environmental factors (communication, weather information, etc.).

The TPO complexity level calculation module 4600 may determine the variable complexity based on, for example, the following [Table 2]. In this case, the TPO complexity level calculation module 4600 may determine the variable complexity by assigning a weight to each of a plurality of variable factors.

The TPO complexity level calculation module 4600 may calculate fixed complexity through the sum of values of corresponding complexity items, and calculate variable complexity (VC) through the sum of values of corresponding variable factor items.

In addition, the TPO complexity level calculation module 4600 may set a numerical interval for each fixed complexity by assigning a weight to each item for calculating the fixed complexity, as shown in [Table 3].

TABLE 3

| Fixed complexity (FC) | Road type and shape | Building compo-sition | Regional charac-teristic | Attention concen-tration | Numerical interval for each complexity |
|---|---|---|---|---|---|
| Weight | 30% | 20% | 10% | 40% | 100% |
| High | 15 | 10 | 5 | 20 | 36~50 (Δ15) |
| Middle | 9 | 6 | 3 | 12 | 26~35 (Δ10) |

TABLE 2

| Variable complexity (VC) determination criteria | | | | |
|---|---|---|---|---|
| | Variable factor 1 (20% of weight) | | Variable factor 2 (30% of weight) | |
| | Traffic flow | Pedestrian density Floating population per 50 m × 50 m | Construction/ event | Environment and risk information |
| Variable Complexity, High | Congestion Highway: 15 km/h or less Expressway: 30 km or less | Crowded Floating population of 50 people or more | Road repair (Painting, paving, etc.) Under control (Marathon, etc.) | Road risk index Extremely dangerous (Pothole section, bad weather/frozen state, wild animal advent area) |
| Variable Complexity, Middle | Go slow Highway: 15~25 km/h Expressway: 30~50 km | Normal Floating population of 20~50 people | Temporary control | Road risk index Dangerous (Crash concentration zone, school zone) |
| Variable Complexity, Low | Smooth Highway: 25 km/h or more Expressway: 50 km or more | Not crowded Floating population of 20 people or less | N/A | Road risk index Caution/safety |

| Variable factor 3 (50% of weight) | | |
|---|---|---|
| Vehicle status | Purpose of movement (Refer to destination) | User intention (Information display available) |
| Variable Complexity, High | Warning light On (Check, charging, refueling) | Emergency (Hospital, feeding/ charging) | Do-not-disturb mode ON |
| Variable Complexity, Middle | Multimedia service ON (Music, radio) | Regular movement (Commuting, shopping, etc.) | Normal |
| Variable Complexity, Low | Normal | Irregular movement (Tour, official trip, etc.) | Detail information search mode ON |

TABLE 3-continued

| Fixed complexity (FC) | Road type and shape | Building compo- sition | Regional charac- teristic | Attention concen- tration | Numerical interval for each complexity |
|---|---|---|---|---|---|
| Low | 6 | 4 | 2 | 8 | 20~25 (Δ6) |

In addition, the TPO complexity level calculation module 4600 may set a numerical interval for each variable complexity by assigning a weight to each item for calculating the variable complexity, as shown in [Table 4].

TABLE 4

| Variable complexity (VC) | Variable factor 1 | Variable factor 2 | Variable factor 3 | Numerical interval for each complexity |
|---|---|---|---|---|
| Weight | 20% | 30% | 50% | 100% |
| High | 10 | 15 | 25 | 36~50 (Δ15) |
| Middle | 6 | 9 | 15 | 26~35 (Δ10) |
| Low | 4 | 6 | 10 | 20~25 (Δ6) |

The TPO complexity level calculation module 4600 may update information related to each of a weight, a complexity factor, a value for each complexity factor, and a numerical interval for complexity according to service operation situations.

Thereafter, the TPO complexity level calculation module 4600 may calculate a TPO complexity level using the fixed complexity and the variable complexity, for example, as shown in [Table 5].

TABLE 5

| TPO complexity level (TPO.CL) | Fixed complexity (FC) | Variable complexity (VC) | Numerical interval for each complexity |
|---|---|---|---|
| Weight | (100-Weight (%)) | Weight (%) | 100% |
| High | TPO complexity level calculation method TPO.CL − FC*(100-Weight (%)) + VC*Weight (%) | | 36~50 (Δ15) |
| Middle | | | 26~35 (Δ10) |
| Low | | | 20~25 (Δ6) |

For example, after starting at 60%, an initial weight value may be updated based on results of service operation log analysis, user tendency information, and service user experience satisfaction index survey, and may be personalized for each user.

The TPO complexity level calculation module 4600 may adjust an amount of information of a content to be displayed as an AR object based on the calculated TPO complexity level.

For example, the TPO complexity level calculation module 4600 may establish a display policy according to TPO complexity level criteria.

The TPO complexity level calculation module 4600 may configure corresponding information by referring to information classification and display methods, which are information selection criteria, according to the complexity criteria as shown in [Table 6].

TABLE 6

| | Display information classification | | |
|---|---|---|---|
| | Safety- related information | Convenience- related information | Commercial information such as advertisement |
| TPO- ComplexityLevel, High | Display all (e.g., pothole, construction information) | Essential information-centered restrictive display (e.g., parking, feeding/charging related POI information | None |
| TPO- ComplexityLevel, Middle | | Display essential information + useful additional information (e.g., public facility POI information) | Partially possible |
| TPO- ComplexityLevel, Low | | Display essential information + all additional information (e.g., POI-based detailed information | Fully possible |

| | Display method | | | | |
|---|---|---|---|---|---|
| | Impression/ When to display | Display space occupancy | Exposure effect | Content complexity | Interaction |
| TPO- ComplexityLevel, High | Low (e.g., only before arrival at target location, safety information is exceptionally repeatedly displayed three times or more beforehand | 5% or less of screen occupancy | Simplified, visualized centered on safety information | Color simplified (e.g., three colors or less) Text minimized | None |

TABLE 6-continued

| TPO-ComplexityLevel, Middle | Middle (e.g., notified beforehand before arrival at target location, safety information is exceptionally repeatedly displayed three times or more beforehand | 10% or less of Screen occupancy | Simple visual effect applied (e.g., blinking, color change) | Colors increased (Five colors or less) Text minimized | Restrictive touch, Voice support |
|---|---|---|---|---|---|
| TPO-ComplexityLevel, Low | High (e.g., periodically notified times or more beforehand before arrival at target location | 20% or less of Screen occupancy | Animation effect applied (e.g., blinking while rotating, scale up/down) | Color diversified Text not limited | Voice, touch functions fully supported |

An amount of information to be displayed may be classified into essential/additional information in the categories of safety/convenience/commercial information.

Display positions may be largely classified into center/left and right/top spaces, and only information with the highest priority such as the most safety may be displayed in the center space.

Other spaces may be selected from existing AR view service exposure features such as carpet/bubble POI/building wall/virtual wall (however, it complies with display space occupancy criteria).

As for when to display, safety-related information may be repeatedly displayed and notified before arrival at a corresponding location, and other information may comply with exposure frequency conditions.

Criteria for determining information suitability may be managed through posteriori evaluation and improvement by acquiring service use log information including service user interaction under user permission.

Referring to FIG. 46, the TPO complexity level calculation module 4600 may be disposed in the server 900 and may receive input data for analysis from the client 810 of the AR service device 800.

The input data for analysis may include user feedback, vehicle location, speed, destination, routing information, camera images, and the like.

The server 900 may convert the input data for analysis (TPO information) into information (or format) usable in the TPO complexity level calculation module 4600 through a TPO data interface (I/F), and input the TPO information into the TPO complexity level calculation module 4600.

The TPO complexity level calculation module 4600 may calculate a fixed complexity and a variable complexity using the input TPO information, and calculate a TPO complexity level using the calculated fixed and variable complexities.

At this time, the TPO complexity level calculation module 4600 may receive POI, advertisement, commerce, service, region, environment, weather, traffic information, dangerous area information, etc. received from an external service server 4650, and calculate the TPO complexity level with reference to the received information.

Thereafter, the TPO complexity level calculation module 4600 may establish a display policy based on the TPO complexity level criteria, as shown in Table 6, based on the TPO complexity (4610).

The TPO complexity level calculation module 4600 may transmit, to the server 900, information related to an information type, an amount of information, a location, and a display time (when to display) according to the established display policy, and the server 900 may optimize (process) data to be transmitted to the AR service device 800 according to the display policy (4620).

The server 900 may transmit an AR object (i.e., display data) processed (optimized) based on the display policy to the AR service device 800 (or the client 810).

An AR engine 820 of the AR service device 800 may output, to the display 250 of the vehicle, data processed by reflecting the TPO complexity level and an AR object in which the display policy has been reflected, for example, may output the AR object to be overlaid on an image captured by the camera of the vehicle.

Figure 47:
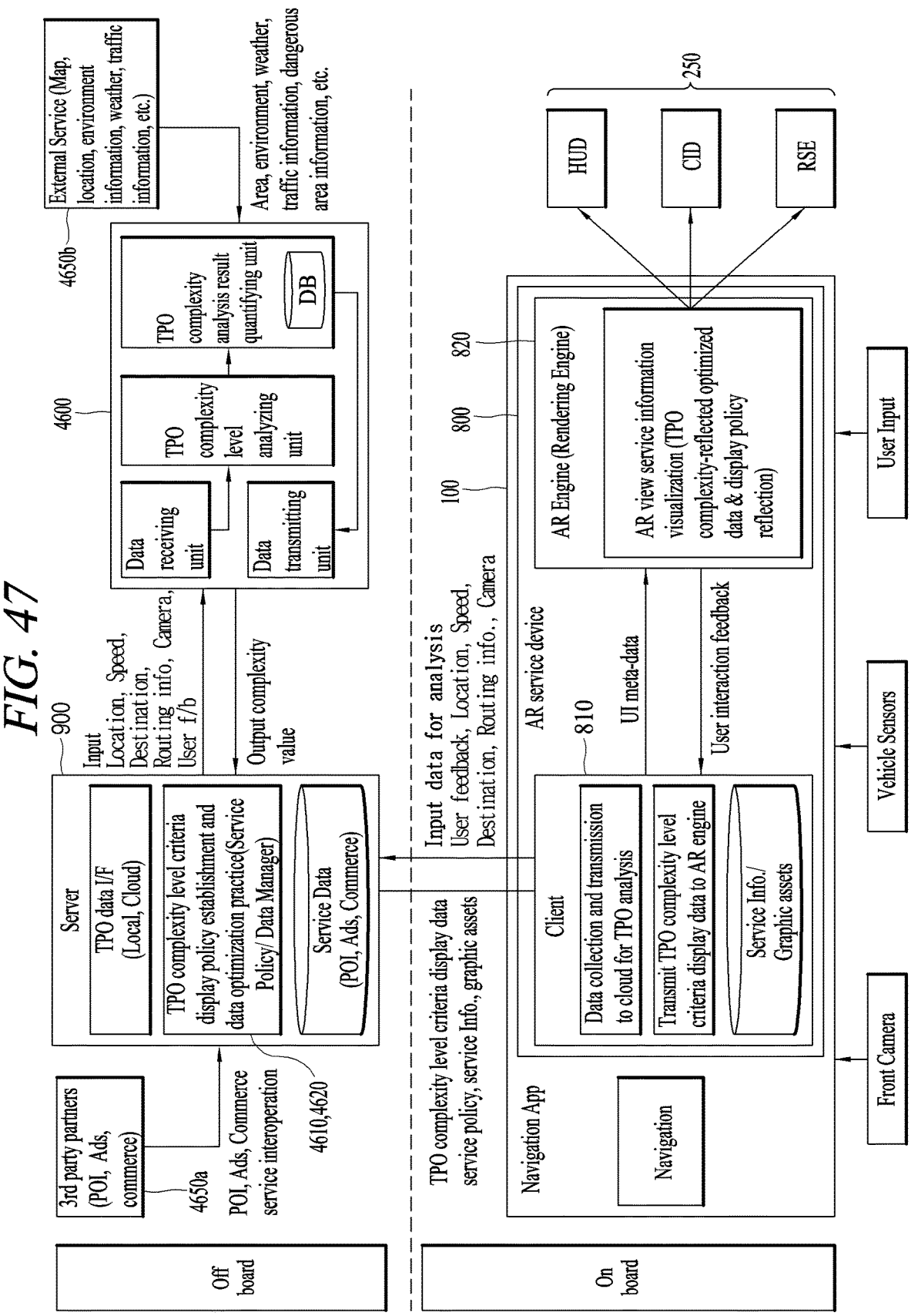

Meanwhile, as illustrated in FIG. 47, the TPO complexity level calculation module 4600 may be implemented as a separate component independent of the server 900.

In this case, the TPO complexity level calculation module 4600 may calculate the TPO complexity level by using information (area, environment, weather, traffic information, dangerous area information, etc.) received from an external service server 4650b and the input data (TPO information) for analysis transmitted from the AR service device 800 through the server.

When the TPO complexity level calculation module 4600 is independent of the server 900, the establishment of the display policy based on the TPO complexity level may be carried out on the side of the server 900.

Figure 48:
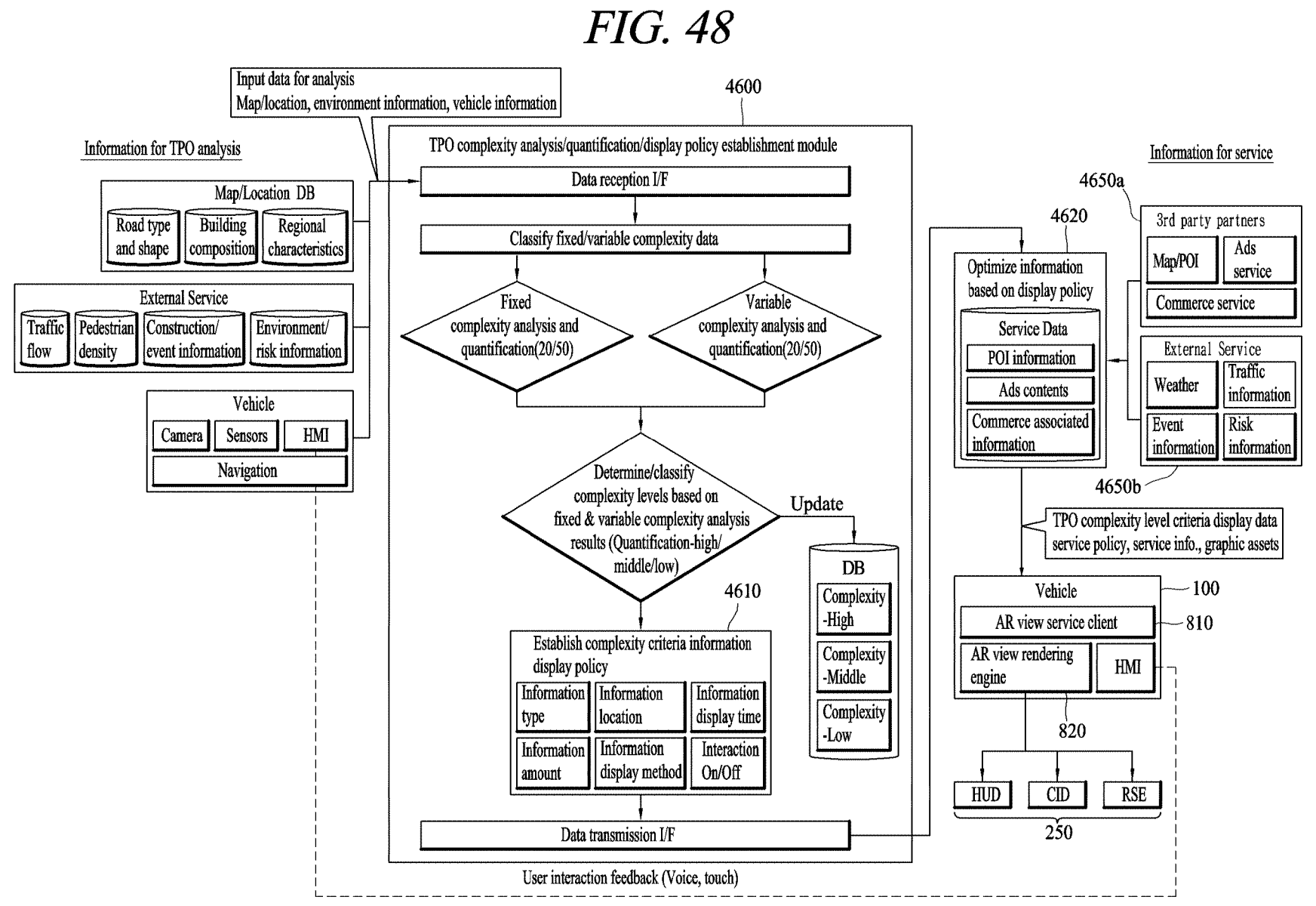

Referring to FIG. 48, information for TPO analysis (i.e., TPO information) may include road type and shape, building composition, regional characteristics, attention concentration, traffic received from an external service server, pedestrian density, construction/event information, environment/risk information, and information collected from the camera, sensor, HMI, and navigation of the vehicle, received from the AR service device 800.

That is, the input data for analysis may include map/location information, environment information, and vehicle information.

The TPO complexity level calculation module 4600 (or TPO complexity analysis/quantification/display policy establishment module) may calculate/quantify a fixed complexity and a variable complexity based on the received data, and calculate/quantify a TPO complexity level based on the fixed complexity and the variable complexity.

The TPO complexity level calculation module 4600 may establish a display policy, as shown in Table 6, based on the TPO complexity level. The display policy may include information type, information location, information display time, information amount, information display method, and interaction On/Off status.

The server 900 (or the AR service device 800) may process (optimize) an AR object (POI information, advertisement content, commerce related information), which is provided from an external server (third party partners), according to the display policy determined by the TPO complexity level calculation module 4600.

The AR engine 820 of the AR service device 800 may display the processed AR object on the display 250 of the vehicle.

Figure 49:
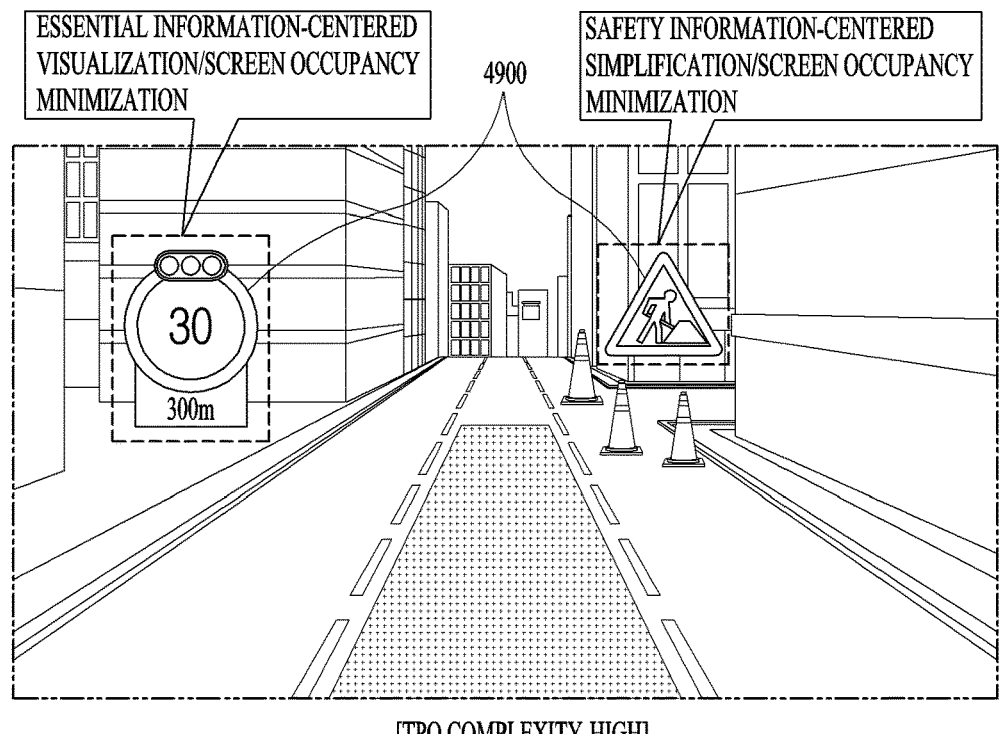

As an example, FIG. 49 is a conceptual diagram for explaining an example of displaying AR objects when a high TPO complexity level is calculated.

The TPO complexity level calculation module 4600 may process the AR objects so that the AR objects are displayed at a first level (the simplest display level) according to the display policy when the high TPO complexity level is determined (calculated) (first section).

Processing of the AR objects may alternatively be performed by the server 900 or the AR service device 800.

For example, as the TPO complexity level is set to the first section, AR objects 4900 may be processed to be displayed at the first level. Accordingly, the AR objects 4900 may be visualized centering on essential information to minimize screen occupancy, and may be simplified centering on safety information to minimize the screen occupancy.

Figure 50:
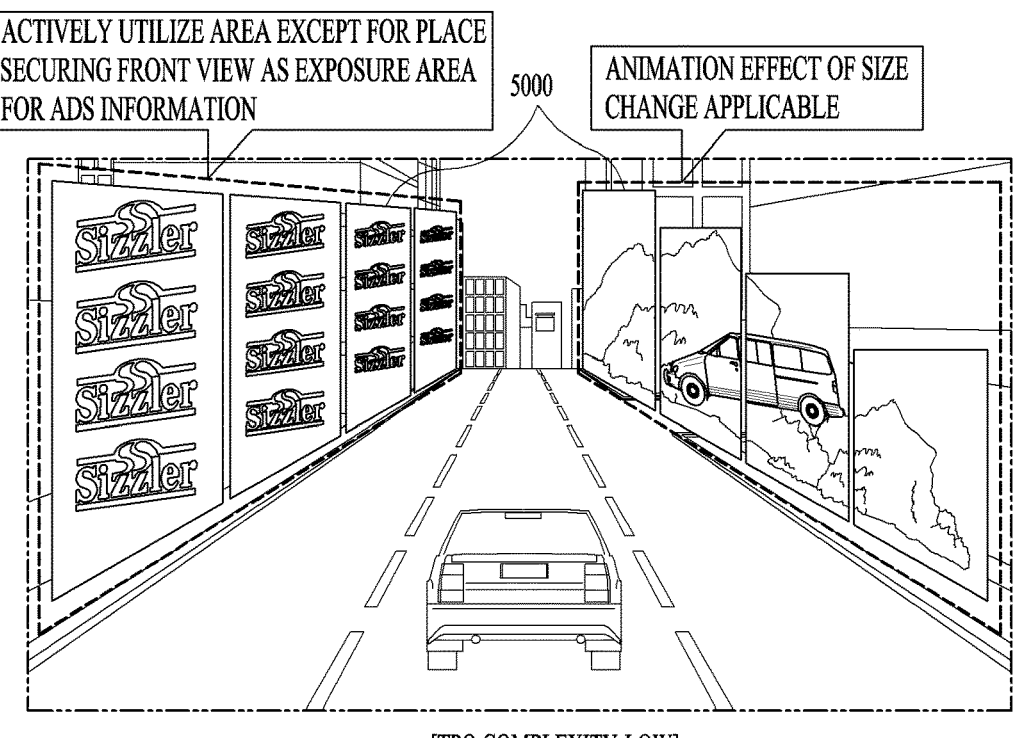

FIG. 50 is a conceptual view for explaining an example of displaying AR objects when a low TPO complexity level is calculated.

When the low TPO complexity is determined (a second section/interval or third section lower than the first section), the TPO complexity level calculation module 4600 may process the AR objects to be displayed at a second level (a level displayed in a complex format) that is higher (more complex) than the first level according to the display policy.

For example, an AR object 5000 may expose advertisement information in an area except for a place securing a front view, and may be processed into the form of an AR wall to occupy a large area. In addition, the AR object 5000 may be processed to increase visibility of the advertisement by applying an animation effect such as a size change.

According to an embodiment of the present disclosure, one or more of the following advantages may be provided.

First, according to the present disclosure, an AR service platform that provides an AR service optimized for a vehicle passenger can be provided.

Second, according to the present disclosure, a new AR service platform that is capable of dynamically adjusting information and an amount of information to display in AR depending on a situation the vehicle is in and selecting data to accentuate.

Third, according to the present disclosure, an AR service platform that is capable of providing an AR service optimized according to complexity by varying a display policy of an AR object depending on TPO complexity can be provided.

The effects of the present disclosure are not limited to those effects mentioned above, and other effects not mentioned may be clearly understood by those skilled in the art from the description of the appended claims.

The AR service device 800 described above may be included in the vehicle 100.

The operation or control method of the AR service device 800 described above may be applied to an operation or control method of the vehicle 100 (or the controller 170) in the same or similar manner.

For example, more detailed embodiments of the control method of the vehicle 100 (or the control method of the AR service device 800)

will be understood by the foregoing description or applied in the same/like manner.

Each of the steps may be performed not only by the AR service device 800 but also by the controller 170 provided in the vehicle 100.

Further, all functions, configurations, or control methods performed by the AR service device 800 described above may be performed by the controller 170 provided in the vehicle 100. That is, all of the control methods described in this specification may be applied to a control method of a vehicle or a control method of a control device.

Further, the AR service device 800 described above may be a mobile terminal. In this case, all functions, configurations, or control methods performed by the AR service device 800 described above may be performed by a controller provided in the mobile terminal. In addition, all the control methods described in this specification can be applied to a method of controlling a mobile terminal in the same/like manner.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A method for providing an augmented reality (AR) service, the method comprising:

collecting information for an AR service to produce collected information;

processing information for an AR service to produce processed information;

transmitting at least one of the collected information and the processed information to an AR service device disposed in a vehicle;

collecting complexity level information of a real world from the vehicle;

calculating fixed complexity based on at least one of a road type, a road shape, a building composition, and an attention concentration;

calculating variable complexity based on the complexity level information of the real world collected from the vehicle; and determining an amount of information to be transmitted to the AR service device using the calculated fixed complexity and variable complexity wherein the determining the amount of information to be transmitted to the AR service is configured to determine at least one of a type of information, an amount of information, a location, and a display time for an AR object output through the AR service device.

2. The method of claim 1, wherein the variable complexity is calculated based on at least one of a dynamic factor, a non-dynamic and unspecified variable factor, and a variable factor inside the vehicle.

3. The method of claim 1, wherein the calculating variable complexity is configured to calculate a Time Place Occasion (TPO) complexity level of the real world, and the determining the amount of information to be transmitted to the AR service is configured to vary at least one of a type of information and an amount of information to be transmitted to the AR service device, based on the calculated TPO complexity level.

4. The method of claim 3, wherein the determining the amount of information to be transmitted to the AR service is configured to establish a display policy for an AR object to be output through the AR, service device based on the calculated TPO complexity level.

5. The method of claim 4, wherein the display policy includes setting values for at least one of type of information, amount of information, location, and display time related to the AR object.

6. The method of claim 4, further comprising processing the AR object to be transmitted to the AR service device to comply with the display policy.

7. The method of claim 4, further comprising:

processing information received from an external service server based on the display policy to produce processed information; and transmitting the processed information to the AR service device.

8. The method of claim 4, further comprising transmitting information related to the calculated TPO complexity level to the AR service device, wherein the AR service device establishes the display policy for the AR object to be output through the AR service based on the received information related to the TPO complexity level.

9. The method of claim 8, wherein the AR service device provides the AR service by processing the AR object to comply with the display policy, and overlaying the processed AR object onto an image captured by a camera of the vehicle.

10. The method of claim 1, wherein the processing the information for the AR service includes processing at least some of the collected information, and wherein both of the collected information and the processed information are transmitted to the AR service device disposed in the vehicle.

* * * * *